United States Patent
Park et al.

(10) Patent No.: US 12,177,792 B2
(45) Date of Patent: Dec. 24, 2024

(54) METHOD AND APPARATUS FOR REPORTING UPLINK POWER HEADROOM IN WIRELESS COMMUNICATION SYSTEM

(71) Applicant: SAMSUNG ELECTRONICS CO., LTD., Suwon-si (KR)

(72) Inventors: Sungjin Park, Suwon-si (KR); Hyunseok Ryu, Suwon-si (KR); Younsun Kim, Suwon-si (KR); Seongmok Lim, Suwon-si (KR); Youngrok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 323 days.

(21) Appl. No.: 17/656,413

(22) Filed: Mar. 24, 2022

(65) Prior Publication Data

US 2022/0322245 A1   Oct. 6, 2022

(30) Foreign Application Priority Data

Mar. 25, 2021   (KR) .................. 10-2021-0039170

(51) Int. Cl.
*H04W 52/36* (2009.01)
*H04W 52/14* (2009.01)
*H04W 80/02* (2009.01)

(52) U.S. Cl.
CPC ....... *H04W 52/365* (2013.01); *H04W 52/146* (2013.01); *H04W 80/02* (2013.01)

(58) Field of Classification Search
CPC . H04W 52/365; H04W 52/146; H04W 80/02; H04W 52/242; H04W 52/325; H04W 52/42
See application file for complete search history.

(56) References Cited

U.S. PATENT DOCUMENTS 10,420,040 B2   9/2019   Dinan
2016/0029235 A1   1/2016   Kim et al.
(Continued)

FOREIGN PATENT DOCUMENTS

KR   10-2019-0008948 A   1/2019
KR   10-2020-0130063 A   11/2020

OTHER PUBLICATIONS

International Search Report and Written Opinion of the International Searching Authority dated Jun. 24, 2022, in connection with International Application No. PCT/KR2022/004261, 8 pages.
(Continued)

*Primary Examiner* — Dinh Nguyen

(57) ABSTRACT

The disclosure relates to a 5G or 6G communication system for supporting a higher data transmission rate. According to an embodiment of the disclosure, a method performed by a terminal in a communication system includes determining whether a power headroom reporting (PHR) is triggered; identifying at least one of a first power headroom (PH) value for a first physical uplink shared channel (PUSCH) corresponding to a first resource index or a second PH value for a second PUSCH corresponding to a second resource index based on a determination that the PHR is triggered; identifying a PHR medium access control control element (MAC CE) related to at least one of the first PH value or the second PH value; and transmitting the PHR MAC CE via at least one of the first PUSCH or the second PUSCH.

8 Claims, 31 Drawing Sheets

(56) References Cited

U.S. PATENT DOCUMENTS

2019/0253986 A1* 8/2019 Jeon ..................... H04L 5/0048
2019/0349866 A1 11/2019 Lin et al.
2020/0358557 A1 11/2020 Park et al.

OTHER PUBLICATIONS

Huawei et al., "Correction to NR TC 7.1.1.3.8.X-PHR report", R5-211385, 3GPP TSG-RAN5 Meeting #90-e, Electronic meeting, Feb. 22-Mar. 5, 2021, 11 pages.
Huawei et al., "Running CR for MAC in R16 positioning", R2-2006172, 3GPP TSG-RAN2 Meeting #110-e, Electronic, Jun. 1-12, 2020, 11 pages.

* cited by examiner

FIG. 24

| | | | | | | | | |
|---|---|---|---|---|---|---|---|---|
| R | R | R | R | R | R | T2 | T1 | TRP information |
| P | R | PH (Type 1, PCell) | | | | | | ← 2400 |
| MPE or R | | $P_{CMAX,f,c}$ | | | | | | |
| P | R | PH (Type 1, PCell) | | | | | | ← 2402 |
| MPE or R | | $P_{CMAX,f,c}$ | | | | | | |

FIG. 25

| $C_{7,1}$ | $C_{6,1}$ | $C_{5,1}$ | $C_{4,1}$ | $C_{3,1}$ | $C_{2,1}$ | $C_{1,1}$ | R |

...

| $C_{m,n}$ | $C_{m-1,n}$ | $C_{m-2,n}$ | $C_{m-3,n}$ | $C_{m-4,n}$ | $C_{m-5,n}$ | $C_{m-6,n}$ | $C_{m-7,n}$ |

| P | V | PH for serving cell 1 (TPR 1) |
|---|---|---|
| MPE or R | | $P_{CMAX,f,c}$ 1,1 |
| P | V | PH for serving cell 1 (TPR 2) |
| MPE or R | | $P_{CMAX,f,c}$ 1,2 |

...

| P | V | PH for serving cell m (TPR n) |
|---|---|---|
| MPE or R | | $P_{CMAX,f,c}$ m,n |

FIG. 26

| $C_7$ | $C_6$ | $C_5$ | $C_4$ | $C_3$ | $C_2$ | $C_1$ | R | — 2600 |

. . . .

| $C_m$ | $C_{m-1}$ | $C_{m-2}$ | $C_{m-3}$ | $C_{m-4}$ | $C_{m-5}$ | $C_{m-6}$ | $C_{m-7}$ |
|---|---|---|---|---|---|---|---|
| P | V | \multicolumn{6}{l|}{PH for serving cell 1} |
| \multicolumn{2}{l|}{MPE or R} | \multicolumn{6}{l|}{$P_{CMAX,f,c}$ 1} |
| P | V | \multicolumn{6}{l|}{PH for serving cell 2} |
| \multicolumn{2}{l|}{MPE or R} | \multicolumn{6}{l|}{$P_{CMAX,f,c}$ 2} |

. . . .

| P | V | PH for serving cell m |
|---|---|---|
| \multicolumn{2}{l|}{MPE or R} | $P_{CMAX,f,c}$ m |

METHOD AND APPARATUS FOR REPORTING UPLINK POWER HEADROOM IN WIRELESS COMMUNICATION SYSTEM

CROSS-REFERENCE TO RELATED APPLICATION

This application is based on and claims priority under 35 U.S.C. § 119 to Korean Patent Application No. 10-2021-0039170 filed on Mar. 25, 2021, in the Korean Intellectual Property Office, the disclosure of which is herein incorporated by reference in its entirety.

BACKGROUND

1. Field

The disclosure relates to operations of a user equipment (UE) and a base station in a wireless communication system. More particularly, the disclosure relates to a method and an apparatus for reporting uplink power headroom in a wireless communication system.

2. Description of Related Art $5^{th}$ Generation (5G) mobile communication technologies define broad frequency bands such that high transmission rates and new services are possible, and can be implemented not only in "sub 6 GHz" bands such as 3.5 GHz, but also in "above 6 GHz" bands referred to as mmWave including 28 GHz and 39 GHz. In addition, it has been considered to implement 6G mobile communication technologies (referred to as beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, integrated access and backhaul (TAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing may be connected to communication networks, and it is accordingly expected that enhanced functions and performances of 5G mobile communication systems and integrated operations of connected devices may be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems may serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and artificial intelligence (AI) from the design stage and internalizing end-to-end AI support functions, and next-generation distributed computing technology for implementing services at levels of complexity exceeding the limit of UE operation capability by utilizing ultra-high-performance communication and computing resources.

With the advance of wireless communication systems as described above, various services can be provided, and accordingly there is a need for schemes to effectively provide these services.

SUMMARY

A method and an apparatus capable of effectively providing a service in a mobile communication system are provided through various embodiments of the disclosure.

According to an embodiment of the disclosure, a method performed by a terminal in a communication system includes determining whether a power headroom reporting (PHR) is triggered; identifying at least one of a first power headroom (PH) value for a first physical uplink shared channel (PUSCH) corresponding to a first resource index or a second PH value for a second PUSCH corresponding to a second resource index based on a determination that the PHR is triggered; identifying a PHR medium access control control element (MAC CE) related to at least one of the first PH value or the second PH value; and transmitting the PHR MAC CE via at least one of the first PUSCH or the second PUSCH.

According to an embodiment of the disclosure, a method performed by a base station in a communication system includes receiving, from a terminal, a PHR MAC CE via at least one of a first PUSCH corresponding to a first resource index or a second PUSCH corresponding to a second resource index, wherein the PHR MAC CE is related to at least one of a first PH value for the first PUSCH or a second PH value for the second PUSCH.

According to an embodiment of the disclosure, a terminal in a communication includes a transceiver, and a controller coupled with the transceiver and configured to determine whether a PHR is triggered, identify at least one of a first PH value for a first PUSCH corresponding to a first resource index or a second PH value for a second PUSCH corresponding to a second resource index based on a determination that the PHR is triggered, identify a PHR MAC CE related to at least one of the first PH value or the second PH value, and transmit the PHR MAC CE via at least one of the first PUSCH or the second PUSCH.

According to an embodiment of the disclosure, a base station in a communication system includes a transceiver, and a controller coupled with the transceiver and configured to receive, from a terminal, a PHR MAC CE via at least one of a first PUSCH corresponding to a first resource index or a second PUSCH corresponding to a second resource index, wherein the PHR MAC CE is related to at least one of a first PH value for the first PUSCH or a second PH value for the second PUSCH.

According to the various embodiments of the disclosure, a method by which a UE supporting PUSCH transmission based on multiple transmission and reception points (TRPs) configures PH information is provided.

Advantageous effects obtainable from the disclosure may not be limited to the above-mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 24 illustrates a MAC CE structure including PHR information according to an embodiment of the present disclosure;

FIG. 25 illustrates a MAC CE structure including PHR information according to an embodiment of the present disclosure;

FIG. 26 illustrates a MAC CE structure including PHR information according to an embodiment of the present disclosure;

DETAILED DESCRIPTION

Figure 1:
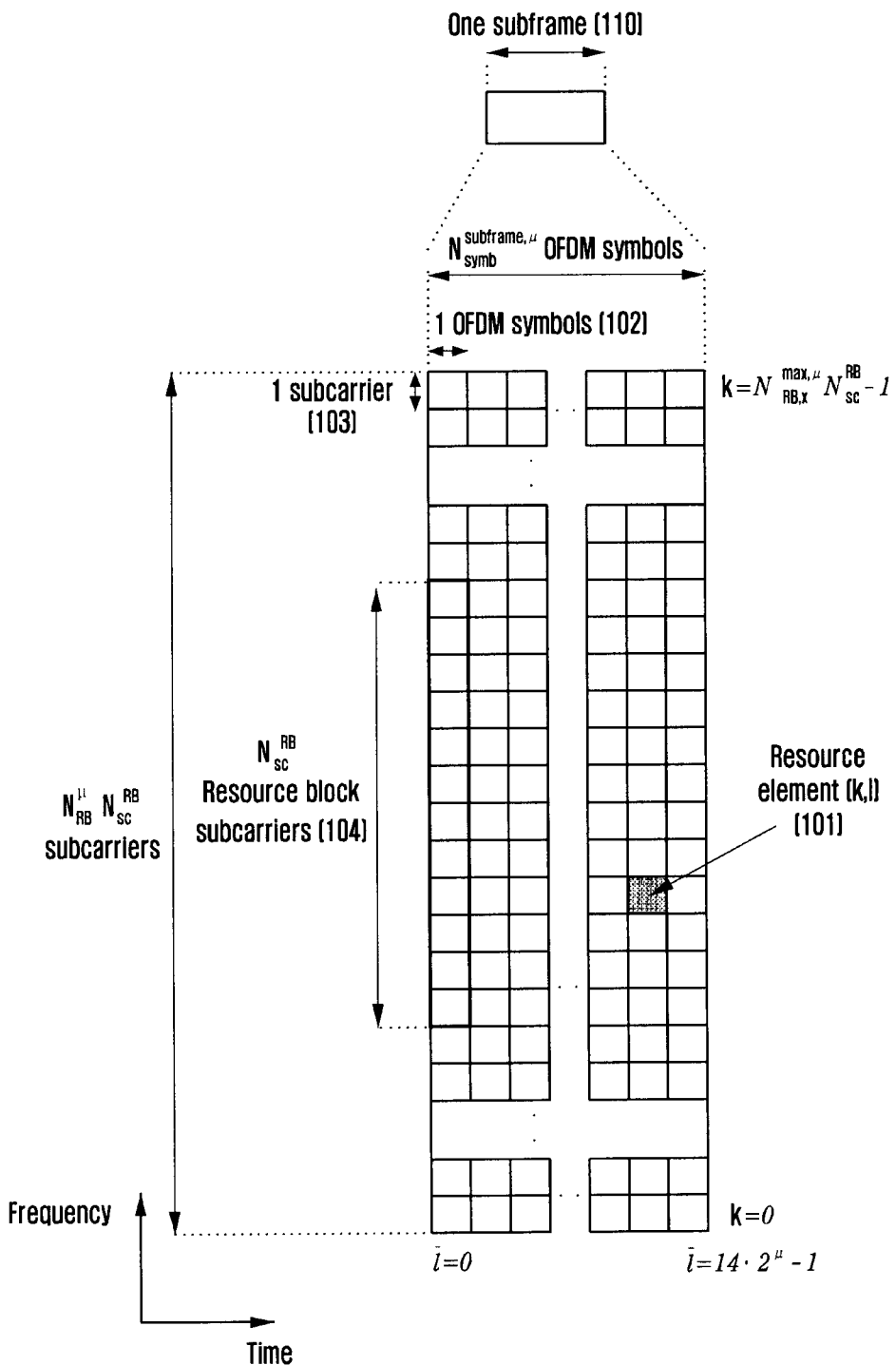
FIG. 1 illustrates a basic structure of time-frequency domains in a wireless communication system according to an embodiment of the present disclosure.

FIGS. 1 through 30, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Further, in the following description, LTE or LTE-A systems may be described by way of example, but the embodiments of the disclosure may also be applied to other communication systems having similar technical backgrounds or channel types.

Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit". Moreover, the elements and "units" or may be implemented to reproduce one or more CPUs within a device or a security multimedia card. Further, the "unit" in the embodiments may include one or more processors.

A wireless communication system has developed into a broadband wireless communication system that provides a high-speed and high-quality packet data service according to communication standards such as high-speed packet access (HSPA) of 3GPP, long-term evolution (LTE) or evolved universal terrestrial radio access (E-UTRA), LTE-advanced (LTE-A), LTE-Pro, high rate packet data (HRPD) of 3GPP2, ultra-mobile broadband (UMB), and 802.16e of IEEE beyond the initially provided voice-based service.

An LTE system, which is a representative example of the broadband wireless communication system, employs an orthogonal frequency division multiplexing (OFDM) scheme for a downlink (DL), and employs a single carrier frequency division multiple access (SC-FDMA) scheme for an uplink (UL). The uplink is a radio link through which a user equipment (UE) (or a mobile station (MS)) transmits data or a control signal to a base station (BS) (or an eNode B), and the downlink is a radio link through which the BS transmits data or a control signal to the UE. In the multiple access schemes as described above, time-frequency resources for carrying data or control information are allocated and operated in a manner to prevent overlapping of the resources, that is, to establish the orthogonality, between users, so as to identify data or control information of each user.

A post-LTE communication system, that is, a 5G communication system, may be able to freely reflect various requirements of a user and a service provider, and thus it is required to support a service which satisfies the various requirements. Services which are considered for the 5G communication system include enhanced mobile broadband (eMBB), massive machine type communication (mMTC), and ultra reliability low latency communication (URLLC).

The eMBB aims to provide a data transmission rate which is improved so as to surpass the data transmission speed supported by conventional LTE, LTE-A, or LTE-Pro. For example, in the 5G communication system, the eMBB may provide a peak downlink data rate of 20 Gbps and a peak uplink data rate of 10 Gbps from the viewpoint of one base station. Further, the 5G communication system may provide not only the peak data rate but also an increased user-perceived data rate. In order to satisfy such requirements, improvement of various transmission/reception technologies, including a further improved multi-input multi-output (MIMO) transmission technology, is needed. Further, while the current LTE system uses transmission bandwidths from a bandwidth of 2 GHz to a maximum bandwidth of 20 MHz to transmit signals, the 5G communication system uses a frequency bandwidth wider than 20 MHz in frequency bands of 3 to 6 GHz or higher than or equal to 6 GHz, whereby the data transmission rate required by the 5G communication system can be satisfied.

Further, in order to support an application service such as the Internet of Things (IoT), mMTC is considered in the 5G communication system. The mMTC is required to support access of a multitude of UEs within a cell, improve coverage of the UE, increase a battery lifetime, and reduce the costs of the UE in order to efficiently provide IoT. IoT is attached to various sensors and devices to provide communication, and thus may support a large number of UEs (for example, 1,000,000 UEs/km$^2$) within the cell. Since the UE supporting the mMTC is highly likely to be located in a shaded area, such as a basement of a building, which a cell cannot cover due to service characteristics, the mMTC may require wider coverage than other services provided by the 5G communication system. The UE supporting the mMTC needs to be produced at low cost and it is difficult to frequently exchange a battery thereof, so that a very long battery lifetime, for example, 10 to 15 years, may be required.

Last, in the URLLC is a cellular-based wireless communication service used for a particular purpose (mission-critical). For example, services used for remote control of robots or machinery, industrial automation, unmanned aerial vehicles, remote health care, and emergency alerts may be considered. Accordingly, communication provided by the URLLC may provide very low latency and very high reliability. For example, services supporting the URLLC may satisfy a radio access delay time (air interface latency) shorter than 0.5 milliseconds and also have a requirement of a packet error rate equal to or smaller than 10$^{-5}$. Accordingly, for services supporting the URLLC, the 5G system may provide a transmit time interval (TTI) smaller than that of other systems and also has a design requirement of allocating a wide array of resources in a frequency band in order to guarantee reliability of a communication link.

Three services of 5G, namely eMBB, URLLC, and mMTC, may be multiplexed and transmitted in one system. At this time, in order to meet the different requirements of the respective services, different transmission/reception schemes and transmission/reception parameters may be used for the services. Of course, 5G is not limited to the above-described three services.

Hereinafter, a frame structure of the 5G system is described in more detail with reference to the drawings.

FIG. 1 illustrates the basic structure of time-frequency domains in a wireless communication system according to an embodiment of the present disclosure.

In FIG. 1, a horizontal axis indicates a time domain and a vertical axis indicates a frequency domain. A basic unit of resources in the time and frequency domains is a resource element (RE) 101 and may be defined as 1 orthogonal frequency division multiplexing (OFDM) symbol 102 in the time axis and 1 subcarrier 103 in the frequency axis. In the frequency domain, $NR_{sc}^{RB}$ (for example, 12) successive REs may correspond to one resource block (RB) 104. In the time domain, $N_{symb}^{sub\ frame}$ successive OFDM symbols may correspond to one subframe 110.

Figure 2:
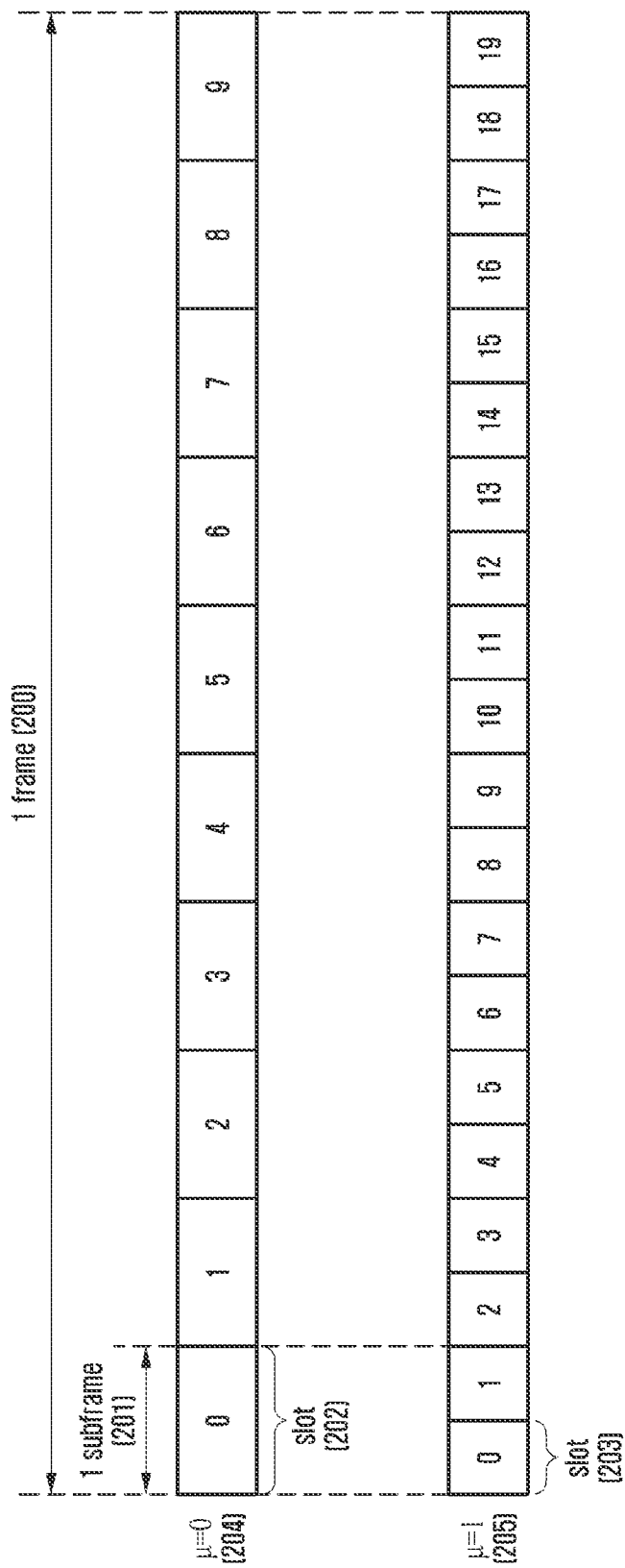
FIG. 2 illustrates frame, subframe, and slot structures in a wireless communication system according to an embodiment of the present disclosure.

FIG. 2 illustrates frame, subframe, and slot structures in a wireless communication system according to an embodiment of the present disclosure.

In FIG. 2, an example of the structure of a frame 200, a subframe 201, and a slot 202 is illustrated. One frame 200 may be defined as 10 ms. One subframe 201 may be defined as 1 ms, and accordingly one frame 200 may include a total of 10 subframes 201. One slot 202 or 203 may be defined as 14 OFDM symbols (that is, the number symbols $N_{symbol}^{slot}$ per slot is 14). One subframe 201 may include one or a plurality of slots 202 and 203, and the number of slots 202 or 203 per subframe 201 may vary depending on a configuration value μ 204 or 205 for subcarrier spacing. In an example of FIG. 2, the cases in which a subcarrier spacing configuration value is μ=0 204 and is μ=1 205 are illustrated. In the case of μ=0 204, one subframe 201 may include one slot 202. In the case of μ=1 205, one subframe 201 may include two slots 203. That is, the number of slots $N_{slot}^{sub\ frame,\mu}$ per subframe may vary depending on the configuration value p for subcarrier spacing, and the number of slots $N_{slot}^{frame,\mu}$ per frame may vary depending thereon. $N_{slot}^{sub\ frame,\mu}$ and $N_{slot}^{frame,\mu}$ according to subcarrier spacing configuration p may be defined as Table 1.

TABLE 1

| μ | $N_{symbol}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

[Bandwidth Part (BWP)]

Subsequently, a configuration of a bandwidth part (BWP) in a 5G communication system to which the disclosure can be applied will be described in detail with reference to the drawings.

Figure 3:
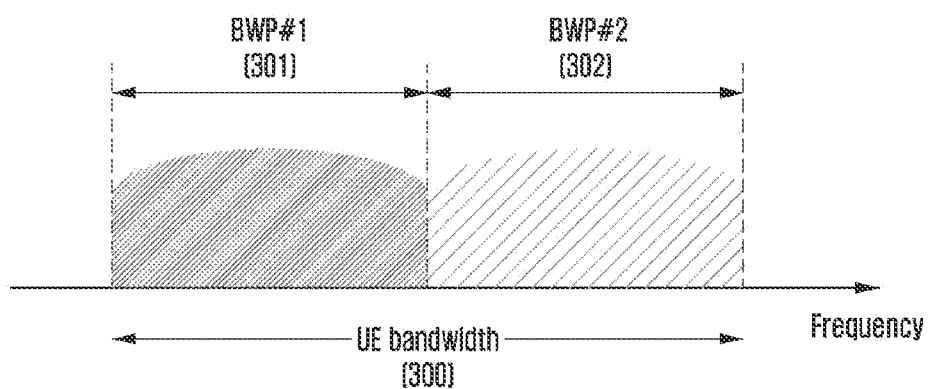
FIG. 3 illustrates an example of a configuration of the BWP in the wireless communication system according to an embodiment of the present disclosure.

FIG. 3 illustrates an example of a configuration of the BWP in the wireless communication system according to an embodiment of the present disclosure.

FIG. 3 shows an example in which a UE bandwidth 300 is configured as two bandwidth parts, that is, BWP #1 31 and BWP #2 302. The BS may configure one or a plurality of BWPs in the UE, and the following information may be configured to each BWP.

TABLE 2

| BWP ::= | SEQUENCE { |
|---|---|
| bwp-Id | BWP-Id, |
| (bandwidth part identifier) | |
| locationAndBandwidth | INTEGER (1..65536), |
| (bandwidth part location) | |
| subcarrierSpacing | ENUMERATED {n0, n1, n2, n3, n4, n5}, |
| (subcarrier spacing) | |
| cyclicPrefix | ENUMERATED { extended } |
| (cyclic prefix) | |
| } | |

Of course, the disclosure is not limited to the example, and various parameters related to a BWP as well as the configuration information may be configured in the UE. The information may be transmitted from the BS to the UE through higher-layer signaling, for example, radio resource control (RRC) signaling. Among one or a plurality of configured BWPs, at least one BWP may be activated. Information indicating whether to activate the configured BWPs may be semi-statically transferred from the BS to the UE through RRC signaling or may be dynamically transferred through downlink control information (DCI).

According to some embodiments, the UE before the radio resource control (RRC) connection may receive a configuration of an initial BWP for initial access from the BS through a master information block (MIB). More specifically, the UE may receive configuration information for a control resource set (CORESET) and a search space in which a PDCCH for receiving system information (remaining system information (RMSI) or system information block 1 (SIB1)) required for initial access through the MIB can be transmitted in an initial access step. The control resource set and the search space configured as the MIB may be considered as an identity (ID) 0. The BS may inform the UE of configuration information such as frequency allocation information for control resource set #0, time allocation information, and numerology through the MIB. Further, the BS may inform the UE of configuration information for a monitoring period and an occasion of control resource set #0, that is, configuration information for search space #0 through the MIB. The UE may consider a frequency region configured as control resource set #0 acquired from the MIB as an initial bandwidth part for initial access. At this time, the ID of the initial BWP may be considered as 0.

The configuration for the BWP supported by the 5G system may be used for various purposes.

According to some embodiments, when a BWP supported by the UE is smaller than the system BWP, the smaller BWP may be supported through the configuration of the BWP. For example, the BS may configure a frequency location (configuration information 2) of the BWP in the UE, and thus the UE may transmit and receive data at a specific frequency location within the system bandwidth.

According to some embodiments, in order to support different numerologies, the BS may configure a plurality of BWPs in the UE. For example, in order to support the UE to perform data transmission and reception using both subcarrier spacing of 15 kHz and subcarrier spacing of 30 kHz, two BWPs may be configured as subcarrier spacings of 15 kHz and 30 kHz, respectively. Different BWPs may be frequency-division-multiplexed, and when data is transmitted/received at particular subcarrier spacing, the BWP configured at the corresponding subcarrier spacing may be activated.

According to some embodiments, in order to reduce power consumption of the UE, the BS may configure BWPs having different BWP sizes in the UE. For example, when the UE supports a very large bandwidth, for example, 100 MHz and always transmits and receives data through the corresponding bandwidth, very high power consumption may be generated. Particularly, monitoring an unnecessary downlink control channel through a large bandwidth of 100 MHz in the state in which there is no traffic is very inefficient from the aspect of power consumption. In order to reduce power consumption of the UE, the BS may configure a BWP having a relatively narrow bandwidth, for example, a bandwidth of 20 MHz. The UE may perform a monitoring operation in the bandwidth part of 20 MHz in the state in which there is no traffic, and if data is generated, may transmit and receive data through the bandwidth part of 100 MHz according to an instruction from the BS.

In a method of configuring the bandwidth part, UEs before the RRC connection may receive configuration information for an initial bandwidth part through a master information block (MIB) in an initial access step. More specifically, the UE may receive a configuration of a control resource set (CORESET) for a downlink control channel in which downlink control information (DCI) for scheduling a system information block (SIB) can be transmitted from an MIB of a physical broadcast channel (PBCH). A bandwidth of the control resource set configured as the MIB may be considered as an initial bandwidth part, and the UE may receive a physical downlink shared channel (PDSCH), in which the SIB is transmitted, through the configured initial bandwidth part. The initial bandwidth part may be used not only for receiving the SIB but also other system information (OSI), paging, or random access.

[Bandwidth Part (BWP) Change]

When one or more BWPs are configured in the UE, the BS may indicate a change (or switching or transition) in the BWPs to the UE through a BWP indicator field within the DCI. For example, in FIG. 3, when a currently activated BWP of the UE is BWP #1 301, the BS may indicate BWP #2 302 to the UE through a BWP indicator within DCI and the UE may make a BWP change to BWP #2 302 indicated by the received BWP indicator within DCI.

As described above, since the DCI-based BWP change may be indicated by the DCI for scheduling the PDSCH or the PUSCH, the UE may be able to receive or transmit the PDSCH or the PUSCH scheduled by the corresponding DCI in the changed BWP without any difficulty if the UE receives a BWP change request. To this end, the standard has defined requirements for a delay time ($T_{BWP}$) required for the BWP change, and, for example, may be defined as follows.

TABLE 3

| | | BWP switch delay $T_{BWP}$(slots) | |
|---|---|---|---|
| μ | NR Slot length(ms) | Type 1$^{Note\ 1}$ | Type 2$^{Note\ 1}$ |
| 0 | 1 | 1 | 3 |
| 1 | 0.5 | 2 | 5 |
| 2 | 0.25 | 3 | 9 |
| 3 | 0.125 | 6 | 18 |

Note 1
Depends on UE capability.
Note 2:
If the BWP switch involves changing of SCS, the BWP switch delay is determined by the larger one between the SCS before BWP switch and the SCS after BWP switch.

The requirements for the BWP change delay time support type 1 or type 2 according to a capability of the UE. The UE may report a supportable BWP delay time type to the BS.

When the UE receives DCI including a BWP change indicator in slot n according to the requirements for the BWP change delay time, the UE may complete a change to a new BWP indicated by the BWP change indicator at a time point that is not later than slot n+$T_{BWP}$ and transmit and receive a data channel scheduled by the corresponding DCI in the changed new BWP. When the BS desires to schedule a data channel in the new BWP, the BS may determine allocation of time domain resources for the data channel in consideration of the BWP change delay time ($T_{BWP}$) of the UE. That is, when scheduling the data channel in the new BWP, the BS may schedule the corresponding data channel after the BWP change delay time through a method of determining allocation of time domain resources for the data channel. Accordingly, the UE may not expect that the DCI indicating the BWP change indicates a slot offset ($K_0$ or $K_2$) smaller than the BWP change delay time ($T_{BWP}$).

If the UE receives DCI (for example, DCI format 1_1 or 0_1) indicating the BWP change, the UE may perform no transmission or reception during a time interval corresponding to symbols from a third symbol of a slot for receiving the PDCCH including the corresponding DCI to a start point of the slot indicated by the slot offset ($K_0$ or $K_2$) indicated by a time domain resource allocation field within the corresponding DCI. For example, when the UE receives DCI indicating the BWP change in slot n and a slot offset value indicated by the corresponding DCI is K, the UE may perform no transmission or reception from the third symbol of slot n to a symbol before slot n+K (that is, the last symbol of slot n+K−1).

[SS/PBCH Block]

Subsequently, a synchronization signal (SS)/PBCH block in a 5G system to which the disclosure can be applied is described.

An SS/PBCH block may be a physical layer channel block including a primary SS (PSS), a secondary SS (SSS), and a PBCH. A detailed description thereof is made below:

PSS: is a signal which is a reference of downlink time/frequency synchronization and provides some pieces of information of a cell ID;

SSS: is a reference of downlink time/frequency synchronization and provides the remaining cell ID information which the PSS does not provide. In addition, the SSS serves as a reference signal for demodulation of a PBCH;

PBCH: provides necessary system information required for transmitting and receiving a data channel and a control channel by the UE. The necessary system information may include control information related to a search space indicating radio resource mapping information of a control channel, scheduling control information for a separate data channel for transmitting system information, and the like; and SS/PBCH block: includes a combination of PSS, SSS, and PBCH. One or a plurality of SS/PBCH blocks may be transmitted within a time of 5 ms, and each of the transmitted SS/PBCH blocks may be separated by an index.

The UE may detect the PSS and the SSS in an initial access stage and decode the PBCH. The UE may acquire an MIB from the PBCH and receive a configuration of control resource set (CORESET) #0 (corresponding to a control resource set having control resource set index 0) therefrom.

The UE may monitor control resource set #0 on the basis of the assumption that the selected SS/PBCH block and a demodulation reference signal (DMRS) transmitted in control resource set #0 are quasi co-located (QCLed). The UE may receive system information through downlink control information transmitted in control resource set #0. The UE may acquire configuration information related to a random access channel (RACH) required for initial access from the received system information. The UE may transmit a physical RACH (PRACH) to the BS in consideration of the selected SS/PBCH block index, and the BS receiving the PRACH may acquire the SS/PBCH block index selected by the UE. The BS may know which block is selected by the UE from among the SS/PBCH blocks and that CORESET #0 related thereto is monitored.

[PDCCH: DCI-Related]

Subsequently, downlink control information (DCI) in the 5G system to which the disclosure can be applied will be described in detail.

In the 5G system, scheduling information for uplink data (or a physical uplink data channel (physical uplink shared channel (PUSCH))) or downlink data (or physical downlink data channel (physical downlink shared channel (PDSCH))) may be transmitted from the BS to the UE through DCI. The UE may monitor a fallback DCI format and a non-fallback DCI format for the PUSCH or the PDSCH. The fallback DCI format may include a fixed field predefined between the BS and the UE, and the non-fallback DCI format may include a configurable field.

The DCI may be transmitted through a physical downlink control channel (PDCCH) after passing through a channel coding and modulation process. A cyclic redundancy check (CRC) is added to a DCI message payload and is scrambled by a radio network temporary identifier (RNTI) corresponding to the identity of the UE. Depending on the purpose of the DCI message, for example, UE-specific data transmission, a power control command, a random access response, or the like, different RNTIs may be used. That is, the RNTI is not explicitly transmitted but is included in a CRC calculation process to be transmitted. If the DCI message transmitted through the PDCCH is received, the UE may identify the CRC through the allocated RNTI, and may recognize that the corresponding message is transmitted to the UE when the CRC is determined to be correct on the basis of the CRC identification result.

For example, DCI for scheduling a PDSCH for system information (SI) may be scrambled by an SI-RNTI. DCI for scheduling a PDSCH for a random access response (RAR) message may be scrambled by an RA-RNTI. DCI for scheduling a PDSCH for a paging message may be scrambled by a P-RNTI. DCI for notifying of a slot format indicator (SFI) may be scrambled by an SFI-RNTI. DCI for notifying of transmit power control (TPC) may be scrambled by a TPC-RNTI. DCI for scheduling a UE-specific PDSCH or PUSCH may be scrambled by a cell RNTI (C-RNTI).

DCI format 0_0 may be used for fallback DCI for scheduling a PUSCH in which case the CRC may be scrambled by a C-RNTI. DCI format 0_0 in which the CRC is scrambled by the C-RNTI may include, for example, the following information.

TABLE 4

Identifier for DCI formats - [1] bit
Frequency domain resource assignment -
$[\lceil \log_2(N_{RB}^{UL,BWP}(N_{RB}^{UL,BWP} + 1)/2)\rceil]$ bits
Time domain resource assignment - X bits
Frequency hopping flag - 1 bit.
Modulation and coding scheme - 5 bits
New data indicator - 1 bit
Redundancy version - 2 bits
HARQ process number - 4 bits
Transmit power control (TPC) command for scheduled PUSCH - [2] bits
Uplink (UL)/supplementary UL (SUL) indicator - 0 or 1 bit DCI format 0_1 may be used for non-fallback DCI for scheduling a PUSCH in which case the CRC may be scrambled by a C-RNTI. DCI format 0_1 in which the CRC is scrambled by the C-RNTI may include, for example, the following information.

TABLE 5

Carrier indicator - 0 or 3 bits
UL/SUL, indicator - 0 or 1 bit
Identifier for DCI formats - [1] bits
Bandwidth part indicator - 0, 1 or 2 bits
Frequency domain resource assignment
    For resource allocation type 0, $\lceil N_{RB}^{UL,BWP} / P \rceil$ bits
    For resource allocation type 1, $\lceil \log_2(N_{RB}^{UL,BWP} (N_{RB}^{UL,BWP} + 1) / 2)\rceil$ bits
Time domain resource assignment - 1, 2, 3, or 4 bits
Virtual resource block (VRB)-to-physical resource block (PRB) mapping - 0 or 1 bit, only for resource allocation type 1.
    0 bit if only resource allocation type 0 is configured;
    1 bit otherwise.

TABLE 5-continued

Frequency hopping flag - 0 or 1 bit, only for resource allocation type 1.
    0 bit if only resource allocation type 0 is configured;
    1 bit otherwise,
Modulation and coding scheme - 5 bits
New data indicator - 1 bit
Redundancy version - 2 bits
HARQ process number - 4 bits
1st downlink assignment index 1 or 2 bits
    1 bit for semi-static HARQ-ACK codebook;
    2 bits for dynamic HARQ-ACK codebook with single HARQ-ACK codebook.
2nd downlink assignment index - 0 or 2 bits
    2 bits for dynamic HARQ-ACK codebook with two HARQ-ACK sub-codebooks;
    0 bit otherwise.
TPC command for scheduled PUSCH - 2 bits Sounding reference signal (SRS) resource indicator $\left\lceil \log_2\left(\sum_{k=1}^{L_{max}} \binom{N_{SRS}}{k}\right) \right\rceil$ or $\lceil \log_2(N_{SRS}) \rceil$ bits $\left\lceil \log_2\left(\sum_{k=1}^{L_{max}} \binom{N_{SRS}}{k}\right) \right\rceil$ bits for non-codebook based PUSCH transmission;

$\lceil \log_2(N_{SRS}) \rceil$ bits for codebook based PUSCH transmission.
Precoding information and number of layers - up to 6 bits
Antenna ports - up to 5 bits
SRS request - 2 bits
Channel state information (CSI) request - 0, 1, 2, 3, 4, 5, or 6 bits
Code block group (CBG) transmission information - 0, 2, 4, 6, or 8 bits
Phase tracking reference signal (PTRS)-DMRS association - 0 or 2 bits.
beta_offset indicator - 0 or 2 bits
DMRS sequence initialization - 0 or 1 bit DCI format 1_0 may be used for fallback DCI for scheduling a PDSCH in which case the CRC may be scrambled by a C-RNTI. DCI format 1_0 in which the CRC is scrambled by the C-RNTI may include, for example, the following information.

TABLE 6

Identifier for DCI formats - [1] bit
Frequency domain resource assignment - $[\lceil \log_2(N_{RB}^{DL,\ BWP}(N_{RB}^{DL,\ BWP} + 1)/2) \rceil]$ bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator - 3 bits
PDSCH-to-HARQ feedback timing indicator - [3] bits DCI format 1_1 may be used for non-fallback DCI for scheduling a PDSCH in which case the CRC may be scrambled by a C-RNTI. DCI format 1_1 in which the CRC is scrambled by the C-RNTI may include, for example, the following information.

TABLE 7

Carrier indicator - 0 or 3 bits
Identifier for DCI formats - [1] bits
Bandwidth part indicator - 0, 1 or 2 bits
Frequency domain resource assignment
For resource allocation type 0, $\lceil N_{RB}^{DL,\ BWP}/P \rceil$ bits
For resource allocation type 1, $\lceil \log_2(N_{RB}^{DL,\ BWP}(N_{RB}^{DL,\ BWP} + 1)/2) \rceil$ bits
Time domain resource assignment -1, 2, 3, or 4 bits
VRB-to-PRB mapping - 0 or 1 bit, only for resource allocation type 1.

TABLE 7-continued 0 bit if only resource allocation type 0 is configured;
    1 bit otherwise.
    Physical resource block (PRB) bundling size indicator - 0 or 1 bit
    Rate matching indicator - 0, 1, or 2 bits
    Zero power (ZP) channel state information (CSI)-reference signal (RS) trigger - 0, 1, or 2 bits
For transport block 1:
    Modulation and coding scheme - 5 bits
    New data indicator - 1 bit
    Redundancy version - 2 bits
For transport block 2
    Modulation and coding scheme - 5 bits
    New data indicator - 1 bit
    Redundancy version - 2 bits
    HARQ process number - 4 bits
    Downlink assignment index - 0 or 2 or 4 bits
    TPC command for scheduled PUCCH - 2 bits
    PUCCH resource indicator - 3 bits
    PDSCH-to-HARQ_feedback timing indicator - 3 bits
    Antenna ports - 4, 5 or 6 bits
    TCI - 0 or 3 bits
    SRS request - 2 bits
    CBG transmission information - 0, 2, 4, 6, or 8 bits
    Code block group (CBG) flushing out information - 0 or 1 bit
    DMRS sequence initialization - 1 bit

[PDCCH: CORESET, REG, CCE, Search Space]

Hereinafter, the downlink control channel in the 5G communication system to which the disclosure can be applied will be described in more detail with reference to the drawings.

Figure 4:
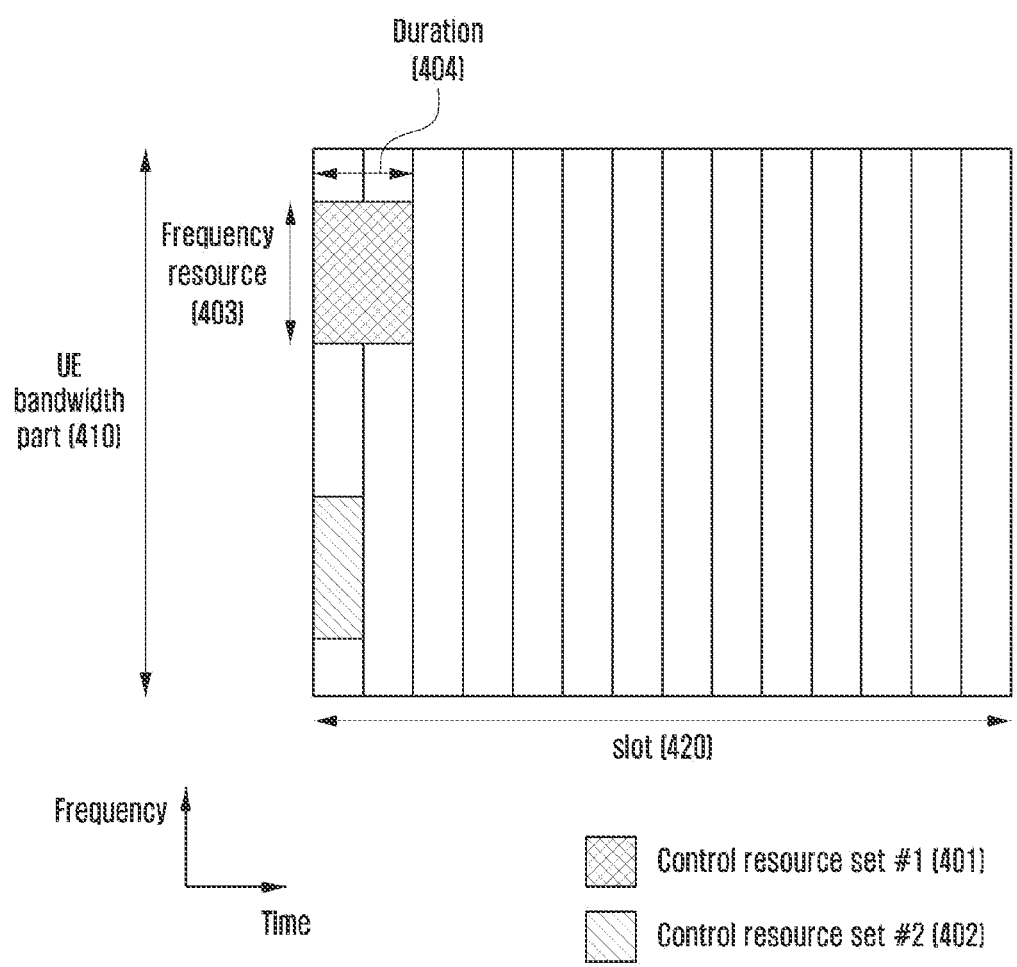
FIG. 4 illustrates an example of a configuration of a control resource set of a downlink control channel in a wireless communication system according to an embodiment of the present disclosure.

FIG. 4 illustrates an example of a configuration of a control resource set of a downlink control channel in a wireless communication system according to an embodiment of the present disclosure.

FIG. 4 illustrates an example of a control resource set (CORESET) of a downlink control channel in the 5G communication system.

FIG. 4 illustrates an example in which a UE bandwidth part 410 is configured in the frequency axis and two control resource sets (control resource set #1 401 and control resource set #2 402) are configured within one slot 420 in the time axis. The control resource sets 401 and 402 may be configured in specific frequency resources 403 within a total UE BWP 410 in the frequency axis. The control resource set may be configured as one or a plurality of OFDM symbols in the time axis, which may be defined as a control resource set duration 404. Referring to the example illustrated in FIG. 4, control resource set #1 401 may be configured as a control resource set duration of 2 symbols, and control resource set #2 402 may be configured as a control resource set duration of 1 symbol.

The resource control set in the 5G system may be configured in the UE by the BS through higher-layer signaling (for example, system information, a master information block (MIB), or radio resource control (RRC) signaling). Configuring the control resource set in the UE may mean providing information such as a control resource set identity, a frequency location of the control resource set, and a symbol length of the control resource set. For example, the following information may be included.

TABLE 8

```
ControlResourceSet ::=                 SEQUENCE {
    -- Corresponds to L1 parameter 'CORESET-ID'
    controlResourceSetId               ControlResourceSetId,
    (control resource set identity)
    frequencyDomainResources           BIT STRING (SIZE
(45)),
    (frequency axis resource allocation information)
    duration                           INTEGER
(1..maxCoReSetDuration),
    (time axis resource allocation information)
    cce-REG-MappingType
        CHOICE {
    (CCE-to-REG mapping scheme)
        interleaved
        SEQUENCE {
            reg-BundleSize
            ENUMERATED {n2, n3, n6},
        (REG bundle size)
            precoderGranularity
            ENUMERATED {sameAsREG-bundle, allContiguousRBs},
            interleaverSize
            ENUMERATED {n2, n3, n6}
                (interleaver size)
            shiftIndex
            INTEGER(0..maxNrofPhysicalResourceBlocks-1)
                OPTIONAL
            (interleaver shift)
        },
        nonInterleaved                 NULL
    },
    tci-StatesPDCCH
        SEQUENCE(SIZE (1..maxNrofTCI-StatesPDCCH)) OF
        TCI-StateId
            OPTIONAL,
    (QCL configuration information)
        tci-PresentInDCI               ENUMERATED
{enabled}
            OPTIONAL,    -- Need S
}
```

In [Table 8], tci-StatesPDCCH (simply, referred to as a transmission configuration indication (TCI) state) configuration information may include information on one or a plurality of synchronization signal (SS)/physical broadcast channel (PBCH) block indexes or channel state information reference signal (CSI-RS) indexes having the quasi co-located (QCL) relationship with a demodulation reference signal (DMRS) transmitted in the corresponding CORESET.

Figure 5:
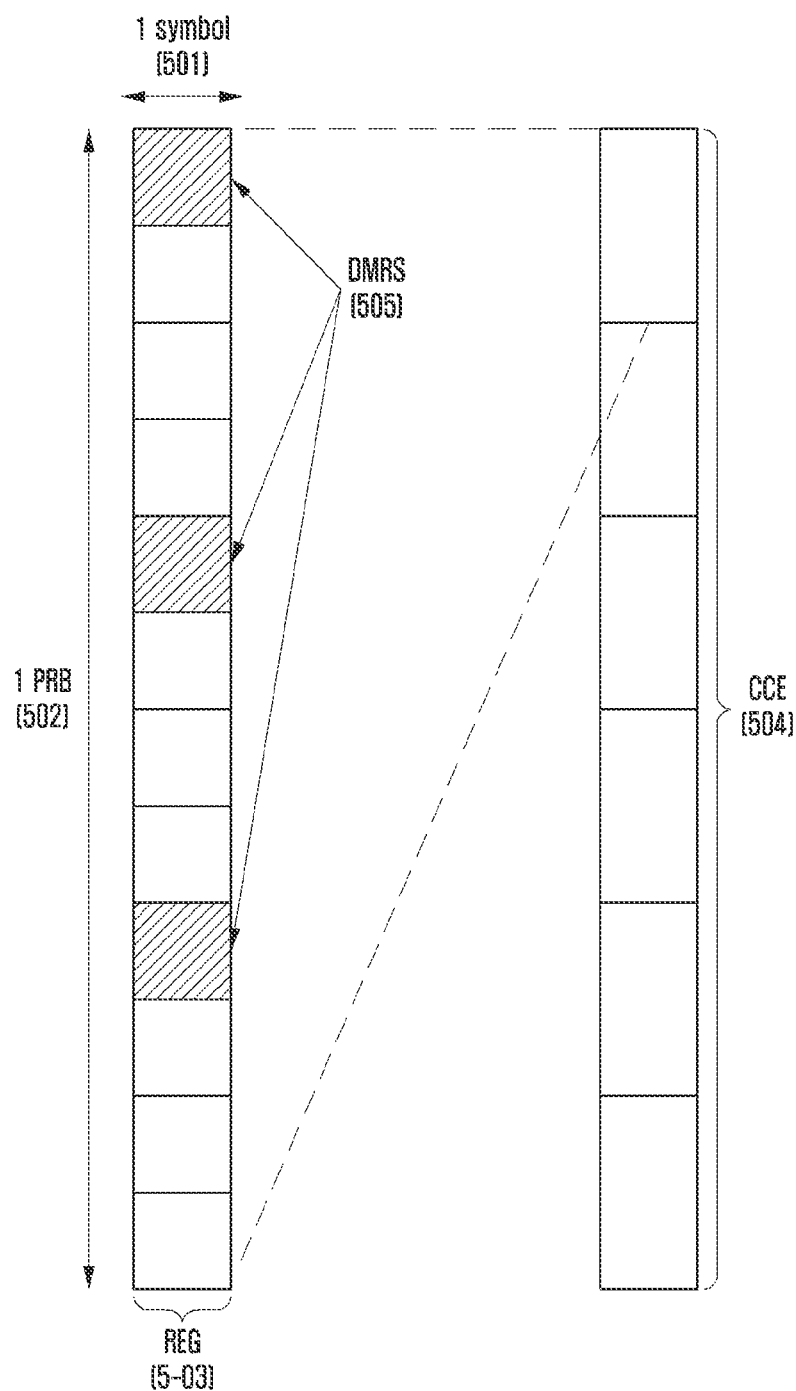
FIG. 5 illustrates a structure of a downlink control channel in a wireless communication system according to an embodiment of the present disclosure.

FIG. 5 illustrates a structure of a downlink control channel in a wireless communication system according to an embodiment of the present disclosure.

FIG. 5 shows an example of a basic unit of time and frequency resources included in the downlink control channel which can be used in the 5G system to which the disclosure can be applied. Referring to FIG. 5, the basic unit of time and frequency resources included in the control channel may be a resource element group (REG) 5-03, and the REG 5-03 may be defined as one OFDM symbol 501 in the time axis and one physical resource block (PRB) 502 in the frequency axis, that is, as 12 subcarriers. The BS may configure a downlink control channel allocation unit by concatenating the REGs 5-03.

As illustrated in FIG. 5, if the basic unit in which the downlink control channel is allocated in the 5G system is a control channel element (CCE) 504, one CCE 504 may consist of a plurality of REGs 5-03. For example, the REG 5-03 illustrated in FIG. 5 may include 12 REs and, when 1 CCE 504 includes 6 REGs 5-03, 1 CCE 504 may include 72 REs. When a downlink control resource set is configured, the corresponding resource set may include a plurality of CCEs 504, and a specific downlink control channel may be mapped to one or a plurality of CCEs 504 according to an aggregation level (AL) within the control resource set and then transmitted. CCEs 504 within the CORESET may be distinguished by numbers and the numbers of the CCEs 504 may be assigned according to a logical mapping scheme.

The basic unit of the downlink control channel illustrated in FIG. 5, that is, the REG 5-03, may include all REs to which the DCI is mapped and the region to which a DMRS 505, which is a reference signal for decoding the REs, is mapped. As illustrated in FIG. 5, 3 DMRSs 5-03 may be transmitted within 1 REG 505. The number of CCEs required to transmit the PDCCH may be 1, 2, 4, 8, or 16 according to the aggregation level (AL), and the different number of CCEs may be used to implement link adaptation of the downlink control channel. For example, if AL=L, one downlink control channel may be transmitted through L CCEs. The UE is required to detect a signal in the state in which the UE is not aware of information on the downlink control channel, and a search space indicating a set of CCEs may be used to assist such a blind decoding. The search space is a set of downlink control channel candidates including CCEs for which the UE may attempt decoding at the given aggregation level, and there are several aggregation levels at which one set of CCEs is configured by 1, 2, 4, 8, and 16 CCEs, so that the UE has a plurality of search spaces. The search space set may be defined as a set of search spaces at all configured aggregation levels.

The search spaces may be classified into a common search space and a UE-specific search space. UEs in a predetermined group or all UEs may search for a common search space of the PDCCH in order to receive cell-common control information such as dynamic scheduling for system information or paging messages. For example, PDSCH scheduling allocation information for transmission of an SIB including information on a service provider of a cell may be received by searching for a common-search space of the PDCCH. In the case of the common search space, UEs in a predetermined group or all UEs may receive the PDCCH, so that the common-search space may be defined as a set of pre-arranged CCEs. Scheduling allocation information for the UE-specific PDSCH or PUSCH may be received by searching for a UE-specific search space of the PDCCH. The UE-specific search space may be UE-specifically defined as a UE identity and a function of various system parameters.

In 5G, parameters for the PDCCH search space may be configured in the UE by the BS through higher-layer signaling (for example, SIB, MIB, or RRC signaling). For example, the BS may configure, in the UE, the number of PDCCH candidates at each aggregation level L, a monitoring period of the search space, a monitoring occasion in units of symbols within the slot for the search space, a search space type, that is, a common search space or a UE-specific search space, a combination of a DCI format and an RNTI to be monitored in the corresponding search space, and a control resource set index for monitoring the search space. For example, the following information may be included.

TABLE 9

```
SearchSpace ::=                                      SEQUENCE {
    -- Identity of the search space. SearchSpaceId = 0 identifies
the SearchSpace configured via PBCH (MIB) or ServingCellConfigCommon.
    searchSpaceId                                    SearchSpaceId,
    (search space identifier)
    controlResourceSetId                             ControlResourceSetId,
    (control resource set identifier)
    monitoringSlotPeriodicityAndOffset               CHOICE {
    (monitoring slot level period)
        sl1
        NULL,
        sl2
        INTEGER (0..1),
        sl4
        INTEGER (0..3),
        sl5
      INTEGER (0..4),
        sl8
        INTEGER (0..7),
        sl10
      INTEGER (0..9),
        sl16
      INTEGER (0..15),
        sl20
      INTEGER (0..19)
    }
    OPTIONAL,
    duration (monitoring length)                     INTEGER (2..2559)
    monitoringSymbolsWithinSlot                      BIT  STRING
(SIZE (14))
        OPTIONAL,
    (monitoring symbols in slot)
    nrofCandidates                                   SEQUENCE {
    (the number of PDCCH candidates for each aggregation level)
        aggregationLevel1
        ENUMERATED {n0, n1, n2, n3, n4, n5, n6, n8},
        aggregationLevel2
        ENUMERATED {n0, n1, n2, n3, n4, n5, n6, n8},
        aggregationLevel4
        ENUMERATED {n0, n1, n2, n3, n4, n5, n6, n8},
        aggregationLevel8
        ENUMERATED {n0, n1, n2, n3, n4, n5, n6, n8},
        aggregationLevel16
        ENUMERATED {n0, n1, n2, n3, n4, n5, n6, n8}
    },
    searchSpaceType                                  CHOICE {
    (search space type)
        -- Configures this search space as (CSS) and DCI formats to monitor.
        common
    SEQUENCE {
    (common search space)
    }
        ue-Specific
    SEQUENCE {
    (UE-specific search space)
        -- Indicates whether the UE monitors in this USS for DCI formats 0-0
and 1-0 or for formats 0-1 and 1-1.
        formats
        ENUMERATED {formats0-0-And-1-0, formats0-1-And-1-1},
        ...
    }
}
```

The BS may configure one or a plurality of search space sets in the UE according to configuration information. According to some embodiments, the BS may configure search space set 1 and search space 2 in the UE, and the configuration may be performed such that DCI format A scrambled by an X-RNTI in search space set 1 is monitored in the common search space and DCI format B scrambled by a Y-RNTI in search space set 2 is monitored in the UE-specific search space.

According to configuration information, one or a plurality of search space sets may exist in the common search space or the UE-specific search space. For example, search space set #1 and search space set #2 may be configured as common search spaces, and search space set #3 and search space set #4 may be configured as UE-specific search spaces.

In the common search space, the following combinations of DCI formats and RNTIs may be monitored. Of course, the disclosure is not limited to the following examples:

DCI format 0_0/1_0 with CRC scrambled by C-RNTI, CS-RNTI, SP-CSI-RNTI, RA-RNTI, TC-RNTI, P-RNTI, SI-RNTI;

DCI format 2_0 with CRC scrambled by SFI-RNTI;

DCI format 2_1 with CRC scrambled by INT-RNTI; and

DCI format 2_2 with CRC scrambled by TPC-PUSCH-RNTI, TPC-PUCCH-RNTI;

DCI format 2_3 with CRC scrambled by TPC-SRS-RNTI.

In the UE-specific search space, the following combinations of DCI formats and RNTIs may be monitored. Of course, the disclosure is not limited to the following examples:

DCI format 0_0/1_0 with CRC scrambled by C-RNTI, CS-RNTI, TC-RNTI; and

DCI format 1_0/1_1 with CRC scrambled by C-RNTI, CS-RNTI, TC-RNTI.

The described RNTIs may follow the following definition and use.

C-RNTI(cell RNTI): used for UE-specific PDSCH scheduling;

Temporary cell RNTI (TC-RNTI): used for UE-specific PDSCH scheduling;

Configured scheduling RNTI (CS-RNTI): used for semi-statically configured UE-specific PDSCH scheduling;

Random access RNTI (RA-RNTI): used for scheduling PDSCH at random access stage;

Paging RNTI (P-RNTI): used for scheduling PDSCH through which paging is transmitted;

System information RNTI (SI-RNTI): used for scheduling PDSCH through which system information is transmitted;

Interruption RNTI (INT-RNTI): used for indicating whether puncturing is performed for PDSCH;

Transmit Power Control for PUSCH RNTI (TPC-PUSCH-RNTI): used for indicating PUSCH power control command;

Transmit Power Control for PUCCH RNTI (TPC-PUCCH-RNTI): used for indicating PUCCH power control command; and Transmit Power Control for SRS RNTI (TPC-SRS-RNTI): used for indicating SRS power control command.

The DCI formats may follow definitions below.

TABLE 10

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In a wireless communication system (for example, 5G or NR system), a search space at an aggregation level L in a search space set s in a control resource set p of the 5G system may be expressed as shown in the [Equation 1] below:

$$L \cdot \left[ \left( Y_{p,n_{s,f}^\mu} + \left\lfloor \frac{m_{s,n_{Cl}} \cdot N_{CCE,p}}{L \cdot M_{p,s,max}^{(L)}} \right\rfloor + n_{Cl} \right) \bmod \lfloor N_{CCE,p}/L \rfloor \right] + i \quad \text{[Equation 1]}$$

L: aggregation level;

$n_{Cl}$: carrier index;

$N_{CCE,p}$: total number of CCEs existing within control resource set p;

$n_{s,f}^\mu$: slot index;

$M_{s,max}^{(L)}$: number of PDCCH candidates at aggregation level L;

$m_{s,n_{Cl}} = 0, \ldots, M_{s,max}^{(L)} - 1$: index of PDCCH candidate at aggregation level L;

i=0, ..., L−1;

$Y_{p,n_{Cl}}^\mu = (A_p \cdot Y_{p,n_{Cl}^\mu-1}) \bmod D$, $Y_{p,-1} = n_{RNTI} \neq 0$, $A_0 = 39827$, $A_1 = 39829$, $A_2 = 39839$, $D = 65537$;

$n_{RNTI}$: UE identifier; and $Y_{p,n_{s,f}^\mu}$ may correspond to 0 in the case of the common search space.

$Y_{p,n_{s,f}^\mu}$ may correspond to a value varying depending on a UE identity (a C-RNTI or an ID configured in the UE by the BS) and a time index in the case of the UE-specific search space.

In a wireless communication system (for example, 5G or NR system) according to an embodiment of the disclosure, since a plurality of search space sets may be configured as different parameters (for example, the parameters in [Table 9]) in 5G, a search space set which the UE monitors may be different each time. For example, when search space set #1 is configured on an X-slot period, search space set #2 is configured on a Y-slot period, and X and Y are different from each other, the UE may monitor all of search space set #1 and search space set #2 in a specific slot and monitor one of search space set #1 and search space set #2 in another specific slot.

[PDCCH: Span]

The UE may report a UE capability in the case in which a plurality of PDCCH monitoring locations exist within the slot and, at this time, the concept "span" may be used. The span is consecutive symbols in which the UE can monitor a PDCCH within the slot, and each PDCCH monitoring location may be within 1 span. The span may be expressed by (X, Y), in which X refers to the minimum number of symbols which may be spaced apart between first symbols of two consecutive spans and Y refers to the number of consecutive symbols for monitoring a PDCCH within 1 span. At this time, the UE may monitor the PDCCH in a section within Y symbols from the first symbol of the span within the span.

Figure 6:
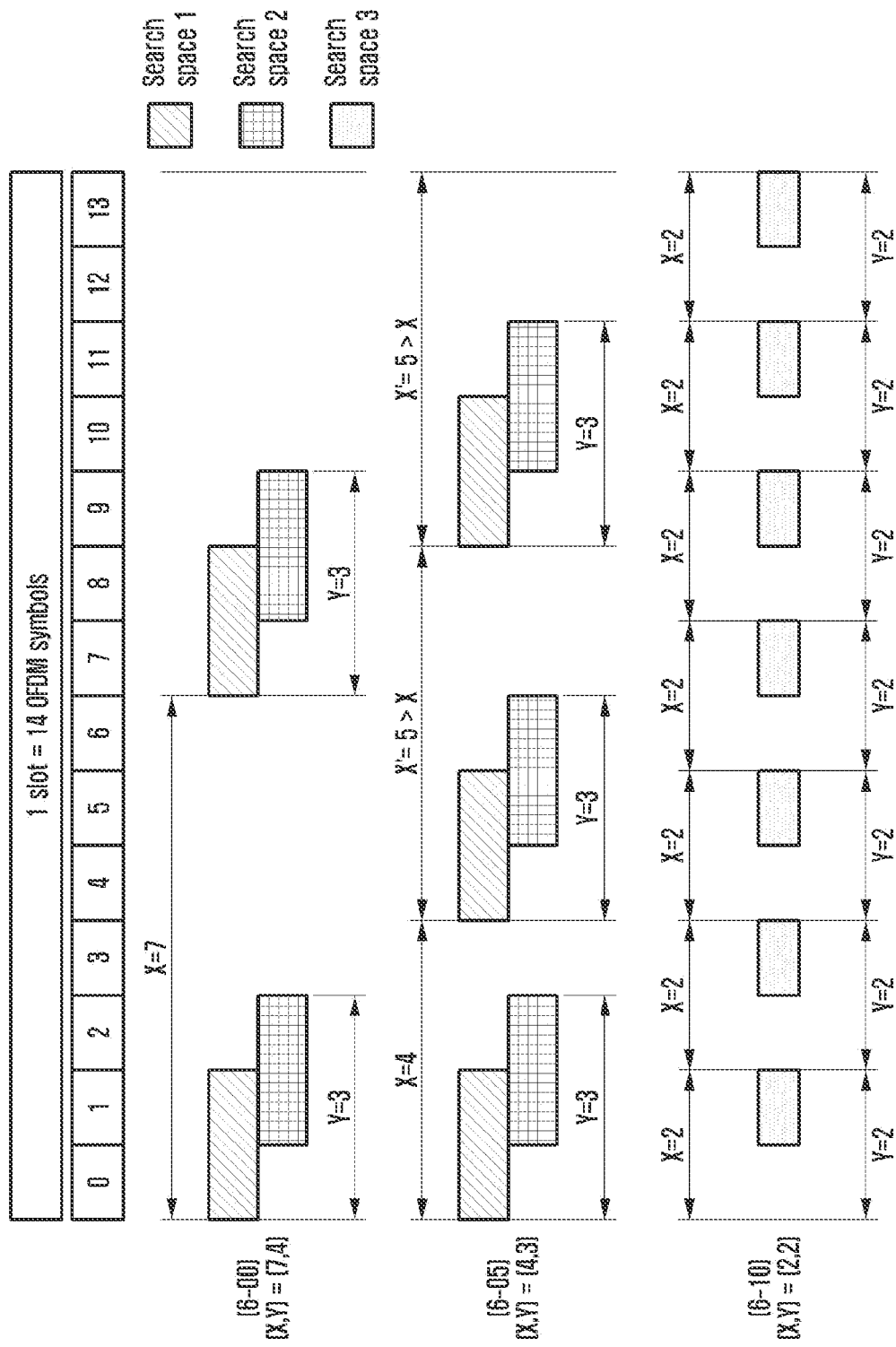
FIG. 6 illustrates the case in which the UE may have a plurality of physical downlink control channel (PDCCH) monitoring locations within the slot through the span in a wireless communication system according to an embodiment of the present disclosure.

FIG. 6 illustrates the case in which the UE may have a plurality of PDCCH monitoring locations within the slot through the span in a wireless communication system according to an embodiment of the present disclosure.

Referring to FIG. 6, the span can be expressed by (X, Y)=(7, 4), (4, 3), and (2, 2), and the three cases are expressed as (6-00), (6-05), and (6-10) in FIG. 6. For example, (6-00) indicates the case in which the number of spans which can be expressed by (7, 4) is 2 in the slot. An interval between first symbols of the 2 spans is expressed as X=7, a PDCCH monitoring location may exist within a total of Y=3 symbols from the first symbol of each span, and search spaces 1 and 2 exist within Y=3 symbols. In another example, (6-05) indicates the case in which a total number of spans which can be expressed by (4, 3) is 3 in the slot, and an interval between a second span and a third span is X'=5 symbols larger than X=4.

[PDCCH: UE Capability Report]

The slot location of the common search space and the UE-specific search space is indicated by a monitoringSymbolsWithinSlot parameter, and the symbol location within the slot is indicated by a bitmap through a monitoringSymbolsWithinSlot parameter in [Table 9]. Meanwhile, the symbol location within the slot in which the UE can perform search space monitoring may be reported to the BS through the following UE capability.

In one example of UE capability 1 (hereinafter, referred to as FG 3-1), when the number of monitoring occasions (MOs) for type 1 and type 3 common search spaces or the UE-specific search space is r within the slot, the UE capability is a capability to monitor the corresponding MO when the corresponding MO is located within first 3 symbols in the slot as shown in [Table 11]. The UE capability is a mandatory capability which all UEs supporting NR may support and whether to support the capability is not explicitly reported to the BS.

In one example of UE capability 2 (hereinafter, referred to as FG 3-2), when the number of monitoring occasions (MOs) for the common search space or the UE-specific search space is one within the slot, the UE capability is a capability to perform monitoring regardless of the start symbol location of the corresponding MO as illustrated in [Table 12]. The UE capability can be optionally supported by the UE, and whether to support the capability is explicitly reported to the BS.

TABLE 12

| Index | Feature group | Components | Field name in TS 38.331 [2] |
|---|---|---|---|
| 3-2 | PDCCH monitoring on any span of up to 3 consecutive OFDM symbols of a slot | For a given UE, all search space configurations are within the same span of 3 consecutive OFDM symbols in the slot | pdcchMonitoringSingleOccasion |

TABLE 11

| Index | Feature group | Components | Field name in TS 38.331 [2] |
|---|---|---|---|
| 3-1 | Basic DL control channel | 1) One configured CORESET per BWP per cell in addition to CORESET0-<br>CORESET resource allocation of 6RB bit-map and duration of 1-3 OFDM symbols for FR1<br>For type 1 CSS without dedicated RRC configuration and for type 0, 0A, and 2 CSSs, CORESET resource allocation of 6RB bit-map and duration 1-3 OFDM symbols for FR2<br>For type 1 CSS with dedicated RRC configuration and for type 3 CSS, UE specific SS, CORESET resource allocation of 6RB bit-map and duration 1-2 OFDM symbols for FR2<br>REG-bundle sizes of 2/3 RBs or 6 RBs<br>Interleaved and non-interleaved CCE-to-REG mapping<br>Precoder-granularity of REG-bundle size<br>PDCCH DMRS scrambling determination<br>TCI state(s) for a CORESET configuration<br>2) CSS and UE-SS configurations for unicast PDCCH transmission per BWP per cell<br>PDCCH aggregation levels 1, 2, 4, 8, 16<br>UP to 3 search space sets in a slot for a scheduled SCell per BWP<br>This search space limit is before applying all dropping rules.<br>For type 1 CSS with dedicated RRC configuration, type 3 CSS, and UE-SS, the monitoring occasion is within the first 3 OFDM symbols of a slot<br>For type 1 CSS without dedicated RRC configuration and for type 0, 0A, and 2 CSS, the monitoring occasion can be any OFDM symbol(s) of a slot, with the monitoring occasions for any of Type 1- CSS without dedicated RRC configuration, or Types 0, 0A, or 2 CSS configurations within a single span of three consecutive OFDM symbols within a slot<br>3) Monitoring DCI formats 0_0, 1_0, 0_1, 1_1<br>4) Number of PDCCH blind decodes per slot with a given SCS follows Case 1-1 table<br>5) Processing one unicast DCI scheduling DL and one unicast DCI scheduling UL per slot per scheduled CC for FDD<br>6) Processing one unicast DCI scheduling DL and 2 unicast DCI scheduling UL per slot per scheduled CC for TDD | n/a |

In one example of UE capability 3 (hereinafter, referred to as FG 3-5, 3-5a, or 3-3b), when the number of monitoring occasions (MOs) for the common search space or the UE-specific search space is plural within the slot, the UE capability indicates a pattern of MOs which the UE can monitor as shown in [Table 13]. The pattern includes an interval X between start symbols of different MOs and a maximum symbol length Y of one MO. A combination of (X, Y) supported by the UE may be one or more of ((2, 2), (4, 3), (7, 3)). The UE capability can be optionally supported by the UE, and whether to support the capability and the combination (X, Y) are explicitly reported to the BS.

TABLE 13

| Index | Feature group | Components | Field name in TS 38.331 [2] |
|---|---|---|---|
| 3-5 | For type 1 CSS with dedicated RRC configuration, type 3 CSS, and UE-SS, monitoring occasion can be any OFDM symbol(s) of a slot for Case 2 | For type 1 CSS with dedicated RRC configuration, type 3 CSS, and UE-SS, monitoring occasion can be any OFDM symbol(s) of a slot for Case 2 | pdcch-MonitoringAnyOccasions {3-5. withoutDCI-Gap 3-5a. withDCI-Gap} |
| 3-5a | For type 1 CSS with dedicated RRC configuration, type 3 CSS, and UE-SS, monitoring occasion can be any OFDM symbol(s) of a slot for Case 2 with a DCI gap | For type 1 CSS with dedicated RRC configuration, type 3 CSS and UE-SS, monitoring occasion can be any OFDM symbol(s) of a slot for Case 2, with minimum time separation (including the cross-slot boundary case) between two DL unicast DCIs, between two UL unicast DCIs, or between a DL and an UL unicast DCI in different monitoring occasions where at least one of them is not the monitoring occasions of FG-3-1, for a same UE as 2OFDM symbols for 15 kHz 4OFDM symbols for 30 kHz 7OFDM symbols for 60 kHz with NCP 11OFDM symbols for 120 kHz Up to one unicast DL DCI and up to one unicast UL DCI in a monitoring occasion except for the monitoring occasions of FG 3-1. In addition for TDD the minimum separation between the first two UL unicast DCIs within the first 3 OFDM symbols of a slot can be zero OFDM symbols. | |
| 3-5b | All PDCCH monitoring occasion can be any OFDM symbol(s) of a slot for Case 2 with a span gap | PDCCH monitoring occasions of FG-3-1, plus additional PDCCH monitoring occasion (s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) | |

TABLE 13-continued

| Index | Feature group | Components | Field name in TS 38.331 [2] |
|---|---|---|---|
| | | limit must be satisfied by all spans. Every monitoring occasion is fully contained in one span. In order to determine a suitable span pattern, first a bitmap b(l), 0 <= l <= 13 is generated, where b(l) = 1 if symbol l of any slot is part of a monitoring occasion, b(l) = 0 otherwise. The first span in the span pattern begins at the smallest l for which b(l) = 1. The next span in the span pattern begins at the smallest l not included in the previous span(s) for which b(l) = 1. The span duration is max{maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary. For the set of monitoring occasions which are within the same span: Processing one unicast DCI scheduling DL and one unicast DCI scheduling UL per scheduled CC across this set of monitoring occasions for FDD Processing one unicast DCI scheduling DL and two unicast DCI scheduling UL per scheduled CC across this set of monitoring occasions for TDD Processing two unicast DCI scheduling DL and one unicast DCI scheduling UL per scheduled CC across this set of monitoring occasions for TDD The number of different start symbol indices of spans for all PDCCH monitoring occasions per slot, including PDCCH monitoring occasions of FG-3-1, is no more than floor(14/X) (X is minimum among values reported by UE). The number of different start symbol indices of PDCCH monitoring occasions per slot including PDCCH monitoring occasions of FG-3-1, is no more than 7. The number of different start symbol indices of PDCCH monitoring occasions per half-slot including PDCCH monitoring occasions of FG-3-1 is no more than 4 in SCell. | |

The UE may report whether to support UE capability 2 and/or UE capability 3 and a relevant parameter to the BS. The BS may allocate time axis resources for the common search space and the UE-specific search space on the basis of the UE capability. In the resource allocation, the BS may not place the MO at the location at which the UE cannot perform monitoring.

[QCL, TCI State]

In the wireless communication system, one or more different antenna ports (or replaced with one or more channels, signals, and combinations thereof, but commonly referred to as different antenna ports for convenience in the following description of the disclosure) may be associated by a quasi co-location (QCL) configuration shown in [Table 14] below. The TCI state is to inform of a QCL relation between a PDCCH (or a PDCCH DMRS) and another RS or channel, and a reference antenna port A (reference RS #A) and another purpose antenna port B (target RS #B) which are quasi co-located (QCLed) means that the UE is allowed to apply some or all of large-scale channel parameters estimated in the antenna port A to channel measurement from the antenna port B. The QCL is required to associate different parameters according to conditions such as 1) time tracking influenced by average delay and delay spread, 2) frequency tracking influenced by Doppler shift and Doppler spread, 3) radio resource management (RRM) influenced by an average gain, and 4) beam management (BM) influenced by a spatial parameter. Accordingly, NR supports four types of QCL relations shown in [Table 14] below.

TABLE 14

| QCL type | Large-scale characteristics |
| --- | --- |
| A | Doppler shift, Doppler spread, average delay, delay spread |
| B | Doppler shift, Doppler spread |
| C | Doppler shift, average delay |
| D | Spatial Rx parameter |

A spatial RX parameter may refer to some or all of various parameters such as angle of arrival (AoA), power angular spectrum (PAS) of AoA, angle of departure (AoD), PAS of AoD, transmit/receive channel correlation, transmit/receive beamforming, and spatial channel correlation.

The QCL relation can be configured in the UE through RRC parameter TCI-state and QCL-Info as shown in [Table 15] below. Referring to [Table 15] below, the BS may configure one or more TCI states in the UE and inform the UE of a maximum of two QCL relations (qcl-Type 1 and qcl-Type 2) for an RS referring to an ID of the TCI state, that is, a target RS. At this time, each piece of the QCL information (QCL-Info) included in the TCI state includes a serving cell index and a BWP index of a reference RS indicated by the corresponding QCL information, a type and an ID of the reference RS, and the QCL type as shown in [Table 14] above.

TABLE 15

```
TCI-State ::=                SEQUENCE {
   tci-StateId              TCI-StateId,
   (ID of corresponding TCI state)
   qcl-Type1                QCL-Info,
   (QCL information of first reference RS of RS (target RS)
referring to corresponding TCI state ID)
   qcl-Type2                QCL-Info
      OPTIONAL,   -- Need R
   (QCL information of second reference RS of RS (target
```

TABLE 15-continued

```
RS) referring to corresponding TCI state ID)
   ...
}
QCL-Info ::=                SEQUENCE {
   cell                     ServCellIndex
      OPTIONAL,   -- Need R
   (serving cell index of reference RS indicated by corresponding
QCL information)
   bwp-Id                   BWP-Id
      OPTIONAL,   -- Cond CSI-RS-Indicated
   (BWP index of reference RS indicated by corresponding QCL
information)
   referenceSignal          CHOICE {
      csi-rs                NZP-
CSI-RS-ResourceId,
      ssb
SSB-Index
      (one of CSI-RS ID or SSB ID indicated by corresponding
QCL information)
   },
   qcl-Type                 ENUMERATED {typeA,
typeB, typeC, typeD},
   ...
}
```

Figure 7:
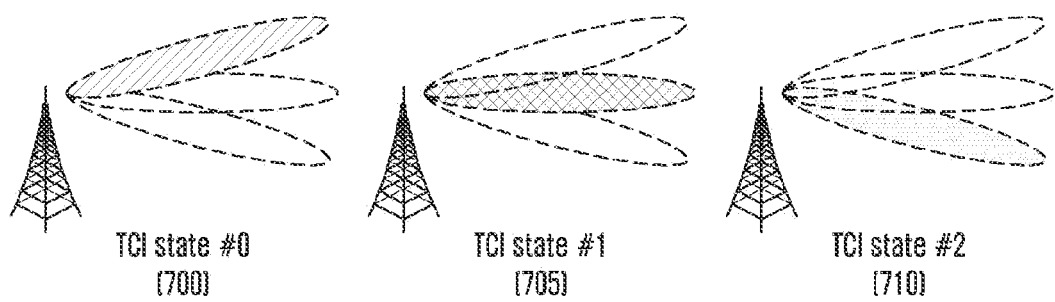
FIG. 7 illustrates an example of BS beam allocation according to a TCI state configuration in a wireless communication system according to an embodiment of the present disclosure.

FIG. 7 illustrates an example of BS beam allocation according to a TCI state configuration in a wireless communication system according to an embodiment of the present disclosure.

Referring to FIG. 7, the BS may transmit information on N different beams to the UE through N different TCI states. For example, in the case of N=3 as illustrated in FIG. 7, the BS may make qcl-Type2 parameters included in three TCI states 700, 705, and 710 associated with CSI-RSs or SSBs corresponding to different beams and configured as QCL type D and may notify that antenna ports referring to the different TCI states 700, 705, and 710 are associated with different spatial Rx parameters, that is, different beams.

[Table 16] to [Table 20] below show valid TCI state configurations according to the target antenna port type.

[Table 16] shows valid TCI state configurations when the target antenna port is a CSI-RS for tracking (TRS). The TRS is an NZP CSI-RS for which a repetition parameter is not configured and trs-Info is configured as true among CSI-RSs. The third configuration in [Table 16] may be used for an aperiodic TRS.

TABLE 16

| Valid TCI state configuration | DL RS 1 | qcl-Type 1 | DL RS 2 (if configured) | qcl-Type 2 (if configured) |
| --- | --- | --- | --- | --- |
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

[Table 17] shows valid TCI state configurations when the target antenna port is a CSI-RS for CSI. The CSI-RS for CSI is an NZP CSI-RS for which a parameter (for example, a repetition parameter) indicating repetition is not configured and trs-Info is not configured as true among the CSI-RSs.

TABLE 17

| Valid TCI state configuration | DL RS 1 | qcl-Type 1 | DL RS 2 (if configured) | qcl-Type 2 (if configured) |
| --- | --- | --- | --- | --- |
| 1 | TRS | QCL-TypeA | SSB | QCL-TypeD |
| 2 | TRS | QCL-TypeA | CSI-RS for BM | QCL-TypeD |

TABLE 17-continued

| Valid TCI state configuration | DL RS 1 | qcl-Type 1 | DL RS 2 (if configured) | qcl-Type 2 (if configured) |
|---|---|---|---|---|
| 3 | TRS | QCL-TypeA | TRS(same as DL RS1) | QCL-TypeD |
| 4 | TRS | QCL-TypeB | | |

[Table 18] shows valid TCI state configurations when the target antenna port is a CSI-RS for beam management (BM) (that is, the same meaning as a CSI-RS for L1 RSRP reporting). The CSI-RS for BM is an NZP CSI-RS for which a repetition parameter is configured to have a value of on or off and trs-Info is not configured as true.

TABLE 18

| Valid TCI state configuration | DL RS 1 | qcl-Type 1 | DL RS 2 (if configured) | qcl-Type 2 (if configured) |
|---|---|---|---|---|
| 1 | TRS | QCL-TypeA | TRS(same as DL RS1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

[Table 19] shows valid TCI state configurations when the target antenna port is a PDCCH DMRS.

TABLE 19

| Valid TCI state configuration | DL RS 1 | qcl-Type 1 | DL RS 2 (if configured) | qcl-Type 2 (if configured) |
|---|---|---|---|---|
| 1 | TRS | QCL-TypeA | TRS(same as DL RS1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

[Table 20] shows valid TCI state configurations when the target antenna port is a PDSCH DMRS.

TABLE 20

| Valid TCI state configuration | DL RS 1 | qcl-Type 1 | DL RS 2 (if configured) | qcl-Type 2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In a representative QCL configuration method by [Table 16] to [Table 20], the target antenna port and the reference antenna port for each step are configured and operated as "SSB"->"TRS"->"CSI-RS for CSI, CSI-RS for BM, PDCCH DMRS, or PDSCH DMRS." Accordingly, it is possible to assist the UE in the reception operation by associating statistical characteristics which can be measured from the SSB and the TRS with respective antenna ports.

[PDCCH: DCI-Related]

Specifically, a combination of TCI states which can be applied to a PDCCH DMRS antenna port is as shown in [Table 21] below. In [Table 21], a fourth row is a combination assumed by the UE before the RRC configuration, and configurations after RRC are impossible.

TABLE 21

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS(BM) | QCL-TypeD |
| 3 | CSI-RS(CSI) | QCL-TypeA | | |
| 4 | SS/PBCH Block | QCL-TypeA | SS/PBCH Block | QCL-TypeD |

Figure 8:
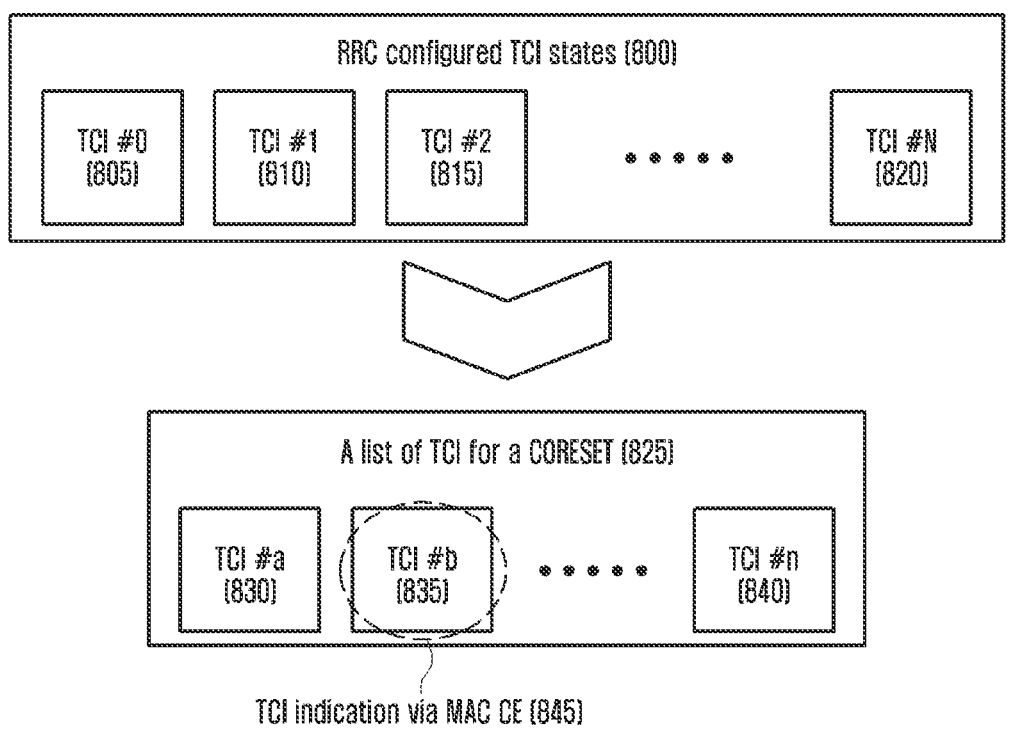
FIG. 8 illustrates an example of a method of allocating TCI states for a PDCCH in a wireless communication system according to an embodiment of the present disclosure.

FIG. 8 illustrates an example of a method of allocating TCI states for a PDCCH in a wireless communication system according to an embodiment of the present disclosure;

In a wireless communication system (for example, 5G or NR system) according to an embodiment of the disclosure, the hierarchical signaling method as illustrated in FIG. 8 for dynamical allocation of PDCCH beams is supported.

Referring to FIG. 8, the BS may configure N TCI states 805, 810, . . . , 820 in the UE through RRC signaling 800 and may configure some thereof as TCI states for the CORESET in operation as indicated by reference numeral 825. Thereafter, the BS may indicate one of the TCI states 830, 835, and 840 for the CORESET to the UE through MAC CE signaling as indicated by reference numeral 845. Thereafter, the UE receives a PDCCH on the basis of beam information included in the TCI state indicated by the MAC CE signaling.

Figure 9:
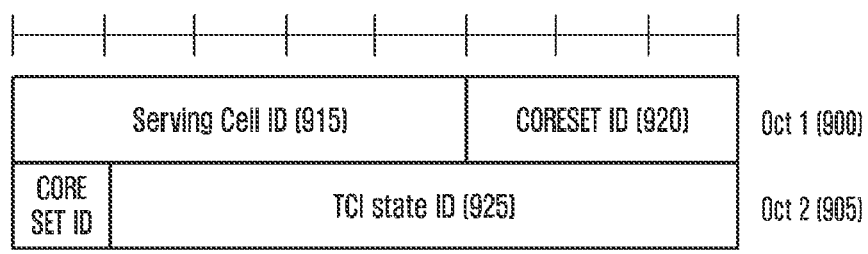
FIG. 9 illustrates a TCI indication MAC CE indication signaling structure for a PDCCH DMRS in a wireless communication system according to an embodiment of the present disclosure.

FIG. 9 illustrates a TCI indication MAC CE indication signaling structure for a PDCCH DMRS in a wireless communication system according to an embodiment of the present disclosure.

Referring to FIG. 9, TCI indication MAC CE signaling for the PDCCH DMRS may consist of 2 bytes (16 bits), and may include a serving cell ID 915 of 5 bits, a CORESET ID 920 of 4 bits, and a TCI state ID 925 of 7 bits.

Figure 10:
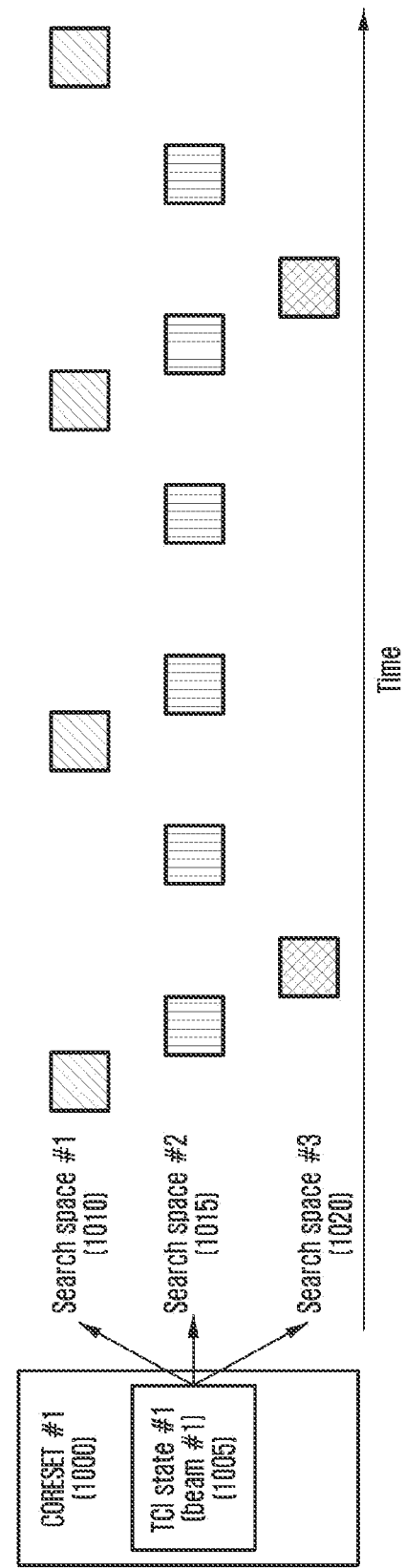
FIG. 10 illustrates an example of a CORESET and search space beam configuration in a wireless communication system according to an embodiment of the present disclosure.

FIG. 10 illustrates an example of a CORESET and search space beam configuration in a wireless communication system according to an embodiment of the present disclosure.

Referring to FIG. 10, the BS may indicate one state 1005 (for example, TCI state #1) in a TCI state list included in the configuration for a CORESET 1000 (for example, CORESET #1) through MAC CE signaling. Thereafter, before another TCI state is indicated to the corresponding CORSET through other MAC CE signaling, the UE considers that the same QCL information (beam #1) is applied to one or more search spaces 1010, 1015, and 1020 associated with the CORESET 1000. The PDCCH beam allocation method has difficulty in indicating a beam change earlier than a MAC CE signaling delay and has a disadvantage of applying the same beam to all CORESETs regardless of a search space characteristic, and thus makes flexible PDCCH beam operation difficult. Hereinafter, embodiments of the disclosure provide a more flexible PDCCH beam configuration and operation method. In the following description of embodiments of the disclosure, several examples are provided for convenience of description, but the examples are not exclusive and can be combined and applied according to a circumstance.

The BS may configure one or a plurality of TCI states for a specific CORESET in the UE and activate one of the configured TCI states through a MAC CE activation command. For example, {TCI state #0, TCI state #1, TCI state #2} are configured in CORESET #1 as the TCI states, and the BS may transmit a command for activating TCI state #0 assumed as the TCI state for CORESET #1 to the UE through the MAC CE. The UE may correctly receive a DMRS of the corresponding CORESET on the basis of QCL information within the activated TCI state by means of the activation command for the TCI state received through the MAC CE.

When the UE does not receive the MAC CE activation command for the TCI state of CORESET #0 for the CORESET (CORESET #0) having an index of 0, the UE may assume that a DMRS transmitted in CORESET #0 is QCLed with an SS/PBCH block identified in an initial access process or a non-contention-based random access process which is not triggered by a PDCCH command.

When the UE does not receive a configuration of the TCI state for CORESET #X or the UE receives the configuration of one or more TCI states but does not receive a MAC CE activation command for activating one of the TCI states for the CORESET (CORESET #X) having an index configured as a value other than 0, the UE may assume that a DMRS transmitted in CORESET #X is QCLed with an SS/PBCH block identified in an initial access process.

[PDCCH: QCL Prioritization Rule-Related]

Hereinafter, an operation for determining a QCL priority for a PDCCH is described in detail.

When a plurality of control resource sets operating in a signal cell or by carrier aggregation within a band and existing within an activated BWP within one or a plurality of cells overlap in the time while having different or the same QCL-TypeD characteristic in a specific PDCCH monitoring section, the UE may select a specific control resource set according to the QCL priority determination operation and monitor control resource sets having the same QCL-Type D characteristic as the corresponding control resource set. That is, a plurality of control resource sets overlap in the time, only one QCL-TypeD characteristic may be received. At this time, a reference for determining the QCL priority is described below.

In one example of Reference 1, a control resource set connected to a common search space having the lowest index within a cell corresponding to the lowest index among cells includes the common search space.

In one example of Reference 2, a control resource set connected to a UE-specific search space having the lowest index within a cell corresponding to the lowest index among cells includes the UE-specific search space.

As described above, when the corresponding references are not satisfied, the following reference is applied. For example, when control resource sets overlap in the time in a specific PDCCH monitoring section, if all control resource sets are connected to a UE-specific search space without being connected to a common search space, that is, if reference 1 is not satisfied, the UE may omit applying of reference 1 and apply reference 2.

When the control resource set is selected by the references, the UE may additionally consider two matters below for QCL information configured in the control resource set. First, when control resource set 1 has CSI-RS 1 as a reference signal having the relation of QCL-TypeD, a reference signal having the relation of QCL-TypeD with CSI-RS 1 is SSB1, and a reference signal having the relation of QCL-TypeD with control resource set 2 is SSB1, the UE may consider that two control resource sets 1 and 2 have different QCL-TypeD characteristics. Second, when control resource set 1 has CSI-RS 1 configured in cell 1 as a reference signal having the relation of QCL-TypeD, a reference signal having the relation of QCL-TypeD with CSI-RS1 is SSB1, control resource set 2 has CSI-RS 2 configured in cell 2 as a reference signal having the relation of QCL-TypeD, and a reference signal having the relation of QCL-TypeD with CSI-RS 2 is SSB 1, the UE may consider that the two control resource sets have the same QCL-TypeD characteristic.

Figure 11:
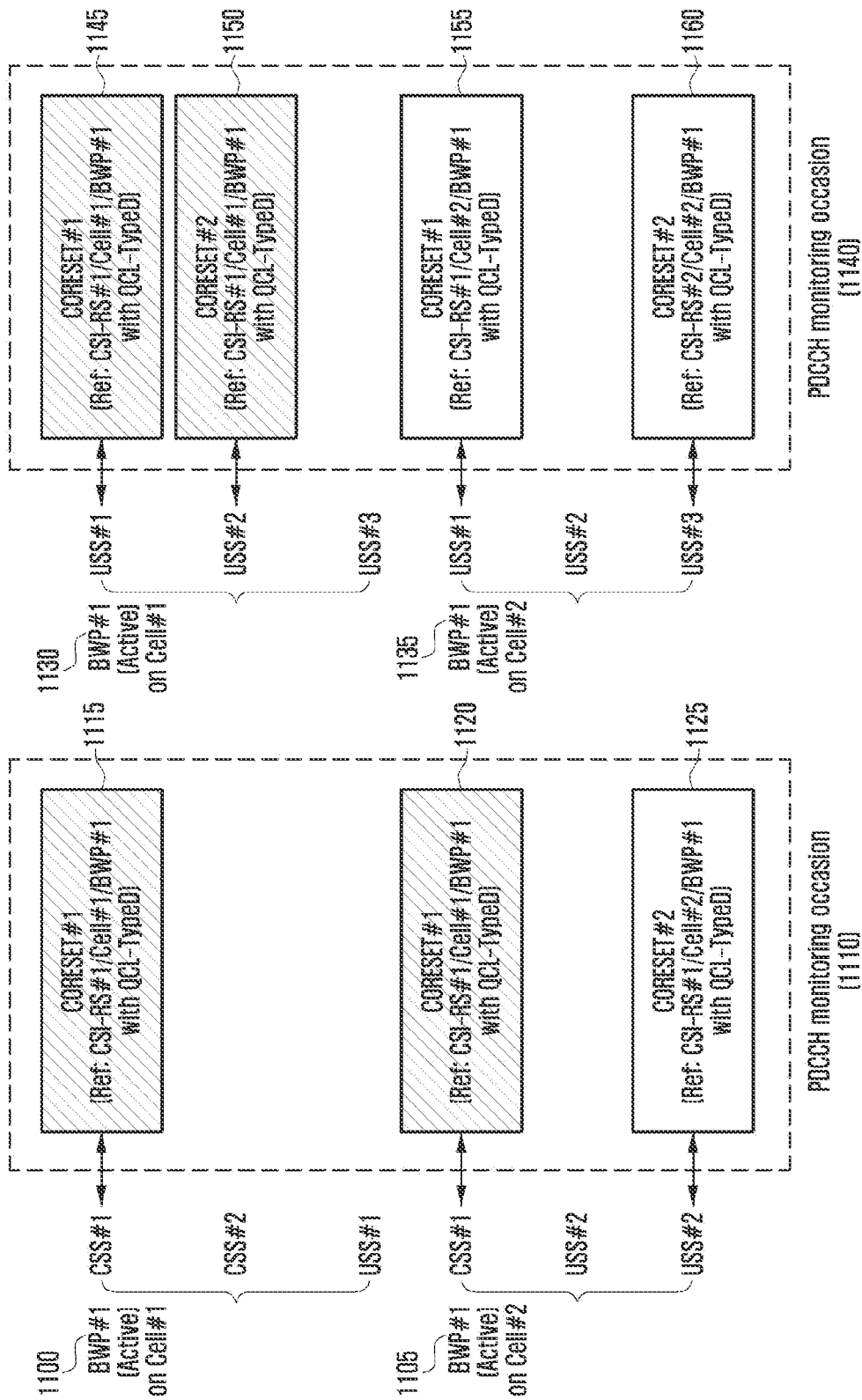
FIG. 11 illustrates a method of selecting a control resource set which can be received in consideration of a priority when the UE receives a downlink control channel in a wireless communication system according to an embodiment of the present disclosure.

FIG. 11 illustrates a method of selecting a control resource set which can be received in consideration of a priority when the UE receives a downlink control channel in a wireless communication system according to an embodiment of the present disclosure.

For example, the UE may receive a configuration of reception of a plurality of control resource sets overlapping in the time in a specific PDCCH monitoring occasion 1110, and the plurality of control resource sets may be connected to a common search space or a UE-specific search space for a plurality of cells. In the corresponding PDCCH monitoring occasion, a first control resource set 1115 connected to a first common search space may exist within a first BWP 1100 of a first cell and a first control resource set 1120 connected to a first common search space and a second control resource set 1125 connected to a second UE-specific search space may exist within a first BWP 1105 of a second cell. The control resource sets 1115 and 1110 may have the relation of QCL-TypeD with a first CSI-RS resource configured within the first BWP of the first cell, and the control resource set 1125 may have the relation of QCL-TypeD with the first CSI-RS resource configured within the first BWP of the second cell. Accordingly, when reference 1 is applied to the corresponding PDCCH monitoring occasion 1110, all other control resource sets having the reference signal of QCL-TypeD which is the same as the first control resource set 1115 may be received.

Accordingly, the UE may receive the control resource sets 1115 and 1120 in the corresponding PDCCH monitoring occasion 1110. In another example, the UE may receive a configuration of reception of a plurality of control resource sets overlapping in the time in a specific PDCCH monitoring occasion 1140, and the plurality of control resource sets may be connected to a common search space or a UE-specific search space for a plurality of cells. In the corresponding PDCCH monitoring occasion, a first control resource set 1145 connected to a first UE-specific search space and a second control resource set 1150 connected to a second UE-specific search space may exist within a first BWP 1130 of a first cell and a first control resource set 1155 connected to a first UE-specific search space and a second control resource set 1160 connected to a third UE-specific search space may exist within a first BWP 1135 of a second cell. The control resource sets 1145 and 1150 may have the relation of QCL-TypeD with a first CSI-RS resource configured within the first BWP of the first cell, the control resource set 1155 may have the relation of QCL-TypeD with the first CSI-RS resource configured within the first BWP of the second cell, and the control resource set 1160 may have the relation with QCL-TypeD with a second CSI-RES resource configured within the first BWP of the second cell.

However, when reference 1 is applied to the corresponding PDCCH monitoring occasion 1140, there is no common search space, and thus reference 2 which is the following reference may be applied. When reference 2 is applied to the corresponding PDCCH monitoring occasion 1140, all other control resource sets having the reference signal of QCL-TypeD which is the same as the control resource set 1115 may be received. Accordingly, the UE may receive the control resource sets 1145 and 1150 in the corresponding PDCCH monitoring occasion 1140.

[Rate Matching/Puncturing-Related]

In the following description, a rate matching operation and a puncturing operation are described in detail.

When a time at which a predetermined symbol sequence A is transmitted and frequency resources A overlap a predetermined time and frequency resources B, a rate matching or puncturing operation may be considered as a transmission/reception operation of a channel A considering of resources C in an area in which the resources A and the resources B overlap each other. A detailed operation may follow the content below.

[Rate Matching Operation]

In one example, the BS may map and transmit the channel A only for the remaining resource areas except for the resources C corresponding to the area in which the entire resources A for transmitting the symbol sequence A to the UE overlap the resources B. For example, when the symbol sequence A includes {symbol #1, symbol #2, symbol #3, symbol #4}, the resources A are {resource #1, resource #2, resource #3, resource #4}, and the resources B are {resource #3, resource #5}, the BS may sequentially map the symbol sequence A to the remaining resources {resource #1, resource #2, resource #4} except for {resource #3} corresponding to the resources C among the resources A and transmit the same. As a result, the BS may map the symbol sequence {symbol #1, symbol #2, symbol #3} to {resource #1, resource #2, resource #4}, respectively, and transmit the same.

The UE may determine the resources A and the resources B on the basis of scheduling information for the symbol sequence A from the BS and determine the resources C in the area in which the resources A and the resources B overlap each other. The UE may receive the symbol sequence A on the basis of the assumption that the symbol sequence A is mapped to and transmitted in the remaining areas except for the resources C among the entire resources A. For example, when the symbol sequence A includes {symbol #1, symbol #2, symbol #3, symbol #4}, the resources A are {resource #1, resource #2, resource #3, resource #4}, and the resources B are {resource #3, resource #5}, the UE may receive the symbol sequence A on the basis of the assumption that the symbol sequence A is sequentially mapped to the remaining resources {resource #1, resource #2, resource #4} except for {resource #3} corresponding to the resources C among the resources A. As a result, the UE may perform a series of reception operation later on the basis of the assumption that the symbol sequence {symbol #1, symbol #2, symbol #3} is mapped to and transmitted in {resource #1, resource #2, resource #4}, respectively.

[Puncturing Operation]

When there are resources C corresponding to an area in which the entire resources A for transmitting the symbol sequence A to the UE overlap the resources B, the BS may map the symbol sequence A to all the resources A, but may perform transmission only in the remaining resource areas except for the resources C among the resources A without transmission in a resource area corresponding to the resources C. For example, when the symbol sequence A includes {symbol #1, symbol #2, symbol #3, symbol #4}, the resources A are {resource #1, resource #2, resource #3, resource #4}, and the resources B are {resource #3, resource #5}, the BS may map the symbol sequence A includes {symbol #1, symbol #2, symbol #3, symbol #4} to the resources A {resource #1, resource #2, resource #3, resource #4}, respectively, and transmit only the symbol sequence {symbol #1, symbol #2, symbol #4} corresponding to the remaining resources {resource #1, resource #2, resource #4} except for {resource #3} corresponding to the resources C among the resources A without transmission of {symbol #3} mapped to {resource #3} corresponding to the resources C. As a result, the BS may map the symbol sequence {symbol #1, symbol #2, symbol #4} to {resource #1, resource #2, resource #4}, respectively, and transmit the same.

The UE may determine the resources A and the resources B on the basis of scheduling information for the symbol sequence A from the BS and determine the resources C in the area in which the resources A and the resources B overlap each other. The UE may receive the symbol sequence A on the basis of the assumption that the symbol sequence A is mapped to the entire resources A but is transmitted only in the remaining areas except for the resources C among the resources A. For example, when the symbol sequence A includes {symbol #1, symbol #2, symbol #3, symbol #4}, the resources A are {resource #1, resource #2, resource #3, resource #4}, and the resources B are {resource #3, resource #5}, the UE may assume that the symbol sequence A {symbol #1, symbol #2, symbol #3, symbol #4} is mapped to the resources A {resource #1, resource #2, resource #3, resource #4}, respectively, but {symbol #3} mapped to {resource #3} corresponding to the resources C is not transmitted, and may perform reception on the basis the assumption that the symbol sequence {symbol #1, symbol #2, symbol #4} corresponding to the remaining resources {resource #1, resource #2, resource #4} except for {resource #3} corresponding to the resources C among the resources A is mapped and transmitted. As a result, the UE may perform a series of reception operations later on the basis of the assumption that the symbol sequences {symbol #1, symbol #2, symbol #3} are mapped to and transmitted in {resource #1, resource #2, resource #4}, respectively.

In the following description, a method of configuring rate matching resources for the purpose of rate matching in the 5G communication system is described. Rate matching refers to the control of the size of a signal in consideration of the amount of resources available for transmitting the signal. For example, rate matching of a data channel may mean mapping data channels to specific time and frequency resource domains without transmission, so as to control the size of data according thereto.

Figure 12:
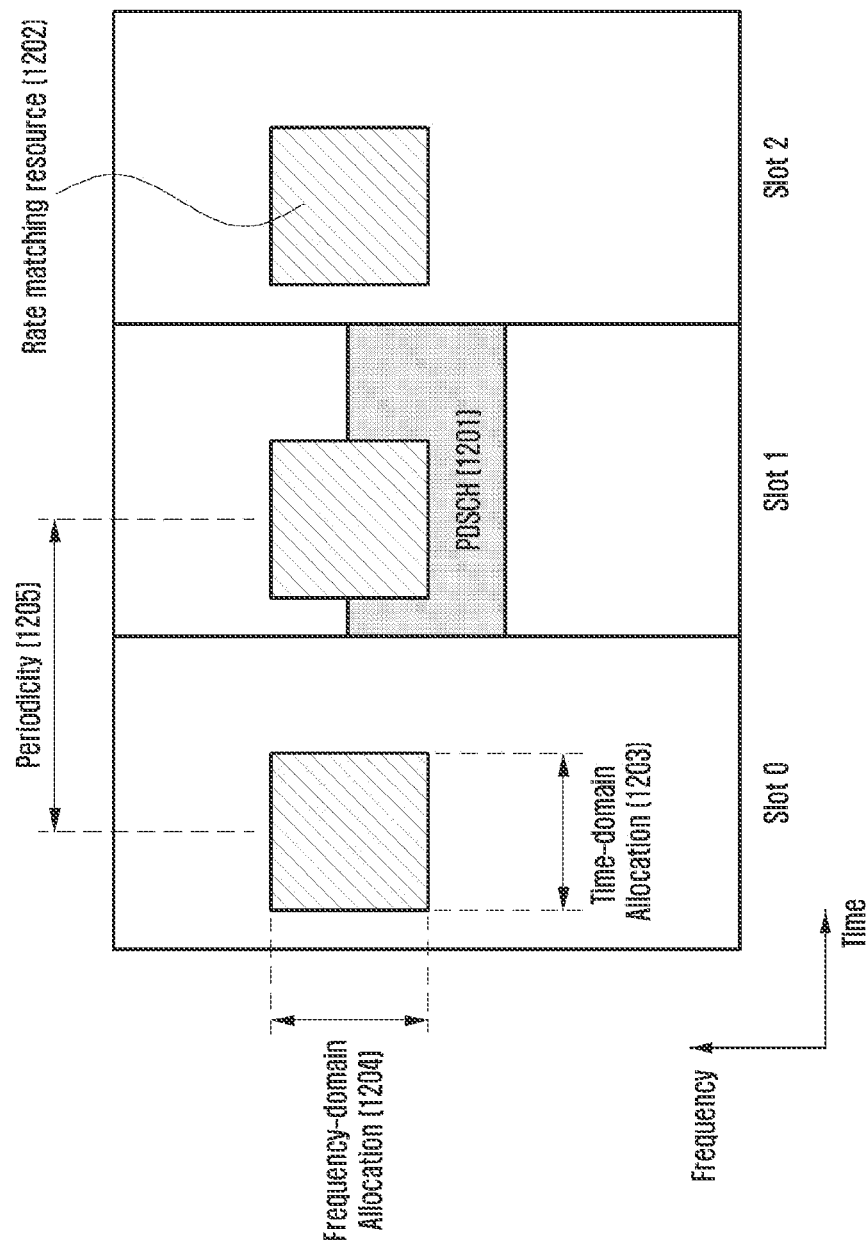
FIG. 12 illustrates a method of transmitting and receiving data in consideration of a downlink data channel and rate matching resources by the BS and the UE in a wireless communication system according to an embodiment of the present disclosure.

FIG. 12 illustrates a method by which the BS and the UE transmit and receive data in consideration of a downlink data channel and rate matching resources according to an embodiment of the present disclosure.

In FIG. 12, a downlink data channel (PDSCH) 1201 and a rate matching resource 1202 are illustrated. The BS may configure one or a plurality of rate matching resources 1202 in the UE through higher-layer signaling (for example, RRC signaling). The rate matching resource 1202 configuration information may include time axis resource allocation information 1203, frequency axis resource allocation information 1204, and period information 1205. In the following description, a bitmap corresponding to the frequency axis resource allocation information 1204 is named a "first bitmap," a bitmap corresponding to the time axis resource allocation information 1203 is named a "second bitmap," and a bitmap corresponding to the period information 1205 is named a "third bitmap". When all or some of the time and frequency resources of the scheduled data channel 1201 overlap the configured rate matching resources 1202, the BS may rate-match the data channel 1201 in the part of the rate matching resources 1202 and transmit the data channel, and the UE may perform reception and decoding on the basis of the assumption that the data channel 1201 is rate-matched in the part of the rate matching resources 1202.

The BS may dynamically notify the UE of whether to rate-match the data channel in the configured rate matching resource part through an additional configuration (corresponding to a "rate matching indicator" in the above-described DCI format). Specifically, the BS may select some of the configured rate matching resources, group the selected rate matching resources into a rate matching resource group, and inform the UE of whether to perform rate matching on the data channel for each rate matching resource group through DCI using a bitmap scheme. For example, when 4 rate matching resources, RMR #1, RMR #2, RMR #3, and RMR #4 are configured, the BS may configure rate matching groups RMG #1={RMR #1, RMR #2} and RMG #2={RMR #3, RMR #4}, and inform the UE of whether to perform rate matching in each of RMG #1 and RMG #2 by using 2 bits within a DCI field. For example, "1" may be indicated when rate matching may be performed, and "0" may be indicated when rate matching may not be performed.

In the 5G system to which the disclosure can be applied, granularity at an "RB symbol level" and an "RE level" is supported as a method of configuring the rate matching resources in the UE. More specifically, the following configuration method may be used.

[RB Symbol Level]

The UE may receive a configuration of a maximum of 4 RateMatchPatterns through higher-layer signaling, and one RateMatchPattern may include the following content.

As reserved resources within a BWP, resources in which time and frequency resource areas of the corresponding reserved resources are configured by a combination of a bitmap at an RB level and a bitmap at a symbol level in the frequency axis may be included. The reserved resources may span one or two slots. A time domain pattern (periodicityAndPattern) in which the time and frequency domains including a pair of bitmaps at the RB level and the symbol level are repeated may be additionally configured.

Time and frequency domain resource areas configured as CORESETs within the BWP and resource areas corresponding to a time domain pattern configured as a search space configuration in which the corresponding resource areas are repeated may be included.

[RE Level]

The UE may receive a configuration of the following content through higher-layer signaling.

As configuration information (lte-CRS-ToMatchAround) for REs corresponding to a LTE cell-specific reference signal or common reference signal (CRS) pattern, the number of LTE CSR ports (nrofCRS-Ports), values of LTE-CRS-vshift(s) (v-shift), information on a center subcarrier location (carrierFreqDL) of an LTE carrier from a frequency point that is a reference (for example, reference point A), information on a bandwidth size of an LTE carrier (carrierBandwidthDL), subframe configuration information (mbsfn-SubframConfigList) corresponding to a multicast-broadcast single-frequency network (MBSFN), and the like. The UE may determine the location of the CRS within the NR slot corresponding to the LTE subframe on the basis of the above-described information.

Configuration information for a resource set corresponding to one or a plurality of zero power (ZP) CSI-RSs within the BWP may be included.

[LTE CRS Rate Match-Related]

Subsequently, the rate match process for the LTE CRS is described in detail. For the coexistence of long-term evolution (LTE) and new RAT (NR) (LTE-NR coexistence), NR provides a function of configuring a pattern of cell-specific reference signal (CRS) of LTE to an NR UE. More specifically, the CRS pattern may be provided by RRC signaling including at least one parameter within a ServingCellConfig information element (IE) or a ServingCellConfigCommon IE. The parameters may be, for example, lte-CRS-ToMatchAround, lte-CRS-PatternList1-r16, lte-CRS-PatternList2-r16, crs-RateMatch-PerCORESETPoolIndex-r16, and the like.

In Rel-15 NR, a function of configuring one CRS pattern per serving cell may be provided through the parameter lte-CRS-ToMatchAround. In Rel-16 NR, the function is expanded to configure a plurality of CRS patterns per serving cell. More specifically, one CRS pattern per LTE carrier may be configured in a single-transmission and reception point (TRP) configuration UE, and two CRS patterns per LTE carrier may be configured in a multi-TRP configuration UE. For example, a maximum of three CRS patterns per serving cell may be configured in the single-TRP configuration UE through the parameter lte-CRS-PatternList1-r16. In another example, the CRS may be configured for each TRP in the multi-TRP configuration UE. That is, a CRS pattern for TRP1 may be configured through the parameter lte-CRS-PatternList1-r16, and a CRS pattern for TRP2 may be configured through the parameter lte-CRS-PatternList2-r16. Meanwhile, when the two TRPs are configured, whether to apply all of the CRS patterns of TRP1 and TRP2 or only the CRS pattern for one TRP is determined through the parameter crs-RateMatch-PerCORESETPoolIndex-r16, and only the CRS pattern of one TRP is applied when the parameter crs-RateMatch-PerCORESETPoolIndex-r16 is configured to be enabled and, otherwise, all of the CRS patterns of the two TRPs are applied.

[Table 22] shows the ServingCellConfig IE including the CRS pattern, and [Table 23] shows the RateMatchPatternLTE-CRS IE including at least one parameter for the CRS pattern.

TABLE 22

| | |
|---|---|
| ServingCellConfig ::= | SEQUENCE { |
| tdd-UL-DL-ConfigurationDedicated | TDD-UL-DL-ConfigDedicated |
| OPTIONAL, -- Cond TDD | |
| initialDownlinkBWP | BWP-DownlinkDedicated |
| OPTIONAL, -- Need M | |
| downlinkBWP-ToReleaseList | SEQUENCE(SIZE(1..maxNrofBWPs)) OF BWP-Id |
| OPTIONAL, -- Need N | |
| downlinkBWP-ToAddModList | SEQUENCE(SIZE(1..maxNrofBWPs)) OF BWP-Downlink |
| Downlink | OPTIONAL, -- Need N |
| firstActiveDownlinkBWP-Id | BWP-Id |

TABLE 22-continued

| | |
|---|---|
| bwp-InactivityTimer OPTIONAL, -- Cond SyncAndCellAdd | ENUMERATED {ms2, ms3, ms4, ms5, ms6, ms8, ms10, ms20, ms30, ms40, ms50, ms60, ms80, ms100, ms200, ms300, ms500, ms750, ms1280, ms1920, ms2560, spare10, spare9, spare8, spare7, spare6, spare5, spare4, spare3, spare2, spare1 } |
| defaultDownlinkBWP-Id OPTIONAL, --Need R | BWP-Id |
| uplinkConfig OPTIONAL, -- Need S | UplinkConfig |
| supplementaryUplink OPTIONAL, -- Need M | UplinkConfig |
| pdcch-ServingCellConfig OPTIONAL, -- Need M | SetupRelease { PDCCH-ServingCellConfig } |
| pdsch-ServingCellConfig OPTIONAL, -- Need M | SetupRelease { PDSCH-ServingCellConfig } |
| csi-MeasConfig OPTIONAL, -- Need M | SetupRelease { CSI-MeasConfig } |
| sCellDeactivationTimer | ENUMERATED {ms20, ms40, ms80, ms160, ms200, ms240, ms320, ms400, ms480, ms520, ms640, ms720, ms840, ms1280, spare2,spare1} OPTIONAL, -- Cond ServingCellWithoutPUCCH |
| crossCarrierSchedulingConfig OPTIONAL, -- Need M | CrossCarrierSchedulingConfig |
| tag-Id | TAG-Id, |
| dummy OPTIONAL, -- Need R | ENUMERATED {enabled} |
| pathlossReferenceLinking OPTIONAL, -- Cond SCellOnly | ENUMERATED {spCell, sCell} |
| servingCellMO OPTIONAL, -- Cond MeasObject | MeasObjectId |
| ..., [[ | |
| lte-CRS-ToMatchAround OPTIONAL, -- Need M | SetupRelease { RateMatchPatternLTE-CRS } |
| rateMatchPatternToAddModList OF RateMatchPattern | SEQUENCE(SIZE(1..maxNrofRateMatchPatterns)) OPTIONAL, -- Need N |
| rateMatchPatternToReleaseList OF RateMatchPatternId | SEQUENCE(SIZE(1..maxNrofRateMatchPatterns)) OPTIONAL, -- Need N |
| downlinkChannelBW-PerSCS-List SpecificCarrier ]], [[ | SEQUENCE(SIZE(1..maxSCSs)) OF SCS- OPTIONAL -- Need S |
| supplementaryUplinkRelease OPTIONAL, -- Need N | ENUMERATED {true} |
| tdd-UL-DL-ConfigurationDedicated_IAB-MT-r16 | TDD-UL-DL-ConfigDedicated-IAB-MT-r16 OPTIONAL, -- Cond TDD_IAB |
| dormantBWP-Config-r16 OPTIONAL, -- Need M | SetupRelease { DomantBWP-Config-r16 } |
| ca-SlotOffset-r16 refSCS15khz refSCS30KHz refSCS60KHz refSCS120KHz } Cond AsyncCA | CHOICE { INTEGER(-2..2), INTEGER(-5..5), INTEGER(-10..10), INTEGER(-20..20) OPTIONAL, -- |
| channelAccessConfig-r16 OPTIONAL, -- Need M | SetupRelease { ChannelAccessConfig-r16 } |
| intraCellGuardBandsDL-List-r16 IntraCellGuardBandsPerSCS-r16 | SEQUENCE(SIZE(1..MaxSCSs)) OF OPTIONAL, -- Need S |
| intraCellGuardBandsDL-List-r16 IntraCellGuardBandsPerSCS-r16 | SEQUENCE(SIZE(1..MaxSCSs)) OF OPTIONAL, -- Need S |
| csi-RS-ValidationWith-DCI-r16 OPTIONAL, -- Need R | ENUMERATED {enabled} |
| lts-CRS-PatternList1-r16 OPTIONAL, -- Need M | SetupRelease { LTE-CRS-PatternList-r16 } |
| lts-CRS-PatternList2-r16 OPTIONAL, -- Need M | SetupRelease { LTE-CRS-PatternList-r16 } |
| crs-RateMatch-PerCORESETPoolIndex-r16 OPTIONAL, -- Need R | ENUMERATED {enabled} |
| enableTwoDefaultTCI-States-r16 OPTIONAL, -- Need R | ENUMERATED {enabled} |
| enableTwoDefaultTCI-StatePerCoresetPoolIndex-r16 OPTIONAL, -- Need R | ENUMERATED {enabled} |
| enableMeanSwitchTiming-r16 OPTIONAL, -- Need R | ENUMERATED {true} |
| cbg-TxDiffTBsProcessingType1-r16 OPTIONAL, -- Need R | ENUMERATED {enabled} |

TABLE 22-continued

| | | |
|---|---|---|
| cbg-TxDiffTBsProcessingType2-r16<br>OPTIONAL, -- Need R<br>]]<br>} | ENUMERATED | {enabled} |

TABLE 23

RateMatchPatternLTE-CRS

The IE RateMatchPatternLTE-CRS is used to configure a pattern to rate match around LTE CRS. See TS 38.214 [19], clause 5.1.4.2.

RateMatchPatternLTE-CRS information element

```
-- ASN1START
-- TAG-RATEMATCHPATTERNLTE-CRS-START
RateMatchPatternLTE-CRS ::=       SEQUENCE {
    carrierFreqDL                 INTEGER(0..16383),
    carrierBandwidthDL            ENUMERATED {n6, n15, n25, n50, n75, n100, spare2,
spare1},
    mbsfn-SubframeConfigList      EUTRA-MBSFN-SubframeConfigList
OPTIONAL,   -- Need M
    nrofCRS-Ports                 ENUMERATED {n1, n2, n4},
    v-Shift                       ENUMERATED {n0, n1, n2, n3, n4, n5}
}
LTE-CRS-PatternList-r16 ::=       SEQUENCE(SIZE(1..maxLTE-CRS-Patterns-r16)) OF
RateMatchPatternLTE-CRS
-- TAG-RATEMATCHPATTERNLTE-CRS-STOP
-- ASN1STOP
```

RateMatchPatternLTE-CRS field descriptions carrierBandwidthDL
BW of the LTE carrier in number of PRBs (see TS 38.214 [19], clause 5.1.4.2).
carrierFreqDL
Center of the LTE carrier (see TS 38.214 [19], clause 5.1.4.2).
mbsfn-SubframeConfigList
LTE MBSFN subframe configuration (see TS 38.214 [19], clause 5.1.4.2).
nrofCRS-Ports
Number of LTE CRS antenna port to rate-match around (see TS 38.214 [19], clause 5.1.4.2).
v-Shifrt
Shifting value v-shift in LTE to rate match around LTE CRS (see TS 38.214 [19], clause 5.1.4.2).

Hereinafter, a PDSCH processing time (PDSCH processing procedure time) is described. When the BS schedules to transmit a PDSCH to the UE through DCI format 1_0 1_1, or 1_2, the UE may need a PDSCH processing time for receiving the PDSCH by applying a transmission method indicated through DCI (modulation/demodulation and coding indication index (MCS), demodulation reference signal-related information, and time and frequency resource allocation information). In NR, a PDSCH processing time is defined in consideration thereof. The PDSCH processing time of the UE may follow [Equation 2] below:

$$T_{proc,1} = (N_1 + d_{1,1} + d_2)(2048+144)\kappa 2^{-\mu} T_c + T_{ext} \qquad \text{[Equation 2]}$$

In $T_{proc,1}$ of [Equation 2], respective parameters may have meanings described below.

In one example for $N_1$, the number of symbols determined according to UE processing capability 1 or 2 based on a UE capability and numerology $\mu$. $N_1$ may have a value in [Table 24] when UE processing capability 1 is reported according to a UE capability report and may have a value in [Table 25] when UE processing capability 2 is reported and information indicating that UE processing capability 2 can be used is configured through higher-layer signaling. The numerology $\mu$ may correspond to a minimum value among $\mu$PDCCH, $\mu$PDSCH, and $\mu$UL to maximize $T_{proc,1}$, and $\mu$PDCCH, $\mu$PDSCH, and $\mu$UL may be numerology of a PDCCH scheduling a PDSCH, numerology of a scheduled PDSCH, and numerology of an uplink channel to transmit HARQTACK, respectively.

TABLE 24

PDSCH decoding time $N_1$ [symbols]

| $\mu$ | Case in which dmrs-AdditionalPosition = pos0 within DMRS-DownlinkConfig that is higher-layer signaling in both PDSCH mapping types A and B | Case in which AdditionalPosition ≠ pos0 within DMRS-DownlinkConfig that is higher-layer signaling or a higher-layer parameter is not configured in both PDSCH mapping types A and B |
|---|---|---|
| 0 | 8 | $N_{1,0}$ |
| 1 | 10 | 13 |

TABLE 24-continued

PDSCH decoding time $N_1$ [symbols]

| $\mu$ | Case in which dmrs-AdditionalPosition = pos0 within DMRS-DownlinkConfig that is higher-layer signaling in both PDSCH mapping types A and B | Case in which AdditionalPosition ≠ pos0 within DMRS-DownlinkConfig that is higher-layer signaling or a higher-layer parameter is not configured in both PDSCH mapping types A and B |
|---|---|---|
| 2 | 17 | 20 |
| 3 | 20 | 24 |

TABLE 25

| $\mu$ | PDSCH decoding time $N_1$ [symbols] Case in which dmrs-AdditionalPosition = pos0 within DMRS-DownlinkConfig that is higher-layer signaling in both PDSCH mapping types A and B |
|---|---|
| 0 | 3 |
| 1 | 4.5 |
| 2 | 9 for frequency range (FR) 1 |

In one example, κ: 64.

In one example for $T_{ext}$, the UE may calculate Text and apply the same to a PDSCH processing time when the UE uses a shared spectrum channel access scheme. Otherwise, it is assumed that $T_{ext}$ is 0.

In one example, when l1 indicating a location value of a PDSCH DMRS is 12, N1,0 in [Table 24] has a value of 14 and, otherwise, has a value of 13.

In one example, when the last symbol of the PDSCH is an $i^{th}$ symbol in a slot for transmitting the PDSCH and i<7 for PDSCH mapping type A, $d_{1,1}$ is 7−i and, otherwise, $d_{1,1}$ is 0.

In one example of $d_2$, $d_2$ of a PUCCH having a high priority index may be configured as a value reported from the UE when the PUCCH having the high priority index and a PUCCH or PUSCH having a low priority index overlap in the time. Otherwise, $d_2$ is 0.

In one example, $d_{1,1}$ may be determined according to the number L of symbols of the scheduled PDSCH and the number d of overlapping symbols between the PDCCH scheduling the PDSCH and the scheduled PDSCH as described below when PDSCH mapping type B is used for UE processing capability 1:

If L≥7, $d_{1,1}$=0;
If L≥4 and L≤6, $d_{1,1}$=7−L;
if L=3, $d_{1,1}$=min(d, 1); and
If L=2, $d_{1,1}$=3+d.

In one example, $d_{1,1}$ may be determined according to the number L of symbols of the scheduled PDSCH and the number d of overlapping symbols between the PDCCH scheduling the PDSCH and the scheduled PDSCH as described below when PDSCH mapping type B is used for UE processing capability 2:

If L≥7, $d_{1,1}$=0;
If L≥4 and L≤6, $d_{1,1}$=7−L;
In the case of L=2;
if the PDCCH performing scheduling exists within a CORESET including 3 symbols and the corresponding CORESET and the scheduled PDSCH have the same start symbol, $d_{1,1}$=3; and
Otherwise, $d_{1,1}$=d.

In one example, a UE supporting capability 2 within a given serving cell may apply a PDSCH processing time according to UE processing capability 2 when processingType2Enabled that is higher-layer signaling is configured as enable for the corresponding cell.

When a location of a first uplink transmission symbol of a PUCCH including HARQ-ACK information (the corresponding location may consider $K_1$-defined as a transmission time point of HARQ-ACK, PUCCH resources used for HARQ-ACK transmission, and a timing advance effect) does not start earlier than a first uplink transmission symbol appearing after a time of $T_{proc,1}$ from a last symbol of a PDSCH, the UE may transmit a valid HARQ-ACK message. That is, the UE may transmit the PUCCH including HARQ-ACK only when the PDSCH processing time is sufficient. Otherwise, the UE cannot provide the BS with valid HARQ-ACK information corresponding to the scheduled PDSCH. $T_{proc,1}$ may be used for all of the normal or expanded CP. When the number of PDSCH transmission locations within one slot is 2, $d_{1,1}$ is calculated on the basis of the first PDSCH transmission location within the corresponding slot.

[PDSCH: Reception Preparation Time in Cross-Carrier Scheduling]

Hereinafter, in the case of cross-carrier scheduling in which numerology μPDCCH for transmitting the PDCCH performing scheduling and numerology μPDSCH for transmitting the PDSCH scheduling the corresponding PDCCH are different from each other, a PDSCH reception preparation time $N_{pdsch}$ of the UE defined for a time interval between the PDCCH and the PDSCH is described.

When μPDCCH<μPDSCH, the scheduled PDSCH cannot be transmitted earlier than the first symbol of the slot existing after $N_{pdsch}$ symbols from the last symbol of the PDCCH scheduling the corresponding PDSCH. Transmission symbols of the corresponding PDSCH may include a DM-RS.

When μPDCCH>μPDSCH, the scheduled PDSCH may be transmitted after $N_{pdsch}$ symbols from the last symbol of the PDCCH scheduling the corresponding PDSCH. Transmission symbols of the corresponding PDSCH may include a DM-RS.

Meanwhile, Npdsch according to scheduled PDCCH subcarrier spacing may be as shown in [Table 26].

TABLE 26

| $\mu_{PDCCH}$ | $N_{pdsch}$ [symbols] |
|---|---|
| 0 | 4 |
| 1 | 5 |
| 2 | 10 |
| 3 | 14 |

[SRS-Related]

Subsequently, a method of estimating an uplink channel using sounding reference signal (SRS) transmission by the UE is described. The BS may configure at least one SRS configuration in every uplink BWP and configure at least one SRS resource set in every SRS configuration in order to transmit configuration information for SRS transmission. For example, the BS and the UE may exchange higher-layer signaling information below in order to transmit information related to an SRS resource set:

srs-ResourceSetId: SRS indicates a resource set index;

srs-ResourceIdList: indicates a set of SRS resource indexes referred to by an SRS resource set;

resourceType: indicates a time-axis transmission configuration of SRS resources referred to by an SRS resource set and is configured as one of "periodic," "semi-persistent," and "aperiodic." When "periodic" or "semi-persistent" is configured, associated CSI-RS information may be provided according to a used place of the SRS resource set. When "aperiodic" is configured, an aperiodic SRS resource trigger list and slot offset information may be provided and associated CSI-RS information may be provided according to a used place of the SRS resource set;

usage: indicates a configuration for a used place of SRS resources referred to by the SRS resource set and is configured as one of "beamManagement," "codebook," "nonCodebook," and "antennaSwitching"; and alpha, p0, pathlossReferenceRS, srs-PowerControlAdjustmentStates: provides a parameter configuration for controlling transmission power of SRS resources referred to by the SRS resource set.

The UE may understand that SRS resources included in the set of SRS resource indexes referred to by the SRS resource set follow information configured in the SRS resource set.

Further, the BS and the UE may transmit and receive high-layer signaling information in order to transmit individual configuration information for SRS resources. For example, the individual configuration information for SRS resources may include time-frequency axis mapping information within the slot of SRS resources, which may include information on intra-slot or inter-slot frequency hopping of SRS resources. Further, the individual configuration information for SRS resources may include a time-axis transmission configuration of SRS resources and may be configured as one of "periodic," "semi-persistent," and "aperiodic." This may be limited to have the time-axis transmission configuration such as the SRS resources set including SRS resources. When the time-axis transmission configuration of SRS resources is configured as "periodic" or "semi-persistent," an SRS resource transmission period and a slot offset (for example, periodicityAndOffset) may be additionally configured in the time-axis transmission configuration.

The BS may activate, deactivate, or trigger SRS transmission to the UE through higher-layer signaling including RRC signaling or MAC CE signaling or L1 signaling (for example, DCI). For example, the BS may activate or deactivate periodic SRS transmission to the UE through higher-layer signaling. The BS may indicate activation of an SRS resource set having a resourceType configured as periodic through higher-layer signaling, and the UE may transmit SRS resources referred to by the activated SRS resource set. Time-frequency axis resource mapping within the slot of the transmission SRS resources follows resource mapping information configured in the SRS resources, and slot mapping including the transmission period and the slot offset follows a periodicityAndOffset configured in the SRS resources. Further, a spatial domain transmission filter applied to the transmission SRS resources may refer to spatial relation info configured in the SRS resources or refer to associated CSI-RS information configured in the SRS resource set including the SRS resources. The UE may transmit SRS resources within an uplink BWP activated for activated periodic SRS resources through higher-layer signaling.

For example, the BS may activate or deactivate semi-persistent SRS transmission to the UE through high-layer signaling. The BS may indicate activation of the SRS resource set through MAC CE signaling, and the UE may transmit SRS resources referred to by the activated SRS resource set. The SRS resource set activated through MAC CE signaling may be limited to an SRS resource set having the resourceType configured as semi-persistent. Time-frequency axis resource mapping within the slot of the transmission SRS resources follows resource mapping information configured in the SRS resources, and slot mapping including the transmission period and the slot offset follows a periodicityAndOffset configured in the SRS resources.

Further, a spatial domain transmission filter applied to the transmission SRS resources may refer to spatial relation info configured in the SRS resources or refer to associated CSI-RS information configured in the SRS resource set including the SRS resources. When spatial relation info is configured in the SRS resources, a spatial domain transmission filter may be determined with reference to configuration information for spatial relation info transmitted through MAC CE signaling activating semi-persistent SRS transmission without following the spatial relation info. The UE may transmit SRS resources within an uplink BWP activated for activated semi-persistent SRS resources through higher-layer signaling.

For example, the BS may trigger aperiodic SRS transmission to the UE through DCI. The BS may indicate one of the aperiodic SRS resource triggers (aperiodicSRS-ResourceTrigger) through an SRS request field of DCI. The UE may understand that an SRS resource set including the aperiodic SRS resource trigger indicated through DCI in an aperiodic SRS resource trigger list among SRS resource set configuration information is triggered. The UE may transmit the SRS resources referred to by the triggered SRS resource set. Time-frequency axis resource mapping within the slot of the transmitted SRS resources follows resource mapping information configured in the SRS resources.

Further, slot mapping of the transmitted SRS resources may be determined through a slot offset between a PDCCH including DCI and the SRS resources, which may refer to a value(s) included in a slot offset set configured in the SRS resource set. Specifically, the slot offset between the PDCCH including DCI and the SRS resources may apply a value indicated by a time domain resource assignment field of DCI among an offset value(s) included in the slot offset set configured in the SRS resource set. Further, a spatial domain transmission filter applied to the transmission SRS resources may refer to spatial relation info configured in the SRS resources or refer to associated CSI-RS information configured in the SRS resource set including the SRS resources. The UE may transmit SRS resources within an uplink BWP activated for triggered aperiodic SRS resources through DCI.

When the BS triggers aperiodic SRS transmission to the UE through DCI, the UE may need a minimum time interval between the PDCCH including DCI for triggering aperiodic SRS transmission and the transmitted SRS in order to transmit the SRS through the application of configuration information for SRS resource. The time interval for SRS transmission by the UE may be defined as the number of symbols between the last symbol of the PDCCH including DCI for triggering aperiodic SRS transmission and the first symbol to which the SRS resource that is first transmitted among the transmitted SRS resource(s) is mapped. The minimum time interval may be defined with reference to a PUSCH preparation procedure time required for preparing PUSCH transmission by the UE.

Further, the minimum time interval may have different values according to a used place of the SRS resource set including the transmitted SRS resource. For example, the minimum time interval may be defined as N2 symbols defined in consideration of the UE processing capability according to the UE capability with reference to the PUSCH preparation procedure of the UE. Further, the minimum time interval may be determined as N2 symbols when the used place of the SRS resource set is configured as "codebook" or "antennaSwitching" in consideration of the used place of the SRS resource set including the transmitted SRS resource, and may be determined as N2+14 symbols when the used place of the SRS resource set is configured as "nonCodebook" or "beamManagement." The UE may perform aperiodic SRS transmission when the time interval for aperiodic SRS transmission is longer than or equal to the minimum time interval, and may ignore DCI for triggering the aperiodic SRS when the time interval for aperiodic SRS transmission is shorter than the minimum time interval.

TABLE 27

```
SRS-Resource ::=                    SEQUENCE {
    srs-ResourceId                      SRS-ResourceId,
    nrofSRS-Ports                       ENUMERATED {port1, ports2,
                                        ports4},
    ptrs-PortIndex                      ENUMERATED  {n0,  n1 }
OPTIONAL,  -- Need R
    transmissionComb                    CHOICE {
        n2                                  SEQUENCE {
            combOffset-n2                       INTEGER(0..1),
            cyclicShift-n2                      INTEGER(0..7)
        },
        n4                                  SEQUENCE {
            combOffset-n4                       INTEGER(0..3),
            cyclicShift-n4                      INTEGER(0..11)
        }
    },
    resourceMapping                     SEQUENCE {
        startPosition                       INTEGER(0..5),
        nrofSymbols                         ENUMERATED {n1, n2, n4},
        repetitionFactor                    ENUMERATED {n1, n2, n4}
    },
    freqDomainPosition                  INTEGER(0..67),
    freqDomainShift                     INTEGER(0..268),
    freqHopping                         SEQUENCE {
        c-SRS                               INTEGER(0..63),
        b-SRS                               INTEGER(0..3),
        b-hop                               INTEGER(0..3)
    },
    groupOrSequenceHopping              ENUMERATED  {  neither,
groupHopping, sequenceHopping },
    resourceType                        CHOICE {
        aperiodic                           SEQUENCE {
            ...
        },
        semi-persistent                     SEQUENCE {
            periodicityAndOffset-sp             SRS-PeriodicityAndOffset,
            ...
        },
        periodic                            SEQUENCE {
            periodicityAndOffset-p              SRS-PeriodicityAndOffset,
            ...
        }
    },
    sequenceId                          INTEGER(0..1023),
    spatialRelationInfo                 SRS-SpatialRelationInfo
OPTIONAL,  -- Need R
    ...
}
```

In [Table 27] above, patialRelationInfo configuration information is applied to a beam used for corresponding SRS information of beam information of the corresponding reference signal with reference to one reference signal. For example, the configuration of spatialRelationInfo may include information shown in [Table 28] below.

TABLE 28

```
SRS-SpatialRelationInfo ::=         SEQUENCE {
    servingCellId                       ServCellIndex       OPTIONAL,  --
                                        Need S
    referenceSignal                     CHOICE {
        ssb-Index                           SSB-Index,
        csi-RS-Index                        NZP-CSI-RS-ResourceId,
        srs                                 SEQUENCE {
            resourceId                          SRS-ResourceId,
            uplinkBWP                           BWP-Id
        }
    }
}
```

Referring to the spatialRelationInfo configuration, an SS/PBCH block index, a CSI-RS index, or an SRS index may be configured as an index of a reference signal to be referred to for using beam information of a specific reference signal. Higher-layer signaling referenceSignal is configuration information indicating a reference signal of which beam information is referred to for corresponding SRS transmission, ssb-Index is an index of an SS/PBCH block, csi-RS-Index is an index of a CSI-RS, and srs is an index of an SRS. When a value of higher-layer signaling referenceSignal is configured as "ssb-Index," the UE may apply a reception beam used for receiving the SS/PBCH block corresponding to ssb-Index as a transmission beam of the corresponding SRS transmission. When a value of higher-layer signaling referenceSignal is configured as "csi-RS-Index," the UE may apply a reception beam used for receiving the CSI-RS corresponding to csi-RS-Index as a transmission beam of the corresponding SRS transmission. When a value of higher-layer signaling referenceSignal is configured as "srs," the UE may apply a reception beam used for receiving the SRS corresponding to srs as a transmission beam of the corresponding SRS transmission.

[PUSCH: Transmission Scheme-Related]

Subsequently, a scheduling scheme of PUSCH transmission is described. PUSCH transmission may be dynamically scheduled by a UL grant within DCI or may operate by configured grant Type 1 or Type 2. Dynamic scheduling of PUSCH transmission can be indicated by DCI format 0_0 or 0_1.

Configured grant Type 1 PUSCH transmission may be semi-statically configured through reception of configuredGrantConfig including rrc-ConfiguredUplinkGrant in [Table 29] through higher-layer signaling without reception of a UL grant within DCI. Configured grant Type 2 PUSCH transmission may be semi-persistently scheduled by a UL grant within DCI after reception of configuredGrantConfig which does not include rrc-ConfiguredUplinkGrant in [Table 29] through higher-layer signaling. When PUSCH transmission operates by a configured grant, parameters applied to PUSCH transmission are applied through configuredGrantConfig which is higher-layer signaling of [Table 29] except for dataScramblingIdentityPUSCH, txConfig, codebookSubset, maxRank, and scaling of UCI-OnPUSCH provided as pusch-Config of [Table 30] which is higher-layer signaling. When the UE receives transformPrecoder within configuredGrantConfig which is higher-layer signaling of [Table 29], the UE applies tp-pi2BPSK within pusch-Config of [Table 29] to PUSCH transmission operating by the configured grant.

TABLE 29

```
ConfiguredGrantConfig ::=          SEQUENCE {
   frequencyHopping                   ENUMERATED  {intraSlot,  interSlot}
OPTIONAL,   -- Need S,
   cg-DMRS-Configuration              DMRS-UplinkConfig,
   mcs-Table                          ENUMERATED  {qam256,  qam64LowSE}
OPTIONAL,   -- Need S
   mcs-TableTransformPrecoder         ENUMERATED  {qam256,  qam64LowSE}
OPTIONAL,   -- Need S
   uci-OnPUSCH                        SetupRelease  {  CG-UCI-OnPUSCH  }
OPTIONAL,   -- Need M
   resourceAllocation                 ENUMERATED  {  resourceAllocationType0,
resourceAllocationType1, dynamicSwitch },
   rbg-Size                           ENUMERATED  {config2}
OPTIONAL,   -- Need S
   powerControlLoopToUse              ENUMERATED {n0, n1},
   p0-PUSCH-Alpha                     P0-PUSCH-AlphaSetId,
   transformPrecoder                  ENUMERATED  {enabled,  disabled}
OPTIONAL,   -- Need S
   nrofHARQ-Processes                 INTEGER(1..16),
   repK                               ENUMERATED {n1, n2, n4, n8},
   repK-RV                            ENUMERATED {s1-0231, s2-0303, s3-0000}
OPTIONAL,   -- Need R
   periodicity                        ENUMERATED {
                                        sym2, sym7, sym1x14, sym2x14, sym4x14, sym5x14,
sym8x14, sym10x14, sym16x14, sym20x14,
                                        sym32x14,  sym40x14,  sym64x14,  sym80x14,
sym128x14, sym160x14, sym256x14, sym320x14, sym512x14,
                                        sym640x14, sym1024x14, sym1280x14, sym2560x14,
sym5120x14,
                                        sym6, sym1x12, sym2x12, sym4x12, sym5x12, sym8x12,
sym10x12, sym16x12, sym20x12, sym32x12,
                                        sym40x12,  sym64x12,  sym80x12,  sym128x12,
sym160x12, sym256x12, sym320x12, sym512x12, sym640x12,
                                        sym1280x12, sym2560x12
   },
   configuredGrantTimer               INTEGER(1..64)
OPTIONAL,   -- Need R
   rrc-ConfiguredUplinkGrant          SEQUENCE {
      timeDomainOffset                    INTEGER(0..5119),
      timeDomainAllocation                INTEGER(0..15),
      frequencyDomainAllocation           BIT STRING(SIZE(18)),
      antennaPort                         INTEGER(0..31),
      dmrs-SeqInitialization              INTEGER(0..1)
OPTIONAL,   -- Need R
      precodingAndNumberOfLayers          INTEGER(0..63),
      srs-ResourceIndicator               INTEGER(0..15)
OPTIONAL,   -- Need R
      mcsAndTBS                           INTEGER(0..31),
      frequencyHoppingOffset              INTEGER(1..
maxNrofPhysicalResourceBlocks-1)          OPTIONAL,   -- Need R
      pathlossReferenceIndex              INTEGER(0..maxNrofPUSCH-
PathlossReferenceRSs-1),
      ...
   }                                  OPTIONAL,  -
- Need R
   ...
}
```

Subsequently, a PUSCH transmission method is described. A DMRS antenna port for PUSCH transmission is the same as an antenna port for SRS transmission. PUSCH transmission may follow each of a codebook-based transmission method and a non-codebook-based transmission method according to whether a value of txConfig within pusch-Config of [Table 30] which is higher-layer signaling is "codebook" or "nonCodebook."

As described above, PUSCH transmission may be dynamically scheduled through DCI format 0_0 or 0_1 or semi-statically configured by the configured grant. When the UE receives an indication of scheduling of PUSCH transmission through DCI format 0_0, the UE performs a beam configuration for PUSCH transmission by using pucch-spatialRelationInfoID corresponding to a UE-specific PUCCH resource corresponding to a minimum ID within the activated uplink BWP in the serving cell in which case the PUSCH transmission is based on a single antenna port. The UE does not expect scheduling of PUSCH transmission through DCI format 0_0 within a BWP in which the PUCCH resource including pucch-spatialRelationInfo is not configured. When the UE does not receive a configuration of txConfig within pusch-Config of [Table 30], the UE does not expect reception of scheduling through DCI format 0_1.

TABLE 30

```
PUSCH-Config ::=                              SEQUENCE {
    dataScramblingIdentityPUSCH                   INTEGER(0..1023)
OPTIONAL,  -- Need S
    txConfig                                  ENUMERATED {codebook, nonCodebook}
OPTIONAL,  -- Need S
    dmrs-UplinkForPUSCH-MappingTypeA              SetupRelease { DMRS-UplinkConfig }
OPTIONAL,  -- Need M
    dmrs-UplinkForPUSCH-MappingTypeB              SetupRelease { DMRS-UplinkConfig }
OPTIONAL,  -- Need M
    pusch-PowerControl                            PUSCH-PowerControl
OPTIONAL,  -- Need M
    frequencyHopping                          ENUMERATED  {intraSlot,  interSlot}
OPTIONAL,  -- Need S
    frequencyHoppingOffsetLists               SEQUENCE(SIZE(1..4)) OF INTEGER(1..
maxNrofPhysicalResourceBlocks-1)
                                                  OPTIONAL,  --
Need M
    resourceAllocation                        ENUMERATED  {  resourceAllocationType0,
resourceAllocationType1, dynamicSwitch},
    pusch-TimeDomainAllocationList                SetupRelease  {  PUSCH-
TimeDomainResourceAllocationList }         OPTIONAL,  -- Need M
    pusch-AggregationFactor                   ENUMERATED  {  n2,  n4,  n8  }
OPTIONAL,  -- Need S
    mcs-Table                                 ENUMERATED  {qam256,  qam64LowSE}
OPTIONAL,  -- Need S
    mcs-TableTransformPrecoder                ENUMERATED   {qam256,  qam64LowSE}
OPTIONAL,  -- Need S
    transformPrecoder                         ENUMERATED  {enabled,  disabled}
OPTIONAL,  -- Need S
    codebookSubset                            ENUMERATED {fullyAndPartialAndNonCoherent,
partialAndNonCoherent,nonCoherent}
                                                  OPTIONAL,  --  Cond
codebookBased
    maxRank                                       INTEGER(1..4)
OPTIONAL, -- Cond codebookBased
    rbg-Size                                  ENUMERATED  {  config2}
OPTIONAL, -- Need S
    uci-OnPUSCH                                   SetupRelease  {  UCI-OnPUSCH}
OPTIONAL, -- Need M
    tp-pi2BPSK                                ENUMERATED  {enabled}
OPTIONAL, -- Need S
    ...
}
```

Subsequently, codebook-based PUSCH transmission is described. Codebook-based PUSCH transmission may be dynamically scheduled through DCI format 0_0 or 0_1 or semi-statically operate by the configured grant. When codebook-based PUSCH is dynamically scheduled by DCI format 0_1 or is semi-statically configured by the configured grant, the UE determines a precoder for PUSCH transmission on the basis of an SRS resource indicator (SRI), a transmission precoding matrix indicator (TPMI), and a transmission rank (the number of PUSCH transmission layers).

At this time, the SRI may be given through an SRS resource indicator field within DCI or may be configured through srs-ResourceIndicator which is higher-layer signaling. In codebook-based PUSCH transmission, the UE may receive a configuration of at least one SRS resource and a maximum of two SRS resources. When the UE receives the SRI through DCI, the SRS resource indicated by the corresponding SRI is the SRS resource corresponding to the SRI among SRS resources transmitted earlier than the PDCCH including the corresponding SRI. Further, the TPMI and the transmission rank may be given through field information and number of layers within DCI or may be configured through precodingAndNumberOfLayers which is higher-layer signaling. The TPMI is used to indicate a precoder applied to PUSCH transmission. When the UE receive a configuration of one SRS resource, the TPMI is used to indicate a precoder to be applied to the one configured SRS resource. When the UE receive a configuration of a plurality of SRS resources, the TPMI is used to indicate a precoder to be applied to SRS resources indicated through the SRI.

The precoder to be used for PUSCH transmission is selected from an uplink codebook having the number of antenna ports which is the same as a value of nrofSRS-Ports within SRS-Config which is higher-layer signaling. In codebook-based PUSCH transmission, the UE determines a codebook subset on the basis of the TPMI and a codebook-Subset within pusch-Config which is higher-layer signaling. The codebookSubset within pusch-Config which is higher-layer signaling may be configured as one of "fullyAndPartialAndNonCoherent," "partialAndNonCoherent," or "nonCoherent" on the basis of the UE capability which the UE reports to the BS. When the UE reports "partialAndNonCoherent" as the UE capability, the UE does not expect a configuration of the value of the codebookSubset which is higher-layer signaling as "fullyAndPartialAndNonCoherent." Further, when the UE reports "nonCoherent" as the UE capability, the UE does not expect a configuration of the value of the codebookSubset which is higher-layer signaling as "fullyAndPartialAndNonCoherent" or "partialAndNonCoherent." When nrofSRS-Ports within SRS-ResourceSet which is higher-layer signaling indicate two SRS antenna ports, the UE does not expect a configuration of the value of the codebookSubset which is higher-layer signaling as "partialAndNonCoherent."

The UE may receive a configuration of one SRS resource set having a value of usage within SRS-ResourceSet which is higher-layer signaling configured as "codebook," and one SRS resource may be indicated through the SRI within the corresponding SRS resource set. When several SRS resources are configured within the SRS resource set having the value of usage within SRS-ResourceSet which is higher-layer signaling configured as "codebook," the UE expects a configuration of the same value of nrofSRS-Ports within the SRS-Resource which is higher-layer signaling for all SRS resources.

The UE may transmit one or a plurality of SRS resources included in the SRS resource set having the value of usage configured as "codebook" to the BS according to higher-layer signaling, and the BS may select one of the SRS resources transmitted by the UE and instruct the UE to perform PUSCH transmission by using transmission beam information of the corresponding SRS resource. At this time, in codebook-based PUSCH transmission, the SRI is used as information for selecting an index of one SRS resource and is included in DCI. In addition, the BS may insert information indicating the TPMI and the rank to be used for PUSCH transmission by the UE into DCI. The UE performs PUSCH transmission by applying a precoder indicated by the rand and the TPMI indicated on the basis of the transmission beam of the corresponding SRS resource using the SRS resource indicated by the SRI.

Subsequently, non-codebook-based PUSCH transmission is described. Non-codebook-based PUSCH transmission may be dynamically scheduled through DCI format 0_0 or 0_1 or semi-statically operate by the configured grant. When at least one SRS resource is configured within the SRS resource set having the value of usage configured as "non-Codebook" within SRS-ResourceSet which is higher-layer signaling, the UE may receive scheduling of non-codebook-based PUSCH transmission through DCI format 0_1.

For the SRS resource set having the value of usage configured as "nonCodebook" within SRS-ResourceSet which is higher-layer signaling, the UE may receive a configuration of one connected non-zero power CSI-RS (NZP CSI-RS). The UE may calculate a precoder for SRS transmission through measurement for the NZP CSI-RS resource connected to the SRS resource set. When a difference between the last reception symbol of the aperiodic NZP CSI-RS resource connected to the SRS resource set and the first symbol of aperiodic SRS transmission in the UE is smaller than 42 symbols, the UE does not expect an update of information on the precoder for SRS transmission.

When the value of resource Type within SRS-ResourceSet which is higher-layer signaling is configured as "aperiodic," the connected NZP CSI-RS is indicated by an SRS request which is a field within DCI format 0_1 or 1_1. At this time, when the connected NZP CSI-RS resource is an aperiodic NZP CSI-RS resource, the case in which the value of the SRS request field within DCI format 0_1 or 1_1 is not "00" indicates the existence of the connected NZP CSI-RS. At this time, the corresponding DCI may not indicate cross carrier or cross BWP scheduling. Further, when the value of the SRS request indicates the existence of the NZP CSI-RS, the corresponding NZP CSI-RS is located in a slot in which the PDCCH including the SRS request field is transmitted. At this time, TCI states configured in the scheduled subcarrier are not configured as QCL-TypeD.

When the periodic or semi-persistent SRS resource set is configured, the connected NZP CSI-RS may be indicated through an associatedCSI-RS within SRS-ResourceSet which is higher-layer signaling. For non-codebook-based transmission, the UE does not expect configurations of both spatialRelationInfo which is higher layer signaling for the SRS resource and associatedCSI-RS within SRS-Resource-Set which is higher-layer signaling.

When the UE receives a configuration of a plurality of SRS resources, the UE may determine a precoder and a transmission rank to be applied to PUSCH transmission on the basis of an SRI indicated by the BS. At this time, the SRI may be indicated through an SRS resource indicator field within DCI or may be configured through srs-ResourceIndicator which is higher-layer signaling. Like the codebook-based PUSCH transmission, when the UE receives the SRI through DCI, the SRS resource indicated by the corresponding SRI is the SRS resource corresponding to the SRI among SRS resources transmitted earlier than the PDCCH including the corresponding SRI.

The UE may use one or a plurality of SRS resources for SRS transmission, and the maximum number of SRS resources which can be simultaneously transmitted in the same symbol within one SRS resource set are determined by the UE capability which the UE reports to the BS. At this time, SRS resources which the UE simultaneously transmits occupy the same RB. The UE configures one SRS port for each SRS resource. The number of SRS resource sets having the value of usage configured as "nonCodebook" within SRS-ResourceSet which is higher-layer signaling is only one, and the maximum number of SRS resources for non-codebook-based PUSCH transmission can be 4.

The BS transmits one NZP-CSI-RS connected to the SRS resource set, and the UE calculates a precoder to be used for one or a plurality of SRS resource transmissions within the corresponding SRS resource set on the basis of the measurement result when the corresponding NZP-CSI-RS is received. When transmitting one or a plurality of SRS resources within the SRS resource set having usage configured as "nonCodebook" to the BS, the UE applies the calculated precoder and the BS selects one or a plurality of SRS resources from among the one or plurality of received SRS resources. At this time, in non-codebook-based PUSCH transmission, the SRI indicates an index which may express one SRS resource or r a combination of a plurality of SRS resources, and the SRI is included in the DCI. The number of SRS resources indicated by the SRI transmitted by the BS may be the number of transmission layers of the PUSCH, and the UE transmits the PUSCH by applying the precoder applied to SRS resources to each layer.

[PUSCH: Preparation Process Time]

Subsequently, a PUSCH preparation process time (PUSCH preparation procedure time) is described. When the BS schedules to transmit a PUSCH to the UE by using DCI format 0_0, 0_1, or 0_2, the UE may need a PUSCH preparation process time for transmitting a PUSCH by applying a transmission method (a transmission precoding method of SRS resources, the number of transmission layers, and a spatial domain transmission filter) indicated through DCI. In NR, the PUSCH preparation process time considering the same is defined. The PUSCH preparation process time of the UE may follow [Equation 3] below:

$$T_{proc,2} = \max((N_2 + d_{2,1} + d_2)(2048 + 144) \cdot \kappa \cdot 2^{-\mu} T_c + T_{ext} + T_{switch}, d_{2,2}).$$ [Equation 3]

In $T_{proc,2}$ described in [Equation 3], each parameter may have the following meaning:

$N_2$: the number of symbols determined according to UE processing capability 1 or 2 based on a UE capability and numerology μ. $N_1$ may have a value in [Table 31] when UE processing capability 1 is reported according to a UE capability report and may have a value in [Table 32] when UE processing capability 2 is reported and information indicating that UE processing capability 2 can be used is configured through higher-layer signaling,

TABLE 31

| μ | PUSCH preparation time $N_2$ [symbols] |
|---|---|
| 0 | 10 |
| 1 | 12 |
| 2 | 23 |
| 3 | 36 |

TABLE 32

| μ | PUSCH preparation time $N_2$ [symbols] |
|---|---|
| 0 | 5 |
| 1 | 5.5 |
| 2 | 11 for frequency range 1 |

$d_{2,1}$: the number of symbols determined as 0 when all resource elements of a first OFDM symbol in PUSCH transmission include only DM-RSs and, otherwise, determined as 1;

$K$ : 64;

μ: follows a value among $μ_{DL}$ or $μ_{UL}$ making $T_{proc,2}$ larger. $μ_{DL}$ is downlink numerology for transmitting a PDCCH including DCI scheduling a PUSCH and $μ_{UL}$ is uplink numerology for transmitting a PUSCH;

$T_c$: has $1/\Delta f_{max} \cdot N_f$, $\Delta f_{max}=480 \cdot 10^3$ Hz, $N_f=4096$;

$d_{2,2}$: follows a BWP switching time when DCI scheduling a PUSCH indicates BWP switching and, otherwise, has 0;

$d_2$: a value of $d_2$ of a PUSCH having a high priority index is used when OFDM symbols of the PUCCH, the PUSCH having the high priority index, and a PUCCH having a low priority index overlap in the time. Otherwise, $d_2$ is 0;

$T_{ext}$: the UE may calculate $T_{ext}$ and apply the same to a PUSCH processing time when the UE uses a shared spectrum channel access scheme. Otherwise, it is assumed that $T_{ext}$ is 0; and $T_{switch}$: it is assumed that $T_{switch}$ is a switching interval time when an uplink switching interval is triggered. Otherwise, it is assumed that $T_{switch}$ is 0.

In consideration of time axis resource mapping information of the PUSCH scheduled through DCI and an effect of uplink-downlink timing advance, the BS and the UE may determine that the PUSCH preparation process time is not sufficient when a first symbol of the PUSCH starts earlier than a first uplink symbol at which the CP starts after $T_{proc,2}$ from a last symbol of the PDCCH including the DCI scheduling the PUSCH. Otherwise, the BS and the UE determines that the PUSCH preparation process time is sufficient. The UE may transmit the PUSCH only when the PUSCH preparation process time is sufficient, and may ignore scheduling of the PUSCH when the PUSCH preparation process time is not sufficient.

[PUSCH: Repetitive Transmission-Related]

Hereinafter, repetitive transmission of an uplink data channel in a 5G system to which the disclosure can be applied is described in detail. In the 5G system, two types such as a PUSCH repetitive transmission type A and a PUSCH repetitive transmission type B are supported as the repetitive transmission method of the uplink data channel.

The UE may receive a configuration of one of PUSCH repetitive transmission type A or B through higher-layer signaling.

[PUSCH Repetitive Transmission Type A]

As described above, the symbol length of the uplink data channel and the location of a start symbol may be determined through the time domain resource allocation method within one slot, and the BS may notify the UE of the number of repetitive transmissions through higher-layer signaling (for example, RRC signaling) or L1 signaling (for example, DCI).

The UE may repeatedly transmit uplink data channels having the configured same uplink data channel length and start symbol in successive slots on the basis of the number of repetitive transmissions received from the BS. At this time, when slots which the BS configures in the UE in the downlink or one or more symbols among the symbols of uplink data channels configured in the UE are configured as the downlink, the UE omits uplink data channel transmission but counts the number of repetitive transmissions of the uplink data channel.

[PUSCH Repetitive Transmission Type B]

As described above, the symbol length of the uplink data channel and the location of a start symbol may be determined through the time domain resource allocation method within one slot, and the BS may notify the UE of the number numberofrepetitions of repetitive transmissions through higher-layer signaling (for example, RRC signaling) or L1 signaling (for example, DCI).

First, nominal repetition of the uplink data channel is determined on the basis of the start symbol and the length of the configured uplink data channel. A slot in which $n^{th}$ nominal repetition starts is given by $$K_s + \left\lfloor \frac{S + n \cdot L}{N_{symb}^{slot}} \right\rfloor,$$

and a symbol starting in the slot is given by mod(s+n·L, $N_{symb}^{slot}$). A slot in which $n^{th}$ nominal repetition ends is given by $$K_s + \left\lfloor \frac{S + (n+1) \cdot L - 1}{N_{symb}^{slot}} \right\rfloor,$$

and a symbol ending in the slot is given by mod(S+(n+1)·L−1,$N_{symb}^{slot}$). Here, n=0, . . . , numberofrepetitions−1, S is a start symbol of a configured uplink data channel, and L is the symbol length of the configured uplink data channel. $K_s$ denotes a slot in which PUSCH transmission starts and $N_{symb}^{slot}$ denotes the number of symbols per slot.

The UE determines an invalid symbols for the PUSCH repetitive transmission type B. A symbol configured as the downlink by tdd-UL-DL-ConfigurationCommon or tdd-UL-DL-ConfigurationDedicated is determined as an invalid symbol for the PUSCH repetitive transmission type B. In addition, the invalid symbol may be configured in a higher-layer parameter (for example, InvalidSymbolPattern). The higher-layer parameter (for example, InvalidSymbolPattern) provides a symbol level bit map over one or two slots to configure the invalid symbol. In the bitmap, 1 indicates an invalid symbol. In addition, a period and a pattern of the bitmap may be configured through a higher-layer parameter (for example, periodicityAndPattern). When the higher-layer parameter (for example, InvalidSymbolPattern) is configured, the UE applies an invalid symbol pattern if an InvalidSymbolPatternIndicator-ForDCIFormat0_1 or InvalidSymbolPatternIndicator-ForDCIFormat0_2 parameter indicates 1, or the UE may not apply the invalid symbol pattern if the parameter indicates 0. When the higher-layer parameters (for example, InvalidSymbolPattern) are configured and the InvalidSymbolPatternIndicator-ForDCIFormat0_1 or InvalidSymbolPatternindicator-ForDCIFormat0_2 is not configured, the UE applies the invalid symbol pattern.

After the invalid symbol is determined, for each nominal repetition, the UE may consider symbols except for the invalid symbol as valid symbols. When one or more valid symbols are included in each nominal repetition, the nominal repetition may include one or more actual repetitions. Each actual repetition includes successive sets of valid symbols which can be used for the PUSCH repetitive transmissions type B in one slot.

Figure 13:
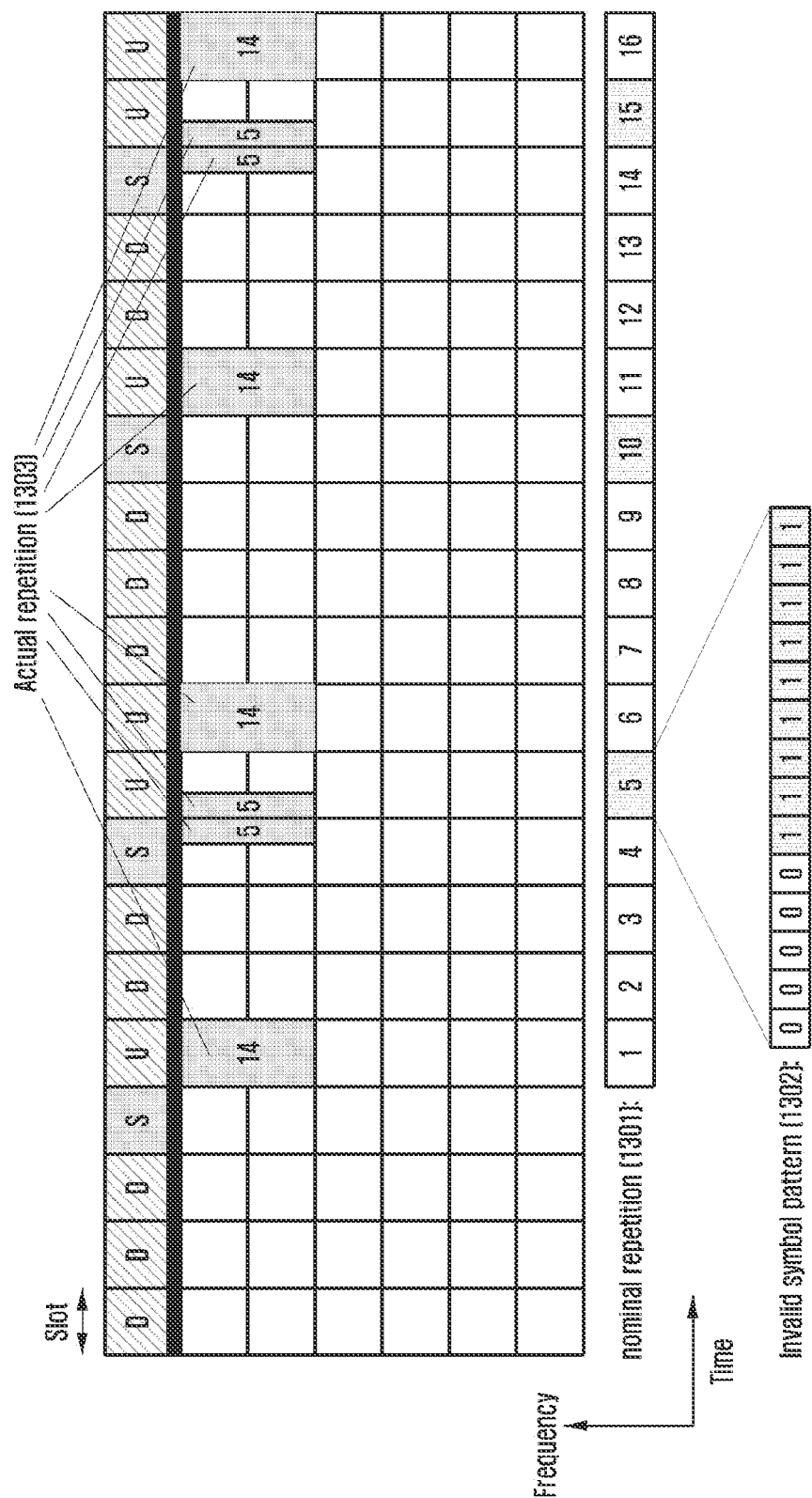
FIG. 13 illustrates an example of the PUSCH repetitive transmission type B in a wireless communication system according to an embodiment of the present disclosure.

FIG. 13 illustrates an example of the PUSCH repetitive transmission type B in a wireless communication system according to an embodiment of the present disclosure.

For example, the UE may receive a configuration of the start symbol S of the uplink data channel as 0, the length L of the uplink data channel as 14, and the number of repetitive transmissions as 16. In this case, nominal repetition appears in 16 successive slots as indicated by reference numeral 1301. Thereafter, the UE may determine a symbol configured as a downlink system in each nominal repetition 1301 as an invalid symbol. Further, the UE determines symbols configured as 1 in an invalid symbol pattern 1302 as invalid symbols. When valid symbols other than the invalid symbol in each nominal repetition includes one or more successive symbols in one slot, the valid symbols are configured as actual repetition and transmitted as indicated by reference number 1303.

Further, for PUSCH repetitive transmission, the following additional methods may be defined for UL grant-based PUSCH transmission and configured grant-based PUSCH transmission beyond the slot boundary in NR Release 16.

In one embodiment of Method 1 (mini-slot level repetition), two or more PUSCH repetitive transmissions are scheduled within one slot or beyond the boundary of successive slots through one UL grant. In method 1, time domain resource allocation information within DCI indicates resources of first repetitive transmission. Time domain resource information of the remaining repetitive transmissions may be determined according to the domain resource information of first repetitive transmission and an uplink or downlink direction determined for each symbol. Each repetitive transmission occupies successive symbols.

In one embodiment of Method 2 (multi-segment transmission), two or more PUSCH repetitive transmissions are scheduled in successive slots through one UL grant. At this time, one transmission is designated for each slot, and start points or repetition lengths may vary depending on each transmission. In method 2, the time domain resource allocation information within DCI indicates start points and repetition lengths of all repetitive transmissions. When repetitive transmission is performed within a single slot through method 2 and there are sets of successive uplink symbols within the corresponding slot, each repetitive transmission is performed for each uplink symbol set. When there is only one set of successive uplink symbols within the corresponding slot, one PUSCH repetitive transmission is performed according to the method of NR Release 15.

In one embodiment of Method 3, two or more PUSCH repetitive transmissions are scheduled in successive slots through two or more UL grants. At this time, one transmission is designated for each slot, and an $n^{th}$ UL grant may be received before PUSCH transmission scheduled by an $(n-1)^{th}$ UL grant ends.

In one embodiment of Method 4, one or a plurality of PUSCH repetitive transmissions may be supported within a signal slot or two or more PUSCH repetitive transmissions may be supported over boundaries of successive slots through one UL grant or one configured grant. The number of repetitions which the BS indicates to the UE is only a nominal value, and the number of PUSCH repetitive transmissions which the UE actually performs may be larger than the nominal number of repetitions. Time domain resource allocation information within the DCI or the configured grant is resources of the first repetitive transmission indicated by the BS. Time domain resource information of the remaining repetitive transmissions may be determined with reference to resource information of the first repetitive transmission and uplink or downlink directions of symbols. When the time domain resource information of repetitive transmission indicated by the BS is over the slot boundary or includes an uplink/downlink switching point, the corresponding repetitive transmission may be divided into a plurality of repetitive transmissions. At this time, one repetitive transmission may be included for each uplink period in one slot.

[PUSCH: Frequency Hopping Process]

Hereinafter, frequency hopping of an uplink data channel (physical uplink shared channel (PUSCH)) in a 5G system to which the disclosure can be applied is described in detail.

In 5G, two methods are supported for each PUSCH repetitive transmission type as the frequency hopping method of the uplink data channel. First, intra-slot frequency hopping and inter-slot frequency hopping are supported in a PUSCH repetitive transmission type A, and inter-repetition frequency hopping and inter-slot frequency hopping are supported in a PUSCH repetitive transmission type B.

The intra-slot frequency hopping method supported in the PUSCH repetitive transmission type A is a method of changing allocated resources in the frequency domain by a frequency offset in two hops within one slot to perform transmission. In intra-slot frequency hopping, a start RB of each hop may be indicated through [Equation 4]:

$$RB_{start} = \begin{cases} RB_{start} & i = 0 \\ (RB_{start} + RB_{offset}) \bmod N_{BWP}^{size} & i = 1. \end{cases} \quad \text{[Equation 4]}$$

In [Equation 4], i=0 and i=1 denote a first hop and a second hop, and $RB_{start}$ denotes a start RB in an UL BWP and is calculated by a frequency resource allocation method. $RB_{offset}$ denotes a frequency offset between two hops through a higher-layer parameter. The number of symbols of the first hop may be indicated as $\lfloor N_{symb}^{PUSCH,s}/2 \rfloor$, and the number of symbols of the second hop may be indicated as $N_{symb}^{PUSCH,s} - \lfloor N_{symb}^{PUSCH,s}/2 \rfloor$. $N_{symb}^{PUSCH,s}$ denotes the length of PUSCH transmission within one slot and is indicated by the number of OFDM symbols.

Subsequently, the inter-slot frequency hopping method supported in the PUSCH repetitive transmission types A and B is a method by which the UE changes allocated resources in the frequency domain by a frequency offset in every slot to perform transmission. In inter-slot frequency hopping, a start RB during $n_s^\mu$ slots may be indicated through [Equation 5].

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1. \end{cases} \quad \text{[Equation 5]}$$

In [Equation 5], $n_s^\mu$ denotes a current slot number in multi-slot PUSCH transmission, and $RB_{start}$ denotes a start RB in an UP BWP and is calculated by a frequency resource allocation method. $RB_{offset}$ denotes a frequency offset between two hops through a higher-layer parameter.

Subsequently, the inter-repetition frequency hopping method supported in the PUSCH repetitive transmission type B is a method of moving allocated resources in the frequency domain by a configured frequency offset to perform transmission for one or a plurality of repetitions within each nominal repetition. For one or a plurality of actual repetitions within an $n^{th}$ nominal repetition, RBstart(n) which is an index of the start RB in the frequency domain may follow [Equation 6] below:

$$\begin{cases} RB_{start} & n \bmod 2 = 0 \\ (RB_{start} + RB_{offset}) \bmod N_{BWP}^{size} & n \bmod 2 = 1. \end{cases} \quad \text{[Equation 6]}$$

In [Equation 6], n denotes an index of nominal repetition, and $RB_{offset}$ denotes an RB offset between two hops through a higher-layer parameter.

[PUSCH: Multiplexing Rule in AP/SP CSI Reporting]

Hereinafter, a method of measuring and reporting a channel state in a 5G communication system to which the disclosure can be applied is described in detail. Channel state information (CSI) may include a channel quality indicator (channel quality information (CQI)), a precoding matrix index (precoding matric indicator (PMI)), a CSI-RS resource indicator (CRI), an SS/PBCH block resource indicator (SSBRI), a layer indicator (LI), a rank indicator (RI), and/or an L1-reference signal received power (RSRP). The BS may control time and frequency resources for the CSI measurement and report of the UE.

For the CSI measurement and report, the UE may receive a configuration of setting information (CSI-ReportConfig) for N(≥1) CSI reports, setting information (CSI-ResourceConfig) for M(≥1) RS transmission resources, one or two trigger states (CSI-AperiodicTriggerStateList, CSI-SemiPersistentOnPUSCH-TriggerStateList) list information through higher-layer signaling. Configuration information for measuring and reporting the CSI may be as shown in [Table 33] to [Table 39] in more detail.

TABLE 33

CSI-ReportConfig
The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included(in this case, the cell on which the report is sent is determined by the received DCI). See TS 38.214 [19], clause 5.2.1.

CSI-ReportConfig information element

```
-- ASN1START
-- TAG-CSI-REPORTCONFIG-START
CSI-ReportConfig ::=             SEQUENCE {
  reportConfigId                   CSI-ReportConfigId,
  carrier                        ServCellIndex                              OPTIONAL,  -- Need S
  resourcesForChannelMeasurement                   CSI-ResourceConfigId,
  csi-IM-ResourcesForInterference                  CSI-ResourceConfigId                 OPTIONAL,
-- Need R
  nzp-CSI-RS-ResourcesForInterference                                                CSI-ResourceConfigId
OPTIONAL,  -- Need R
  reportConfigType                 CHOICE {
    periodic                       SEQUENCE {
      reportSlotConfig                 CSI-ReportPeriodicityAndOffset,
      pucch-CSI-ResourceList               SEQUENCE(SIZE(1..maxNrofBWPs)) OF
PUCCH-CSI-Resource
    },
    semiPersistentOnPUCCH            SEQUENCE {
      reportSlotConfig                 CSI-ReportPeriodicityAndOffset,
      pucch-CSI-ResourceList               SEQUENCE(SIZE(1..maxNrofBWPs)) OF
PUCCH-CSI-Resource
    },
    semiPersistentOnPUSCH            SEQUENCE {
      reportSlotConfig                 ENUMERATED {sl5, sl10, sl20, sl40, sl80,
sl160, sl320},
      reportSlotOffsetList             SEQUENCE(SIZE(1.. maxNrofUL-Allocations))
OF INTEGER(0..32),
      p0alpha                        P0-PUSCH-AlphaSetId
    },
    aperiodic                      SEQUENCE {
      reportSlotOffsetList             SEQUENCE(SIZE(1..maxNrofUL-Allocations))
OF INTEGER(0..32)
    }
  },
  reportQuantity                   CHOICE {
    none                           NULL,
    cri-RI-PMI-CQI                   NULL,
    cri-RI-i1                      NULL,
    cri-RI-i1-CQI                    SEQUENCE {
      pdsch-BundleSizeForCSI                                            ENUMERATED  {n2, n4}
OPTIONAL  -- Need S
    },
```

TABLE 33-continued

CSI-ReportConfig
The IE CSI-ReportConfig is used to configure a periodic or semi-persistent report sent on PUCCH on the cell in which
the CSI-ReportConfig is included, or to configure a semi-persistent or aperiodic report sent on PUSCH
triggered by DCI received on the cell in which the CSI-ReportConfig is included(in this case, the cell on
which the report is sent is determined by the received DCI). See TS 38.214 [19], clause 5.2.1.

```
        cri-RI-CQI                              NULL,
        cri-RSRP                                NULL,
        ssb-Index-RSRP                          NULL,
        cri-RI-LI-PMI-CQI                         NULL
    },
    reportFreqConfiguration                     SEQUENCE {
        cqi-FormatIndicator                     ENUMERATED { widebandCQI, subbandCQI }
OPTIONAL,  -- Need R
        pmi-FormatIndicator                                             ENUMERATED  {  widebandPMI,
subbandPMI }                          OPTIONAL,  -- Need R
        csi-ReportingBand                       CHOICE {
            subbands3                           BIT STRING(SIZE(3)),
            subbands4                           BIT STRING(SIZE(4)),
            subbands5                           BIT STRING(SIZE(5)),
            subbands6                           BIT STRING(SIZE(6)),
            subbands7                           BIT STRING(SIZE(7)),
            subbands8                           BIT STRING(SIZE(8)),
            subbands9                           BIT STRING(SIZE(9)),
            subbands10                          BIT STRING(SIZE(10)),
            subbands11                          BIT STRING(SIZE(11)),
            subbands12                          BIT STRING(SIZE(12)),
            subbands13                          BIT STRING(SIZE(13)),
            subbands14                          BIT STRING(SIZE(14)),
            subbands15                          BIT STRING(SIZE(15)),
            subbands16                          BIT STRING(SIZE(16)),
            subbands17                          BIT STRING(SIZE(17)),
            subbands18                          BIT STRING(SIZE(18)),
            ...,
            subbands19-v1530                    BIT STRING(SIZE(19))
        }   OPTIONAL  -- Need S
    }                                                                   OPTIONAL,  -
- Need R
        timeRestrictionForChannelMeasurements                   ENUMERATED  {configured,
notConfigured},
        timeRestrictionForInterferenceMeasurements              ENUMERATED  {configured,
notConfigured},
        codebookConfig                                          CodebookConfig
OPTIONAL,  -- Need R
        dummy                                                   ENUMERATED  {n1,  n2}
OPTIONAL,  -- Need R
        groupBasedBeamReporting                 CHOICE {
            enabled                             NULL,
            disabled                            SEQUENCE {
                nrofReportedRS                                  ENUMERATED  {n1,  n2,  n3,  n4}
OPTIONAL  -- Need S
            }
        },
        cqi-Table                       ENUMERATED {table1, table2, table3, spare1}
OPTIONAL,  -- Need R
        subbandSize             ENUMERATED {value1, value2},
        non-PMI-PortIndication              SEQUENCE(SIZE(1..maxNrofNZP-CSI-RS-
ResourcesPerConfig)) OF PortIndexFor8Ranks OPTIONAL,  -- Need R
        ...,
        [[
        semiPersistentOnPUSCH-v1530             SEQUENCE {
            reportSlotConfig-v1530              ENUMERATED {sl4, sl8, sl16}
        }                                                       OPTIONAL  --
Need R
        ]],
        [[
        semiPersistentOnPUSCH-v1610             SEQUENCE {
            reportSlotOffsetListDCI-0-2-r16                 SEQUENCE(SIZE(1..   maxNrofUL-
Allocations-r16)) OF INTEGER(0..32)         OPTIONAL,  -- Need R
            reportSlotOffsetListDCI-0-1-r16                 SEQUENCE(SIZE(1..   maxNrofUL-
Allocations-r16)) OF INTEGER(0..32)         OPTIONAL  -- Need R
        }                                                                   OPTIONAL,  -
- Need R
        aperiodic-v1610                 SEQUENCE {
            reportSlotOffsetListDCI-0-2-r16                 SEQUENCE(SIZE(1..   maxNrofUL-
Allocations-r16)) OF INTEGER(0..32)         OPTIONAL,  -- Need R
            reportSlotOffsetListDCI-0-1-r16                 SEQUENCE(SIZE(1..   maxNrofUL-
Allocations-r16)) OF INTEGER(0..32)         OPTIONAL  -- Need R
        }                                                                   OPTIONAL,  -
- Need R
```

TABLE 33-continued

CSI-ReportConfig
The IE CSI-ReportConfig is used to configure a periodic or semi-persistent report sent on PUCCH on the cell in which
the CSI-ReportConfig is included, or to configure a semi-persistent or aperiodic report sent on PUSCH
triggered by DCI received on the cell in which the CSI-ReportConfig is included(in this case, the cell on
which the report is sent is determined by the received DCI). See TS 38.214 [19], clause 5.2.1.

```
    reportQuantity-r16                  CHOICE {
        cri-SINR-r16                    NULL,
        ssb-Index-SINR-r16              NULL
    }                                                                           OPTIONAL,  -
- Need R
    codebookConfig-r16                                          CodebookConfig-r16
OPTIONAL   -- Need R
    ]]
}
CSI-ReportPeriodicityAndOffset ::= CHOICE {
    slots4                              INTEGER(0..3),
    slots5                              INTEGER(0..4),
    slots8                              INTEGER(0..7),
    slots10                             INTEGER(0..9),
    slots16                             INTEGER(0..15),
    slots20                             INTEGER(0..19),
    slots40                             INTEGER(0..39),
    slots80                             INTEGER(0..79),
    slots160                            INTEGER(0..159),
    slots320                            INTEGER(0..319)
}
PUCCH-CSI-Resource ::=                  SEQUENCE {
    uplinkBandwidthPartId                   BWP-Id,
    pucch-Resource                      PUCCH-ResourceId
}
PortIndexFor8Ranks ::=                  CHOICE {
    portIndex8                          SEQUENCE{
        rank1-8                                                         PortIndex8
OPTIONAL,   -- Need R
        rank2-8                             SEQUENCE(SIZE(2))  OF  PortIndex8
OPTIONAL,   -- Need R
        rank3-8                             SEQUENCE(SIZE(3))  OF  PortIndex8
OPTIONAL,   -- Need R
        rank4-8                             SEQUENCE(SIZE(4))  OF  PortIndex8
OPTIONAL,   -- Need R
        rank5-8                             SEQUENCE(SIZE(5))  OF  PortIndex8
OPTIONAL,   -- Need R
        rank6-8                             SEQUENCE(SIZE(6))  OF  PortIndex8
OPTIONAL,   -- Need R
        rank7-8                             SEQUENCE(SIZE(7))  OF  PortIndex8
OPTIONAL,   -- Need R
        rank8-8                             SEQUENCE(SIZE(8))  OF  PortIndex8
OPTIONAL   -- Need R
    },
    portIndex4                          SEQUENCE{
        rank1-4                                                         PortIndex4
OPTIONAL,   -- Need R
        rank2-4                             SEQUENCE(SIZE(2))  OF  PortIndex4
OPTIONAL,   -- Need R
        rank3-4                             SEQUENCE(SIZE(3))  OF  PortIndex4
OPTIONAL,   -- Need R
        rank4-4                             SEQUENCE(SIZE(4))  OF  PortIndex4
OPTIONAL   -- Need R
    },
    portIndex2                          SEQUENCE{
        rank1-2                                                         PortIndex2
OPTIONAL,   -- Need R
        rank2-2                             SEQUENCE(SIZE(2))  OF  PortIndex2
OPTIONAL   -- Need R
    },
    portIndex1                          NULL
}
PortIndex8::=                           INTEGER (0..7)
PortIndex4::=                           INTEGER (0..3)
PortIndex2::=                           INTEGER (0..1)
-- TAG-CSI-REPORTCONFIG-STOP
-- ASN1STOP
```

CSI-ReportConfig field descriptions carrier
Indicates in which serving cell the CSI-ResourceConfig indicated below are to be
found. If the field is absent, the resources are on the same serving cell as this report
configuration.

TABLE 33-continued

CSI-ReportConfig
The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included(in this case, the cell on which the report is sent is determined by the received DCI). See TS 38.214 [19], clause 5.2.1.

codebookConfig
Codebook configuration for Type-1 or Type-2 including codebook subset restriction.
Network does not configure codebookConfig and codebookConfig-r16 simultaneously
to a UE
cqi-FormatIndicator
Indicates whether the UE shall report a single (wideband) or multiple (subband) CQI.
(see TS 38.214 [19], clause 5.2.1.4).
cqi-Table
Which CQI table to use for CQI calculation (see TS 38.214 [19], clause 5.2.2.1).
csi-IM-ResourcesForInterference
CSI IM resources for interference measurement. csi-ResourceConfigId of a CSI-
ResourceConfig included in the configuration of the serving cell indicated with the
field "carrier" above. The CSI-ResourceConfig indicated here contains only CSI-IM
resources. The bwp-Id in that CSI-ResourceConfig is the same value as the bwp-Id in
the CSI-ResourceConfig indicated by resourcesForChannelMeasurement.
csi-ReportingBand
Indicates a contiguous or non-contiguous subset of subbands in the bandwidth part
which CSI shall be reported for. Each bit in the bit-string represents one subband. The
right-most bit in the bit string represents the lowest subband in the BWP. The choice
determines the number of subbands (subbands3 for 3 subbands, subbands4 for 4
subbands, and so on) (see TS 38.214 [19], clause 5.2.1.4). This field is absent if there
are less than 24 PRBs (no sub band) and present otherwise, the number of sub bands
can be from 3 (24 PRBs, sub band size 8) to 18 (72 PRBs, sub band size 4).
dummy
This field is not used in the specification. If received it shall be ignored by the UE.
groupBasedBeamReporting
Turning on/off group beam based reporting (see TS 38.214 [19], clause 5.2.1.4).
non-PMI-PortIndication
Port indication for RI/CQI calculation. For each CSI-RS resource in the linked
ResourceConfig for channel measurement, a port indication for each rank R,
indicating which R ports to use. Applicable only for non-PMI feedback (see TS
38.214[19], clause 5.2.1.4.2).
The first entry in non-PMI-PortIndication corresponds to the NZP-CSI-RS-Resource
indicated by the first entry in nzp-CSI-RS-Resources in the NZP-CSI-RS-ResourceSet
indicated in the first entry of nzp-CSI-RS-ResourceSetList of the CSI-ResourceConfig
whose CSI-ResourceConfigId is indicated in a CSI-MeasId together with the above
CSI-ReportConfigId; the second entry in non-PMI-PortIndication corresponds to the
NZP-CSI-RS-Resource indicated by the second entry in nzp-CSI-RS-Resources in the
NZP-CSI-RS-ResourceSet indicated in the first entry of nzp-CSI-RS-ResourceSetList
of the same CSI-ResourceConfig, and so on until the NZP-CSI-RS-Resource indicated
by the last entry in nzp-CSI-RS-Resources in the in the NZP-CSI-RS-ResourceSet
indicated in the first entry of nzp-CSI-RS-ResourceSetList of the same CSI-
ResourceConfig. Then the next entry corresponds to the NZP-CSI-RS-Resource
indicated by the first entry in nzp-CSI-RS-Resources in the NZP-CSI-RS-ResourceSet
indicated in the second entry of nzp-CSI-RS-ResourceSetList of the same CSI-
ResourceConfig and so on.
nrofReportedRS
The number (N) of measured RS resources to be reported per report setting in a non-
group-based report. N <= N_max, where N_max is either 2 or 4 depending on UE
capability.
(see TS 38.214 [19], clause 5.2.1.4) When the field is absent the UE applies the value 1.
nzp-CSI-RS-ResourcesForInterference
NZP CSI RS resources for interference measurement. csi-ResourceConfigId of a CSI-
ResourceConfig included in the configuration of the serving cell indicated with the
field "carrier" above. The CSI-ResourceConfig indicated here contains only NZP-CSI-
RS resources. The bwp-Id in that CSI-ResourceConfig is the same value as the bwp-Id
in the CSI-ResourceConfig indicated by resourcesForChannelMeasurement.
p0alpha
Index of the p0-alpha set determining the power control for this CSI report
transmission (see TS 38.214 [19], clause 6.2.1.2).
pdsch-BundleSizeForCSI
PRB bundling size to assume for CQI calculation when reportQuantity is
CRI/RI/i1/CQI. If the field is absent, the UE assumes that no PRB bundling is applied
(see TS 38.214 [19], clause 5.2.1.4.2).
pmi-FormatIndicator
Indicates whether the UE shall report a single (wideband) or multiple (subband) PMI.
(see TS 38.214 [19], clause 5.2.1.4).
pucch-CSI-ResourceList
Indicates which PUCCH resource to use for reporting on PUCCH.
reportConfigType
Time domain behavior of reporting configuration
reportFreqConfiguration
Reporting configuration in the frequency domain. (see TS 38.214 [19], clause 5.2.1.4).
reportQuantity TABLE 33-continued CSI-ReportConfig
The IE CSI-ReportConfig is used to configure a periodic or semi-persistent report sent on PUCCH on the cell in which
the CSI-ReportConfig is included, or to configure a semi-persistent or aperiodic report sent on PUSCH
triggered by DCI received on the cell in which the CSI-ReportConfig is included(in this case, the cell on
which the report is sent is determined by the received DCI). See TS 38.214 [19], clause 5.2.1.

The CSI related quantities to report. see TS 38.214 [19], clause 5.5.1. If the field
reportQuantity-r16 is present, UE shall ignore reportQuantity (without suffix).
reportSlotConfig
Periodicity and slot offset (see TS 38.214 [19], clause 5.2.1.4). If the field
reportSlotConfig-v1530 is present, the UE shall ignore the value provided in
reportSlotConfig (without suffix).
reportSlotOffsetList, reportSlotOffsetListDCI-0-1, reportSlotOffsetListDCI-0-2
Timing offset Y for semi persistent reporting using PUSCH. This field lists the
allowed offset values. This list must have the same number of entries as the pusch-
TimeDomainAllocationList in PUSCH-Config. A particular value is indicated in DCI.
The network indicates in the DCI field of the UL grant, which of the configured
report slot offsets the UE shall apply. The DCI value 0 corresponds to the first report
slot offset in this list, the DCI value 1 corresponds to the second report slot offset in
this list, and so on. The first report is transmitted in slot n + Y, second report in
n + Y + P, where P is the configured periodicity.
Timing offset Y for aperiodic reporting using PUSCH. This field lists the allowed offset
values. This list must have the same number of entries as the pusch-
TimeDomainAllocationList in PUSCH-Config. A particular value is indicated in DCI.
The network indicates in the DCI field of the UL grant, which of the configured report
slot offsets the UE shall apply. The DCI value 0 corresponds to the first report slot
offset in this list, the DCI value 1 corresponds to the second report slot offset in this
list, and so on (see TS 38.214 [19], clause 6.1.2.1). The field reportSlotOffsetList
applies to DCI format 0_0, the field reportSlotOffsetListDCI-0-1 applies to DCI format
0_1 and the field reportSlotOffsetListDCI-0-2 applies to DCI format 0_2 (see TS
38.214 [19], clause 6.1.2.1).
resourcesForChannelMeasurement
Resources for channel measurement. csi-ResourceConfigId of a CSI-ResourceConfig
included in the configuration of the serving cell indicated with the field "carrier" above.
The CSI-ResourceConfig indicated here contains only NZP-CSI-RS resources and/or
SSB resources. This CSI-ReportConfig is associated with the DL BWP indicated by
bwp-Id in that CSI-ResourceConfig.
subbandSize
Indicates one out of two possible BWP-dependent values for the subband size as
indicated in TS 38.214 [19], table 5.2.1.4-2. If csi-ReportingBand is absent, the UE
shall ignore this field.
timeRestrictionForChannelMeasurements
Time domain measurement restriction for the channel (signal) measurements (see TS
38.214 [19], clause 5.2.1.1).
timeRestrictionForInterferenceMeasurements
Time domain measurement restriction for interference measurements (see TS 38.214
[19], clause 5.2.1.1).

TABLE 34

CSI-ResourceConfig
The IE CSI-ResourceConfig defines a group of one or more NZP-CSI-RS-ResourceSet,
CSI-IM-ResourceSet and/or CSI-SSB-ResourceSet.

CSI-ResourceConfig information element

```
-- ASN1START
-- TAG-CSI-RESOURCECONFIG-START
CSI-ResourceConfig ::=           SEQUENCE {
  csi-ResourceConfigId             CSI-ResourceConfigId,
  csi-RS-ResourceSetList           CHOICE {
    nzp-CSI-RS-SSB                   SEQUENCE {
      nzp-CSI-RS-ResourceSetList          SEQUENCE(SIZE(1..maxNrofNZP-CSI-RS-
ResourceSetsPerConfig)) OF NZP-CSI-RS-ResourceSetId
OPTIONAL, -- Need R
      csi-SSB-ResourceSetList             SEQUENCE(SIZE(1..maxNrofCSI-SSB-
ResourceSetsPerConfig)) OF CSI-SSB-ResourceSetId OPTIONAL -- Need R
    },
    csi-IM-ResourceSetList            SEQUENCE(SIZE(1..maxNrofCSI-IM-
ResourceSetsPerConfig)) OF CSI-IM-ResourceSetId
```

TABLE 34-continued

CSI-ResourceConfig
The IE CSI-ResourceConfig defines a group of one or more NZP-CSI-RS-ResourceSet,
CSI-IM-ResourceSet and/or CSI-SSB-ResourceSet.

```
},
   bwp-Id                       BWP-Id,
   resourceType                 ENUMERATED { aperiodic, semiPersistent, periodic },
   ...
}
-- TAG-CSI-RESOURCECONFIG-STOP
-- ASN1STOP
```

CSI-ResourceConfig field descriptions bwp-Id
The DL BWP which the CSI-RS associated with this CSI-ResourceConfig are located
in (see TS 38.214 [19], clause 5.2.1.2).
csi-IM-ResourceSetList
List of references to CSI-IM resources used for beam measurement and reporting in a
CSI-RS resource set Contains up to maxNrofCSI-IM-ResourceSetsPerConfig resource
sets if resourceType is 'aperiodic' and 1 otherwise (see TS 38.214 [19], clause 5.2.1.2).
csi-ResourceConfigId
Used in CSI-ReportConfig to refer to an instance of CSI-ResourceConfig.
csi-SSB-ResourceSetList
List of references to SSB resources used for beam measurement and reporting in a CSI-
RS resource set (see TS 38.214 [19], clause 5.2.1.2).
nzp-CSI-RS-ResourceSetList
List of references to NZP CSI-RS resources used for beam measurement and reporting
in a CSI-RS resource set. Contains up to maxNrofNZP-CSI-RS-ResourceSetsPerConfig
resource sets if resoureType is 'aperiodic' and 1 otherwise (see TS 38.214 [19], clause
5.2.1.2).
resourceType
Time domain behavior of resource configuration (see TS 38.214 [19], clause 5.2.1.2).
It does not apply to resources provided in the csi-SSB-ResourceSetList.

TABLE 35

NZP-CSI-RS-ResourceSet
The IE NZP-CSI-RS-ResourceSet is a set of Non-Zero-Power(NZP) CSI-RS
resources(their IDs) and set-specific parameters.

NZP-CSI-RS-ResourceSet information element

```
-- ASN1START
-- TAG-NZP-CSI-RS-RESOURCESET-START
NZP-CSI-RS-ResourceSet ::=      SEQUENCE {
   nzp-CSI-ResourceSetId        NZP-CSI-RS-ResourceSetId,
   nzp-CSI-RS-Resources         SEQUENCE(SIZE(1..maxNrofNZP-CSI-RS-
ResourcesPerSet)) OF NZP-CSI-RS-ResourceId,
   repetition                   ENUMERATED   { on,   off }
OPTIONAL,  -- Need S
   aperiodicTriggeringOffset            INTEGER(0..6)
OPTIONAL,  -- Need S
   trs-Info                     ENUMERATED   {true}
OPTIONAL,  -- Need R
   ...,
   [[
   aperiodicTriggeringOffset-r16        INTEGER(0..31)
OPTIONAL   -- Need S
   ]]
}
-- TAG-NZP-CSI-RS-RESOURCESET-STOP
-- ASN1STOP
```

NZP-CSI-RS-ResourceSet field descriptions aperiodicTriggeringOffset, aperiodicTriggeringOffset-r16
Offset X between the slot containing the DCI that triggers a set of aperiodic NZP CSI-
RS resources and the slot in which the CSI-RS resource set is transmitted. For
aperiodicTriggeringOffset the value 0 corresponds to 0 slots, value 1 corresponds to
1 slot, value 2 corresponds to 2 slots, value 3 corresponds to 3 slots, value 4
corresponds to 4 slots, value 5 corresponds to 16 slots, value 6 corresponds to 24 slots.
For aperiodicTriggeringOffset-r16, the value indicates the number of slots. The
network configures only one of the fields. When neither field is included, the UE
applies the value 0.
nzp-CSI-RS-Resources

TABLE 35-continued

NZP-CSI-RS-ResourceSet
The IE NZP-CSI-RS-ResourceSet is a set of Non-Zero-Power(NZP) CSI-RS resources(their IDs) and set-specific parameters.

NZP-CSI-RS-Resources associated with this NZP-CSI-RS resource set (see TS 38.214 [19], clause 5.2). For CSI, there are at most 8 NZP CSI RS resources per resource set.
repetition
Indicates whether repetition is on/off. If the field is set to off or if the field is absent, the UE may not assume that the NZP-CSI-RS resources within the resource set are transmitted with the same downlink spatial domain transmission filter (see TS 38.214 [19], clauses 5.2.2.3.1 and 5.1.6.1.2). It can only be configured for CSI-RS resource sets which are associated with CSI-ReportConfig with report of L1 RSRP or "no report".
trs-Info
Indicates that the antenna port for all NZP-CSI-RS resources in the CSI-RS resource set is same. If the field is absent or released the UE applies the value false (see TS 38.214 [19], clause 5.2.2.3.1).

TABLE 36

CSI-SSB-ResourceSet
The IE CSI-SSB-ResourceSet is used to configure one SS/PBCH block resource set which refers to SS/PBCH as indicated in ServingCellConfigCommon.
CSI-SSB-ResourceSet information element

```
-- ASN1START
-- TAG-CSI-SSB-RESOURCESET-START
CSI-SSB-ResourceSet ::= SEQUENCE {
    csi-SSB-ResourceSetId    CSI-SSB-ResourceSetId,
    csi-SSB-ResourceList     SEQUENCE(SIZE(1..maxNrofCSI-SSB-ResourcePerSet)) OF SSB-Index,
    ...
}
-- TAG-CSI-SSB-RESOURCESET-STOP
-- ASN1STOP
```

TABLE 37

CSI-IM-ResourceSet
The IE CSI-IM-ResourceSet is used to configure a set of one or more CSI Interference Management(IM) resources(their IDs) and set-specific parameters.

CSI-IM-ResourceSet information element

```
-- ASN1START
-- TAG-CSI-IM-RESOURCESET-START
CSI-IM-ResourceSet ::=   SEQUENCE {
    csi-IM-ResourceSetId    CSI-IM-ResourceSetId,
    csi-IM-Resources        SEQUENCE(SIZE(1..maxNrofCSI-IM-ResourcesPerSet)) OF CSI-IM-ResourceId,
    ...
}
-- TAG-CSI-IM-RESOURCESET-STOP
-- ASN1STOP
```

CSI-IM-ResourceSet field descriptions csi-IM-Resources
CSI-IM-Resources associated with this CSI-IM-ResourceSet (see TS 38.214 [19], clause 5.2)

TABLE 38

CSI-AperiodicTriggerStateList
The CSI-AperiodicTriggerStateList IE is used to configure the UE with a list of aperiodic trigger states. Each codepoint of the DCI field "CSI request" is associated with one trigger state. Upon reception of the value associated with a trigger state, the UE will perform measurement of CSI-RS(reference signals) and aperiodic reporting on L1 according to all entries in the associatedReportConfigInfoList for that trigger state.

CSI-AperiodicTriggerStateList information element

```
-- ASN1START
-- TAG-CSI-APERIODICTRIGGERSTATELIST-START
CSI-AperiodicTriggerStateList ::=    SEQUENCE(SIZE(1..maxNrOfCSI-AperiodicTriggers))
    OF CSI-AperiodicTriggerState
CSI-AperiodicTriggerState ::=        SEQUENCE {
    associatedReportConfigInfoList
```

TABLE 38-continued

CSI-AperiodicTriggerStateList
The CSI-AperiodicTriggerStateList IE is used to configure the UE with a list of aperiodic trigger
states. Each codepoint of the DCI field "CSI request" is associated with one trigger state. Upon
reception of the value associated with a trigger state, the UE will perform measurement of CSI-
RS(reference signals) and aperiodic reporting on L1 according to all entries in the
associatedReportConfigInfoList for that trigger state.

```
SEQUENCE(SIZE(1..maxNrofReportConfigPerAperiodicTrigger)) OF CSI-
AssociatedReportConfigInfo,
    ...
}
CSI-AssociatedReportConfigInfo ::=       SEQUENCE {
    reportConfigId                       CSI-ReportConfigId,
    resourcesForChannel                    CHOICE {
        nzp-CSI-RS                       SEQUENCE {
            resourceSet                          INTEGER(1..maxNrofNZP-CSI-RS-
ResourceSetsPerConfig),
            qcl-info                     SEQUENCE(SIZE(1..maxNrofAP-CSI-RS-ResourcesPerSet))
OF TCI-StateId OPTIONAL -- Cond Aperiodic
        },
        csi-SSB-ResourceSet                      INTEGER(1..maxNrofCSI-SSB-ResourceSetsPerConfig)
    },
    csi-IM-ResourcesForInterference              INTEGER(1..maxNrofCSI-IM-ResourceSetsPerConfig)
OPTIONAL, -- Cond CSI-IM-ForInterference
    nzp-CSI-RS-ResourcesForInterference          INTEGER   (1..maxNrofNZP-CSI-RS-
ResourceSetsPerConfig)   OPTIONAL, -- Cond NZP-CSI-RS-ForInterference
    ...
}
-- TAG-CSI-APERIODICTRIGGERSTATELIST-STOP
-- ASN1STOP
```

CSI-AssociatedReportConfigInfo field descriptions csi-IM-ResourcesForInterference
CSI-IM-ResourceSet for interference measurement. Entry number in csi-IM-ResourceSetList
in the CSI-ResourceConfig indicated by csi-IM-ResourcesForInterference in the CSI-
ReportConfig indicated by reportConfigId above (1 corresponds to the first entry, 2 to the
second entry, and so on). The indicated CSI-IM-ResourceSet should have exactly the same
number of resources like the NZP-CSI-RS-ResourceSet indicated in nzp-CSI-RS-
ResourcesforChannel.
csi-SSB-ResourceSet
CSI-SSB-ResourceSet for channel measurements. Entry number in csi-SSB-ResourceSetList
in the CSI-ResourceConfig indicated by resourcesForChannelMeasurement in the CSI-
ReportConfig indicated by reportConfigId above (1 corresponds to the first entry, 2 to the
second entry, and so on).
nzp-CSI-RS-ResourcesForInterference
NZP-CSI-RS-ResourceSet for interference measurement. Entry number in nzp-CSI-RS-
ResourceSetList in the CSI-ResourceConfig indicated by nzp-CSI-RS-
ResourcesForInterference in the CSI-ReportConfig indicated by reportConfigId above (1
corresponds to the first entry, 2 to the second entry, and so on).
qcl-info
List of references to TCI-States for providing the QCL source and QCL type for each NZP-
CSI-RS-Resource listed in nzp-CSI-RS-Resources of the NZP-CSI-RS-ResourceSet indicated
by nzp-CSI-RS-ResourcesforChannel. Each TCI-StateId refers to the TCI-State which has this
value for tci-StateId and is defined in tci-StatesToAddModList in the PDSCH-Config included
in the BWP-Downlink corresponding to the serving cell and to the DL BWP to which the
resourcesForChannelMeasurement (in the CSI-ReportConfig indicated by reportConfigId
above) belong to. First entry in qcl-info-forChannel corresponds to first entry in nzp-CSI-RS-
Resources of that NZP-CSI-RS-ResourceSet, second entry in qcl-info-forChannel corresponds
to second entry in nzp-CSI-RS-Resources, and so on (see TS 38.214 [19], clause 5.2.1.5.1)
reportConfigId
The reportConfigId of one of the CSI-ReportConfigToAddMod configured in CSI-MeasConfig
resourceSet
NZP-CSI-RS-ResourceSet for channel measurements. Entry number in nzp-CSI-RS-
ResourceSetList in the CSI-ResourceConfig indicated by resourcesForChannelMeasurement
in the CSI-ReportConfig indicated by reportConfigId above (1 corresponds to the first entry, 2
to the second entry, and so on).

| Conditional Presence | Explanation |
| --- | --- |
| Aperiodic | The field is mandatory present if the NZP-CSI-RS-Resources in the associated resourceSet have the resourceType aperiodic. The field is absent otherwise. |
| CSI-IM-ForInterference | This field is optional need M if the CSI-ReportConfig identified by reportConfigId is configured with csi-IM-ResourcesForInterference; otherwise it is absent. |
| NZP-CSI-RS-ForInterference | This field is optional need M if the CSI-ReportConfig identified by reportConfigId is configured with nzp-CSI-RS-ResourcesForInterference; otherwise it is absent. |

TABLE 39

CSI-SemiPersistentOnPUSCH-TriggerStateList
The CSI-SemiPersistentOnPUSCH-TriggerStateList IE is used to configure the
UE with list of trigger states for semi-persistent reporting of channel
state information on L1. See also TS 38.214 [19], clause 5.2.
CSI-SemiPersistentOnPUSCH-TriggerStateList information element

```
-- ASN1START
-- TAG-CSI-SEMIPERSISTENTONPUSCHTRIGGERSTATELIST-START
CSI-SemiPersistentOnPUSCH-TriggerStateList ::=
SEQUENCE(SIZE(1..maxNrOfSemiPersistentPUSCH-Triggers)) OF CSI-
SemiPersistentOnPUSCH-TriggerState
CSI-SemiPersistentOnPUSCH-TriggerState ::=      SEQUENCE {
    associatedReportConfigInfo                  CSI-ReportConfigId,
    ...
}
-- TAG-CSI-SEMIPERSISTENTONPUSCHTRIGGERSTATELIST-STOP
-- ASN1STOP
```

For the CSI report setting (CSI-ReportConfig), each report setting CSI-ReportConfig is CSI resource setting CSI-ResourceConfig associated with the corresponding report setting and may be associated with one downlink (DL) BWP identified by a given higher-layer parameter BWP identifier (bwp-id). As a time domain reporting operation for each report setting CSI-ReportConfig, "aperiodic," "semi-persistent," and "periodic" schemes may be supported, and may be configured in the UE by the BS through reportConfigType parameters configured by a higher layer. The semi-persistent CSI reporting method supports "PUCCH-based semi-persistent (semi-PersistentOn-PUCCH) and "PUSCH-based persistent (semi-PersistentOnPUSCH)." In the case of the periodic or semi-persistent CSI reporting method, the UE may receive a configuration of PUCCH or PUSCH resources for transmitting the CSI from the BS through higher-layer signaling. A period of PUCCH or PUSCH resources for transmitting the CSI and a slot offset may be given on the basis of numerology of an uplink (UL) BWP configured to transmit the CSI report. In the case of the aperiodic CSI reporting method, the UE may receive scheduling of PUSCH resources for transmitting the CSI from the BS through L1 signaling (DCI format 0_1).

For the CSI resource settings (CSI-ResourceConfig), each CSI resource setting CSI-ReportConfig may include $S(\geq 1)$ CSI resource sets (configured as a higher-layer parameter csi-RS-ResourceSetList). The CSI resource set list may include a non-zero power (NZP) CSI-RS resource set and an SS/PBCH block set or include a CSI-interference measurement (CSI-IM) resource set. Each CSI resource setting may be located in a downlink (DL) BWP identified by a higher-layer parameter bwp-id, and the CSI resource setting may be connected to a CSI report setting in the same downlink BWP. The time domain operation of CSI-RS resources within the CSI resource settings may be configured as one of "aperiodic," "periodic," or "semi-persistent" from the higher-layer parameter resourceType. For the periodic or semi-persistent CSI resource settings, the number of CSI-RS resource sets may be limited to S=1, and the configured period and slot offset may be given on the basis of numerology of a downlink BWP identified by bwp-id.

The UE may receive a configuration of one or more CSI resource settings for channel or interference measurement from the BS through higher-layer signaling, and may include, for example, the following CSI resources.

CSI-IM resources for interference measurement;
NZP CSI-RS resources for interference measurement; and
NZP CSI-RS resources for channel measurement.

For CSI-RS resource sets associated with resource setting in which higher-layer parameter resourceType is configured as "aperiodic," "periodic," or "semi-persistent," resource setting for a trigger state for CSI reporting setting in which reprotType is configured as "aperiodic" and a channel or interference measurement for one or a plurality of component cells (CCs) may be configured through higher-layer parameter CSI-AperiodicTriggerStateList.

The aperiodic CSI report of the UE may use the PUSCH, the periodic CSI report may use the PUCCH, and the semi-persistent CSI report may use the PUCCH after being activated to the PUSCH or the MAC control element (MAC CE) when triggered or activated by DCI. As described above, the CSI resource setting may also be configured to be aperiodic, periodic, or semi-persistent. Combinations of CSI report settings and CSI resource configurations may be supported on the basis of [Table 40] below.

TABLE 40

Table 5.2.1.4-1: Triggering/Activation of CSI Reporting
for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |

TABLE 40-continued

Table 5.2.1.4-1: Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

The aperiodic CSI reporting may be triggered by a "CSI request" field of DCI format 0_1 corresponding to scheduling DCI for the PUSCH. The UE may monitor the PUCCH, acquire DCI format 0_1, and acquire scheduling information for the PUSCH and a CSI request indicator. The CSI request indicator may be configured as NTS bits (=0, 1, 2, 3, 4, 5, or 6), and may be determined by higher-layer signaling (reportTriggerSize). Among one or a plurality of aperiodic CSI reporting trigger states which can be configured through high-layer signaling (CSI-AperiodicTriggerStateList), one trigger state may be triggered by the CSI request indicator.

When all bits in the CSI request field are 0, it may mean that the CSI reporting is not requested.

When the number (M) of CSI trigger states within the configured CSI-AperiodicTriggerStateList is larger than $2^{NTs}-1$, M CSI trigger states may be mapped to $2^{NTs}-1$ according to a predefined mapping relation, and one of $2^{NTs}-1$ trigger states may be indicated by the CSI request field.

When the number (M) of CSI trigger states within the configured CSI-AperiodicTriggerStateList is smaller than or equal to $2^{NTs}-1$, one of M CSI trigger states may be indicated by the CSI request field.

[Table 41] below shows an example of the relation between a CSI request indicator and a CSI trigger state which can be indicated by the corresponding indicator.

TABLE 41

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1 CSI report#2 | CSI resource#1, CSI resource#2 |
| 10 | CSI trigger state#2 | CSI report#3 | CSI resource#3 |
| 11 | CSI trigger state#3 | CSI report#4 | CSI resource#4 |

The UE may measure CSI resources within the CSI trigger state triggered by the CSI request field and generate the CSI (including one or more of the CQI, the PMI, the CRI, the SSBRI, the LI, the RI, or the L1-RSRP) on the basis thereof. The UE may transmit the acquired CSI by using a PUSCH scheduled by corresponding DCI format 0_1. When 1 bit corresponding to an uplink data indicator (UL-SCH indicator) within DCI format 0_1 indicates "1," uplink data (UL-SCH) and the acquired CSI may be multiplexed and transmitted through PUSCH resources scheduled by DCI format 0_1. When 1 bit corresponding to an uplink data indicator (UL-SCH indicator) within DCI format 0_1 indicates "0," only the CSI may be mapped and transmitted through PUSCH resources scheduled by DCI format 0_1 without uplink data (UL-SCH).

Figure 14:
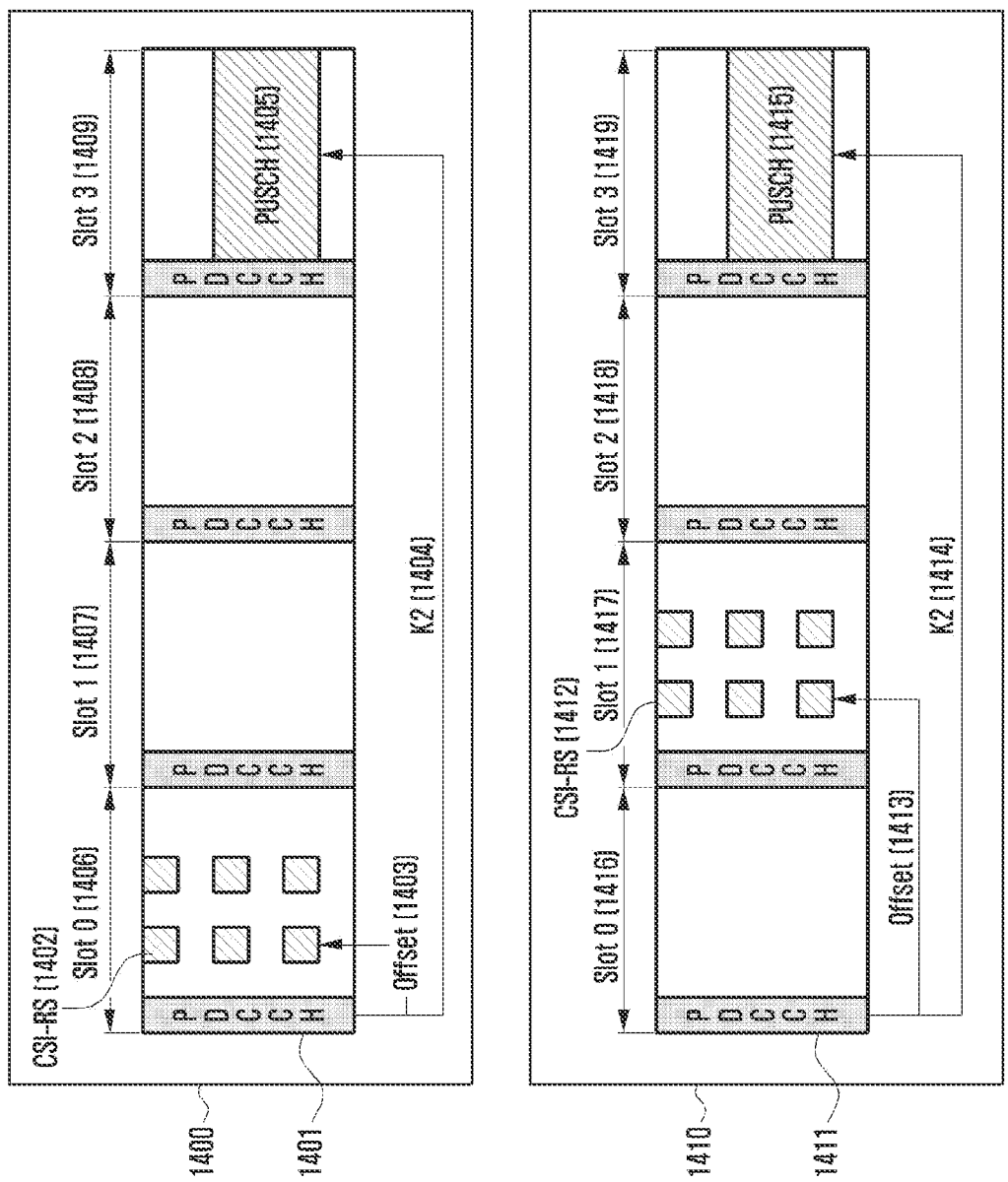
FIG. 14 illustrates an example of an aperiodic CSI reporting method according to an embodiment of the present disclosure.

FIG. 14 illustrates an example of an aperiodic CSI reporting method according to an embodiment of the present disclosure.

In an example 1400 of FIG. 14, the UE may acquire DCI format 0_1 by monitoring a PDCCH 1401 and acquire scheduling information for a PUSCH 1405 and CSI request information therefrom. The UE may acquire resource information for a CSI-RS 1402 to be measured from the received CSI request indicator. The UE may determine a time point at which resources of the transmitted CSI-RS 1402 are measured on the basis of a time point at which DCI format 0_1 is received and a parameter for an offset (aperiodicTriggeringOffset) within an NZP CSI-RS resource set configuration (for example, NZP-CSI-RS-ResourceSet).

More specifically, the UE may receive a configuration of an offset value X of the parameter aperiodicTriggeringOffset within the NZP-CSI-RS resource set configuration from the BS through higher-layer signaling, and the configured offset value X may be an offset between a slot for receiving DCI of triggering the aperiodic CSI report and a slot for transmitting CSI-RS resources. For example, the aperiodicTriggeringOffset parameter value and the offset value X may have a mapping relation shown in [Table 42] below.

TABLE 42

| aperiodicTriggeringOffset | Offset X |
|---|---|
| 0 | 0 slot |
| 1 | 1 slot |
| 2 | 2 slots |
| 3 | 3 slots |
| 4 | 4 slots |
| 5 | 16 slots |
| 6 | 24 slots |

In the example 1400 of FIG. 14, the offset value 1403 is configured as X=0. In this case, the UE may receive the CSI-RS 1402 in the slot (corresponding to slot #0 1406 in FIG. 14) for receiving DCI format 0_1 of triggering the aperiodic CSI reporting and report CSI information measured by the received CSI-RS to the BS through the PUSCH 1405. The UE may acquire scheduling information (information corresponding to each field of DCI format 0_1) for the PUSCH 1405 for the CSI reporting from DCI format 0_1. For example, the UE may acquire information on a slot for transmitting the PUSCH 1405 on the basis of the time domain resource allocation information for the PUSCH 1405 in DCI format 0_1. In the example 1400 of FIG. 14, the UE may acquire 3 that is a K2 value 1404 corresponding to a slot offset value for PDCCH-to-PUSCH, and accordingly, the PUSCH 1405 may be transmitted at a time point at which the PDCCH 1401 is received in slot #3 1409 spaced apart from slot 0 1406 by 3 slots.

In an example 1410 of FIG. 14, the UE may acquire DCI format 0_1 by monitoring a PDCCH 1411 and acquire scheduling information for a PUSCH 1415 and CSI request information therefrom. The UE may acquire resource information for a CSI-RS 1412 to be measured from the received CSI request indicator. In the example 1410 of FIG. 14, the offset value 1413 for the CSI-RS is configured as X=1. In this case, the UE may receive the CSI-RS 1412 in the slot (corresponding to slot #0 1416 in FIG. 14) for receiving DCI format 0_1 of triggering the aperiodic CSI reporting and report CSI information measured by the received CSI-RS to the BS through the PUSCH 1415.

Aperiodic CSI reporting may include at least one or all of CSI part 1 or CSI part 2, and when the aperiodic CSI reporting is transmitted through the PUSCH, the CSI reporting may be multiplexed with a transport block. After a CRC is inserted into input bits of the aperiodic CSI for multiplexing, encoding and rate matching may be performed, and then mapping to resource elements within the PUSCH in a specific pattern may be performed for transmission. The CRC insertion may be omitted according to a coding scheme or the length of input bits. In multiplexing of CSI part 1 or CSI part 2 included in the aperiodic CSI reporting, the number of modulation symbols calculated for rate matching may be calculated as shown in [Table 43] below.

TABLE 43

For CSI part 1 transmission on PUSCH not using repetition type B with UL-SCH, the number of coded modulation symbols per layer for CSI part 1 transmission, denoted as $Q_{CSI\text{-}part1}'$, is determined as follows:

$$Q_{CSI-1}' = \min\left\{\left\lceil\frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil, \left\lceil\alpha \cdot \sum_{l=0}^{N_{symb,all}^{PUSCH}-1} M_{sc}^{UCI}(l)\right\rceil - Q_{ACK/CG-UCI}'\right\}$$

For CSI part 1 transmission on an actual repetition of a PUSCH with repetition Type B with UL-SCH, the number of coded modulation symbols per layer for CSI part 1 transmission, denoted as $Q_{CSI\text{-}part1}'$, is determined as follows:

$$Q_{CSI-1}' = \min\left\{\left\lceil\frac{(O_{CSI-1} + L_{CSI-1}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r}\right\rceil,\right.$$

$$\left.\left\lceil\alpha \cdot \sum_{l=0}^{N_{symb,nominal}^{PUSCH}-1} M_{sc,nominal}^{UCI}(l)\right\rceil - Q_{ACK/CG-UCI}', \sum_{l=0}^{N_{symb,actual}^{PUSCH}-1} M_{sc,actual}^{UCI}(l) - Q_{ACK/CG-UCI}'\right\}$$

. . .

For CSI part 1 transmission on PUSCH without UL-SCH, the number of coded modulation symbols per layer for CSI part 1 transmission, denoted as $Q_{CSI\text{-}part1}'$, is determined as follows:
if there is CSI part 2 to be transmitted on the PUSCH, $$Q_{CSI-1}' = \min\left\{\left\lceil\frac{(O_{CSI-1} + L_{CSI-1}) \cdot \beta_{offset}^{PUSCH}}{R \cdot Q_m}\right\rceil, \sum_{l=0}^{N_{symb,all}^{PUSCH}-1} M_{sc}^{UCI}(l) - Q_{ACK}'\right\}$$

else $$Q_{CSI-1}' = \sum_{l=0}^{N_{symb,all}^{PUSCH}-1} M_{sc}^{UCI}(l) - Q_{ACK}'$$

TABLE 43-continued end if

...

For CSI part 2 transmission on PUSCH not using repetition type B with UL-SCH, the number of coded modulation symbols per layer for CSI part 2 transmission, denoted as $Q_{CSI\text{-}part2}'$, is determined as follows:

$$Q_{CSI-2}' = \min\left\{\left\lceil\frac{(O_{CSI-2} + L_{CSI-2}) \cdot \beta_{offset}^{PUSCH} \cdot \sum_{l=0}^{N_{symb,all}^{PUSCH}-1} M_{sc}^{UCI}(l)}{\sum_{r=0}^{C_{UL\text{-}SCH}-1} K_r}\right\rceil, \left\lfloor\alpha \cdot \sum_{l=0}^{N_{symb,all}^{PUSCH}-1} M_{sc}^{UCI}(l)\right\rfloor - Q_{ACK/CG\text{-}UCI}' - Q_{CSI-1}'\right\}$$

For CSI part 2 transmission on an actual repetition of a PUSCH with repetition Type B with UL-SCH, the number of coded modulation symbols per layer for CSI part 2 transmission, denoted as $Q_{CSI\text{-}part2}'$, is determined as follows:

$$Q_{CSI-2}' = \min\left\{\left\lceil\frac{(O_{CSI-2} + L_{CSI-2}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL\text{-}SCH}-1} K_r}\right\rceil,\right.$$

$$\left.\left\lfloor\alpha \cdot \sum_{l=0}^{N_{symb,nominal}^{PUSCH}-1} M_{sc,nominal}^{UCI}(l)\right\rfloor - Q_{ACK/CG\text{-}UCI}' - Q_{CSI-1}', \sum_{l=0}^{N_{symb,actual}^{PUSCH}-1} M_{sc,actual}^{UCI}(l) - Q_{ACK/CG\text{-}UCI}' - Q_{CSI-1}'\right\}$$

...

For CSI part 2 transmission on PUSCH without UL-SCH, the number of coded modulation symbols per layer for CSI part 2 transmission, denoted as $Q_{CSI\text{-}part2}'$, is determined as follows:

$$Q_{CSI-2}' = \sum_{l=0}^{N_{symb,all}^{PUSCH}-1} M_{sc}^{UCI}(l) - Q_{ACK}' - Q_{CSI-1}'$$

Particularly, in the PUSCH repetitive transmission schemes A and B, the UE may multiplex and transmit the aperiodic CSI reporting only in the first repetitive transmission of the PUSCH repetitive transmission. This is because the multiplexed aperiodic CSI reporting information is encoded in a polar code type in which case, for multiplexing with a plurality of PUSCH repetitions, respective PUSCH repetitions may have the same frequency and time resources, and respective actual repetitions may have different OFDM symbol lengths particularly in the PUSCH repetition type B, and thus the aperiodic CSI reporting may be multiplexed and transmitted only in the first PUSCH repetition.

When the UE schedules the aperiodic CSI reporting without scheduling of the transport block or receives DCI for activating semi-persistent CSI reporting, it may be assumed that a value of nominal repetition is 1 even though the number of PUSCH repetitive transmissions configured through higher-layer signaling is larger than 1. When the UE schedules or activates the aperiodic or semi-persistent CSI reporting without scheduling of the transport block on the basis of the PUSCH repetitive transmission scheme B, the UE may expect that the first nominal repetition be the same as the first actual repetition. When the first nominal repetition is different from the first actual repetition with respect to the transmitted PUSCH including semi-persistent CSI on the basis of the PUSCH repetitive transmission scheme B without scheduling of DCI after the semi-persistent CSI reporting is activated by the DCI, transmission of the first nominal repetition may be ignored.

[UE Capability Report-Related]

In LTE and NR, the UE may perform a procedure of reporting a capability supported by the UE to the corresponding BS in the state in which the UE is connected to a serving BS. In the following description, this is referred to as a UE capability report.

The BS may transmit a UE capability enquiry message that makes a request for a capability report to the UE in the connected state. The message may include a UE capability request for each radio access technology (RAT) type of the BS. The request for each RAT type may include supported frequency band combination information. In the case of the UE capability enquiry message, UE capabilities for each of a plurality of RAT types may be requested through one RRC message container transmitted by the BS or the BS may insert the UE capability enquiry message including the UE capability request for each RAT type multiple times and transmit the same to the UE. That is, the UE capability enquiry is repeated multiple times within one message and the UE may configure a UE capability information message corresponding thereto and report the same multiple times. In the next-generation mobile communication system, a UE capability request for NR, LTE, E-UTRA-NR dual connectivity (EN-DC), and multi-RAT dual connectivity (MR-DC) may be made. The UE capability enquiry message is generally transmitted initially after the UE is connected to the BS, but may be requested at any time when the BS needs the same.

The UE receiving the UE capability report request from the BS in the above step configures a UE capability according to RAT type and band information requested by the BS. Hereinafter, a method by which the UE configures the UE capability in the NR system is described.

1. When the UE receives a list of LTE and/or NR bands from the BS through a UE capability request, the UE configures a band combination (BC) for EN-DC and NR stand-alone (SA). That is, the UE configures a candidate list of BCs for EN-DC and NR SA on the basis of requested bands in FreqBandList. The bands sequentially have priorities as stated in FreqBandList.
2. When the BS sets a "eutra-nr-only" flag or an "eutra" flag and makes a request for the UE capability report, the UE completely removes NR SA BCs from the configured candidate list of BCs. Such an operation may occur only when the LTE BS (eNB) makes a request for an "eutra" capability.
3. Thereafter, the UE removes fallback BCs from the candidate list of BCs configured in the above stage. The fallback BC is a BC which can be obtained by removing a band corresponding to at least one SCell from a predetermined BC, and a BC before the removal of the band corresponding at least one SCell can cover the fallback BC and thus the fallback BC can be omitted. This step is applied to MR-DC, that is, LTE bands. BCs left after the step are a final "candidate BC list".
4. The UE selects BCs suitable for a requested RAT type in the final "candidate BC list" and selects BCs to be reported. In this step, the UE configures supported-BandCombinationList according to a determined order. That is, the UE configures BCs and UE capability to be reported according to an order of a preset rat-Type (nr->eutra-nr->eutra). Further, the UE configures featureSetCombination for the configured supportedBand-CombinationList and configures a list of "candidate feature set combination" in a candidate BC list from which a list for fallback BCs (including capability at the same or lower stage) is received. The "candidate feature set combination" may include all feature set combinations for NR and EUTRA-NR BCs, and may be acquired from a feature set combination of UE-NR-Capabilities and UE-MRDC-Capabilities containers.
5. When the requested rat Type is eutra-nr and influences, featureSetCombinations are included in all of the two containers of UE-MRDC-Capabilities and UE-NR-Capabilities. However, the NR feature set includes only UE-NR-Capabilities.

After the UE capability is configured, the UE transmits a UE capability information message including the UE capability to the BS. The BS performs scheduling and transmission/reception management suitable for the corresponding UE on the basis of the UE capability received from the UE.

[CA/DC-Related]

Figure 15:
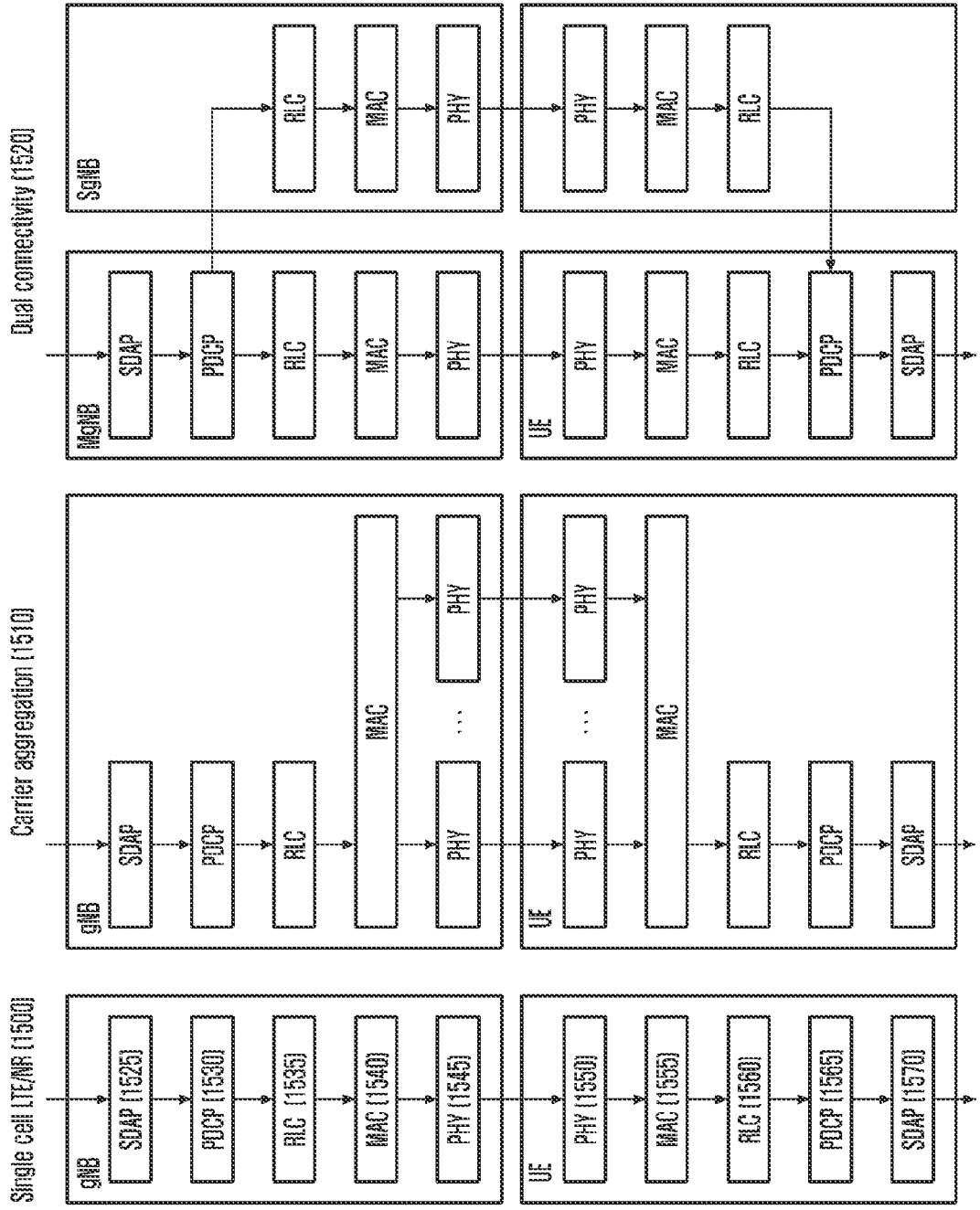
FIG. 15 illustrates a wireless protocol structure of the BS and the UE in single cell, carrier aggregation, and dual connectivity in a wireless communication system according to an embodiment of the present disclosure.

FIG. 15 illustrates a wireless protocol structure of the BS and the UE in a situation of single cell, carrier aggregation, and dual connectivity according to an embodiment of the present disclosure.

Referring to FIG. 15, in a wireless protocol of the next-generation mobile communication system, the UE and the NR BS include NR service data adaptation protocols (SDAPs) 1525 and 1570, NR packet data convergence protocols (PDCPs) 1530 and 1565, NR radio link controls (RLCs) 1535 and 1560, and NR medium access controls (MACs) 1540 and 1555, respectively.

Main functions of the NR SDAPs 1525 and 1570 may include some of the following functions:
User data transmission function (transfer of user-plane data);
Function of mapping QoS flow and a data bearer for uplink and downlink (mapping between a QoS flow and a DRB for both DL and UL);
Function of marking a QoS flow ID for uplink and downlink (marking QoS flow ID in both DL and UL packets); and
Function of mapping reflective QoS flow to a data bearer for uplink SDAP PDUs (reflective QoS flow to DRB mapping for the UL SDAP PDUs).

With respect to the SDAP layer device, the UE may receive a configuration as to whether to use a header of the SDAP layer device or a function of the SDAP layer device for each PDCP layer device, each bearer, or each logical channel through an RRC message. If the SDAP header is configured, a 1-bit indicator of NAS reflective QoS of the SDAP header and a 1 bit-indicator of AS reflective QoS may indicate that the UE updates or reconfigures information on mapping of QoS flow and a data bearer in uplink and downlink. The SDAP header may include QoS flow ID information indicating the QoS. The QoS information may be used as data-processing-priority or scheduling information to support a seamless service.

Main functions of the NR PDCPs 1530 and 1565 may include some of the following functions:
Header compression and decompression function (header compression and decompression: ROHC only);
User data transmission function (transfer of user data);
Sequential delivery function (in-sequence delivery of upper-layer PDUs);
Non-sequential delivery function (out-of-sequence delivery of upper-layer PDUs);
Reordering function (PDCP PDU reordering for reception);
Duplicate detection function (duplicate detection of lower-layer SDUs);
Retransmission function (retransmission of PDCP SDUs);
Ciphering and deciphering function (Ciphering and deciphering); and
Timer-based SDU removal function (timer-based SDU discard in uplink).

The reordering function of the NR PDCP device is a function of sequentially reordering PDCP PDUs received by a lower layer on the basis of a PDCP sequence number (SN), and may include a function of sequentially transferring the reordered data to a higher layer Alternatively, the reordering function of the NR PDCP device may include a function of directly transmitting data regardless of the sequence, a function of recording PDCP PDUs lost due to the reordering, a function of reporting statuses of the lost PDCP PDUs to a transmitting side, and a function of making a request for retransmitting the lost PDCP PDUs.

Main functions of the NR RLCs 1535 and 1560 may include some of the following functions:
Data transmission function (transfer of upper-layer PDUs);
Sequential delivery function (in-sequence delivery of upper-layer PDUs);
Non-sequential delivery function (out-of-sequence delivery of upper-layer PDUs);
ARQ function (error correction through ARQ);
Concatenation, segmentation, and reassembly function (concatenation, segmentation and reassembly of RLC SDUs);
Re-segmentation function (re-segmentation of RLC data PDUs);
Reordering function (reordering of RLC data PDUs);
Duplicate detection function (duplicate detection);

Error detection function (protocol error detection);
RLC SDU deletion function (RLC SDU discard); and
RLC reestablishment function (RLC reestablishment).

The sequential delivery function (in-sequence delivery) of the NR RLC device is a function of sequentially transmitting RLC SDUs received from a lower layer to the higher layer. When one original RLC SDU is divided into a plurality of RLC SDUs and then received, the sequential delivery function (In-sequence delivery) of the NR RLC layer device may include a function of reassembling and transmitting the RLC SDUs, a function of reordering the received RLC PDUs on the basis of an RLC sequence number (SN) or a PDCP SN, a function of recording RLC PDUs lost due to the reordering, a function of reporting statuses of the lost RLC PDUs to a transmitting side, and a function of making a request for retransmitting the lost RLC PDUs.

When there are lost RLC SDUs, the sequential delivery function (In-sequence delivery) of the NR RLC layer device may include a function of sequentially transferring only RLC SDUs preceding the lost RLC SDUs to the higher layer or a function of, if a predetermined timer expires even though there are lost RLC SDUs, sequentially transferring all RLC SDUs received before the timer starts to the higher layer.

Alternatively, the sequential delivery function (in-sequence delivery) of the NR RLC layer device may include a function of, if a predetermined timer expires even though there are lost RLC SDUs, sequentially transferring all RLC SDUs received up to now to the higher layer. Further, the NR RLC device may process the RLC PDUs sequentially in the order of reception thereof (according to an arrival order regardless of a serial number or a sequence number) and may transfer the RLC PDUs to the PDCP device regardless of the sequence thereof (out-of-sequence delivery). In the case of segments, the NR RLC device may receive segments that are stored in the buffer or are to be received in the future, reconfigure the segments to be one RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential delivery function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 1540 and 1555 may be connected to a plurality of NR RLC layer devices configured in one UE and main functions of the NR MAC may include some of the following functions:

Mapping function (Mapping between logical channels and transport channels);
Multiplexing and demultiplexing function (multiplexing/demultiplexing of MAC SDUs);
Scheduling information report function (scheduling information reporting);
HARQ function (error correction through HARQ);
Logical channel priority control function (priority handling between logical channels of one UE);
UE priority control function (priority handling between UEs by means of dynamic scheduling);
MBMS service identification function (MBMS service identification);
Transport format selection function (transport format selection); and
Padding function (padding).

The NR PHY layers 1545 and 1550 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

A detailed structure of the wireless protocol structure may be variously changed according to a carrier (or cell) operation scheme. For example, when the BS transmits data to the UE on the basis of a single carrier (or cell), the BS and the UE use a protocol structure having a single structure for each layer as indicated by reference numeral 1500. On the other hand, when the BS transmits data to the UE on the basis of carrier aggregation (CA) using multiple carriers in a single TRP, the BS and the UE use a protocol structure in which layers up to RLC have a single structure but the PHY layer is multiplexed through the MAC layer as indicated by reference numeral 1510. In another example, when the BS transmits data to the UE on the basis of dual connectivity (DC) using multiple carriers in multiple TRPs, the BS and the UE use a protocol structure in which layers up to RLC have a single structure but the PHY layer is multiplexed through the MAC layer as indicated by reference numeral 1520.

Referring to the PDCCH and beam configuration-related description, PDCCH repetitive transmission is not supported in current Rel-15 and Rel-16 NR, and thus it is difficult to achieve required reliability in a scenario requiring high reliability such as URLLC. The disclosure provides a PDCCH repetitive transmission method through multiple TRPs so as to improve PDCCH reception reliability of the UE. A detailed method is described in the following embodiments in detail.

Hereinafter, embodiments of the disclosure are described in detail along with the accompanying drawings. The content in the disclosure can be applied to FDD and TDD systems. Hereinafter, in the disclosure, higher signaling (or higher-layer signaling) may be a method of transmitting a signal from the BS to the UE through a downlink data channel of a physical layer or from the UE to the BS through an uplink data channel of a physical layer, and may also be referred to as RRC signaling, PDCP signaling, or a medium access control (MAC) control element (CE) (MAC CE).

Hereinafter, in the disclosure, when determining whether to apply cooperative communication, the UE can use various methods by which PDCCH(s) allocating PDSCHs to which cooperative communication is applied have specific formats, PDCCH(s) allocating PDSCHs to which cooperative communication is applied include a specific indicator informing of whether cooperative communication is applied, PDCCH(s) allocating PDSCHs to which cooperative communication is applied are scrambled by a specific RNTI, or the application of cooperative communication to a specific section indicated by a higher layer is assumed. Thereafter, for convenience of description, reception of, by the UE, a PDSCH to which cooperative communication is applied on the basis of conditions similar to the above conditions is referred to as an NC-JT case.

Hereinafter, determining priorities of A and B in the disclosure may be variously expressed as selecting one having a higher priority according to a predetermined priority rule and performing an operation corresponding thereto or omitting (or dropping) an operation for one having a lower priority.

Hereinafter, the disclosure describes the examples through a plurality of embodiments but the examples are not independent, and one or more embodiments can be simultaneously or complexly applied.

[NC-JT-Related]

According to an embodiment of the disclosure, in order to receive a PDSCH from a plurality of TRPs, the UE may use non-coherent joint transmission (NC-JT).

Unlike the conventional system, the 5G wireless communication system supports not only a service requiring a high transmission rate but also both a service having a very short transmission delay and a service requiring a high connection density. In a wireless communication network including a plurality of cells, transmission and reception points (TRPs), or beams, cooperative communication (coordinated transmission) between respective cells, TRPs, or/and beams may satisfy various service requirements by increasing the strength of a signal received by the UE or efficiently controlling interference between the cells, TRPs, or/and beams.

Joint transmission (JT) is a representative transmission technology for the cooperative communication and may increase the strength of a signal received by the UE or throughput by transmitting signals to one UE through different cells, TRPs, or/and beams. At this time, a channel between each cell, TRP, or/and beam, and the UE may have different characteristics, and particularly, non-coherent joint transmission (NC-JT) supporting non-coherent precoding between respective cells, TRPs, or/and beams may need individual precoding, MCS, resource allocation, and TCI indication according to the channel characteristics for each link between each cell, TRP, or/and beam and the UE.

The NC-JT may be applied to at least one of a downlink data channel (physical downlink shared channel (PDSCH)), a downlink control channel (physical downlink control channel (PDCCH)), an uplink data channel (physical uplink shared channel (PUSCH)), and an uplink control channel (Physical uplink control channel (PUCCH)). In PDSCH transmission, transmission information such as precoding, MCS, resource allocation, and TCI may be indicated through DL DCI, and may be independently indicated for each cell, TRP, or/and beam for the NC-JT. This is a main factor that increases payload required for DL DCI transmission, which may have a bad influence on reception performance of a PDCCH for transmitting the DCI. Accordingly, in order to support JT of the PDSCH, it is required to carefully design a tradeoff between an amount of DCI information and reception performance of control information.

Figure 16:
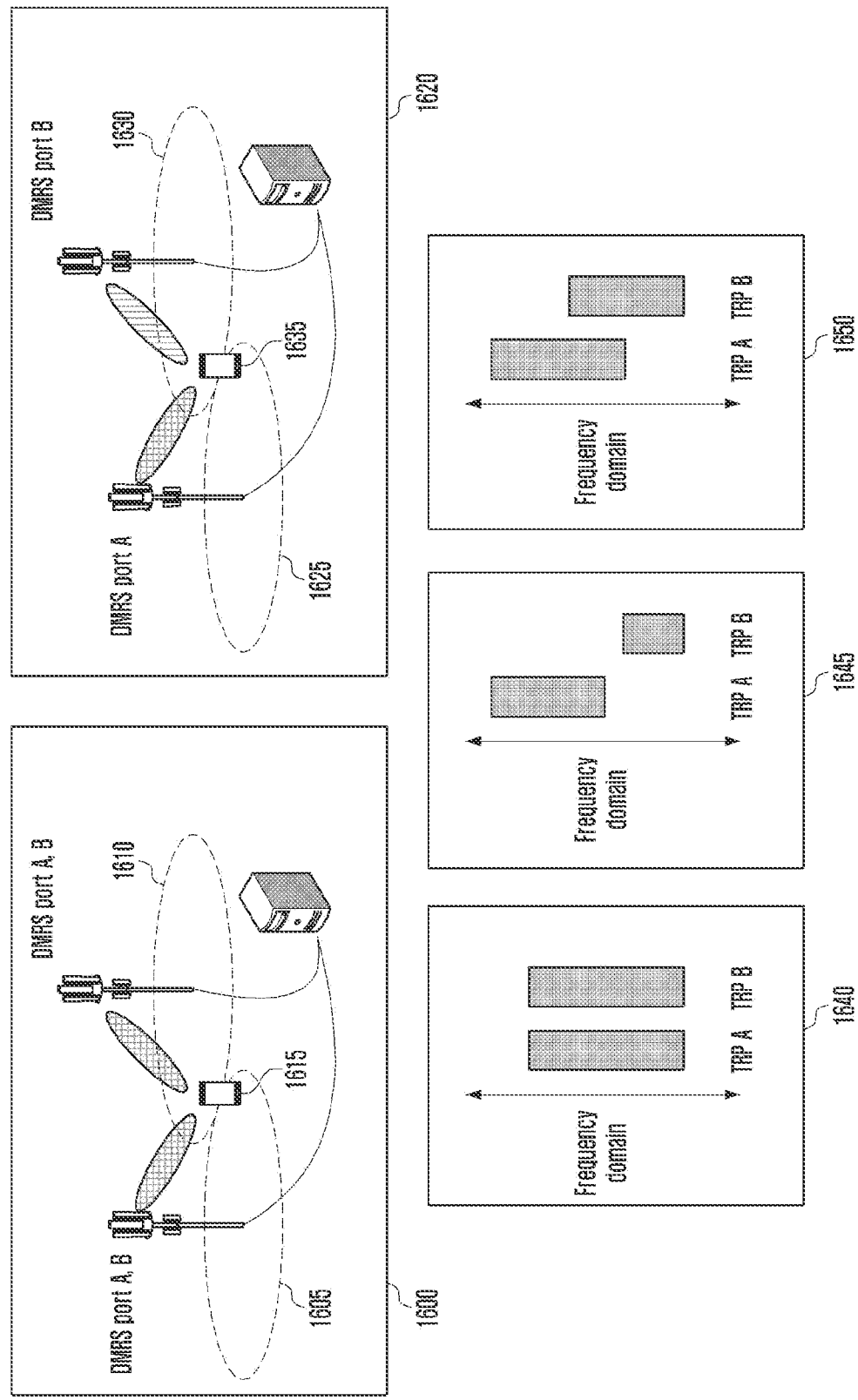
FIG. 16 illustrates a configuration of antenna ports and an example of resource allocation to transmit a PDSCH through cooperative communication in a wireless communication system according to an embodiment of the present disclosure.

FIG. 16 illustrates a configuration of antenna ports and an example of resource allocation to transmit a PDSCH through cooperative communication in a wireless communication system according to an embodiment of the present disclosure.

Referring to FIG. 16, the example for PDSCH transmission is described for each scheme of joint transmission (JT), and examples for allocating radio resources for each TRP are described.

Referring to FIG. 16, an example 1600 of coherent joint transmission (C-JT) supporting coherent precoding between respective cells, TRPs, or/and beams is illustrated.

In the case of C-JT, a TRP A 1605 and a TRP B 1610 transmit single data (PDSCH) to a UE 1615, and the plurality of TRPs may perform joint precoding. This may mean that the TRP A 1605 and the TPR B 1610 transmit DMRSs through the same DMRS ports in order to transmit the same PDSCH. For example, the TRP A 1605 and the TPR B 1610 may transmit DMRSs to the UE 1615 through a DMRS port A and a DMRS port B, respectively. In this case, the UE 1615 may receive one piece of DCI information for receiving one PDSCH demodulated on the basis of the DMRSs transmitted through the DMRS port A and the DMRS port B.

FIG. 16 illustrates an example 1620 of non-coherent joint transmission (NC-JT) supporting non-coherent precoding between respective cells, TRPs, or/and beams for PDSCH transmission according to an embodiment of the present disclosure.

In the case of NC-JT, the PDSCH is transmitted to a UE 1635 for each cell, TPR, or/and beam, and individual precoding may be applied to each PDSCH. Respective cells, TRPs, or/and beams may transmit different PDSCHs or different PDSCH layers to the UE 1635, thereby improving throughput compared to single cell, TRP, or/and beam transmission. Further, respective cells, TRPs, or/and beams may repeatedly transmit the same PDSCH to the UE 1635, thereby improving reliability compared to single cell, TRP, or/and beam transmission. For convenience of description, the cell, TRP, or/and beam are commonly called a TRP.

At this time, various wireless resource allocations such as the case 1640 in which frequency and time resources used by a plurality of TRPs for PDSCH transmission are all the same, the case 1645 in which frequency and time resources used by a plurality of TRPs do not overlap at all, and the case 1650 in which some of the frequency and time resources used by a plurality of TRPs overlap each other may be considered.

In order to support NC-JT, DCIs in various forms, structures, and relations may be considered to simultaneously allocate a plurality of PDSCHs to one UE.

Figure 17:
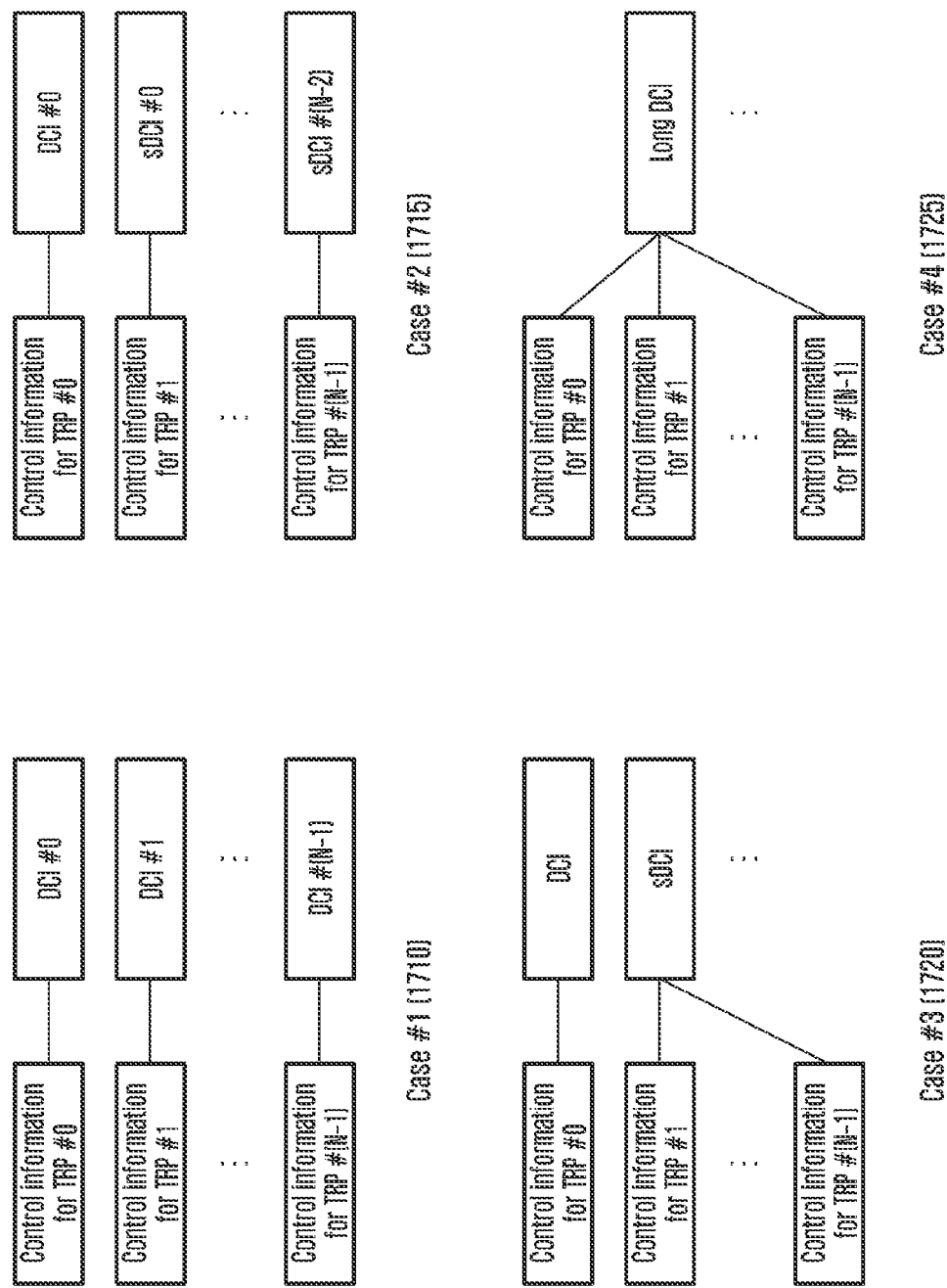
FIG. 17 illustrates an example for a configuration of downlink control information (DCI) for cooperative communication in a wireless communication system according to an embodiment of the present disclosure.

FIG. 17 illustrates an example for a configuration of downlink control information (DCI) for cooperative communication in a wireless communication system according to an embodiment of the present disclosure.

FIG. 17 shows an example of a configuration of downlink control information for NC-JT in which respective TRPs transmit different PDSCHs or different PDSCH layers to the UE in a wireless communication system according to an embodiment of the disclosure.

Referring to FIG. 17, case #1 1710 is an example in which control information for PDSCHs transmitted from (N−1) additional TRPs is transmitted independently from control information for a PDSCH transmitted by a serving TRP in a situation in which (N−1) different PDSCHs are transmitted from the (N−1) additional TRPs (TRP #1 to TRP # (N−1)) other than the serving TRP (TRP #0) used for single PDSCH transmission. That is, the UE may acquire control information for PDSCHs transmitted from different TRPs (TRP #0 to TRP #(N−1)) through independent DCIs (DCI #0 to DCI #(N−1)). Formats between the independent DCIs may be the same as or different from each other, and payload between the DCIs may also be the same as or different from each other. In case #1, a degree of freedom of PDSCH control or allocation can be completely guaranteed, but when respective pieces of DCI are transmitted by different TRPs, a difference between DCI coverages may be generated and reception performance may deteriorate.

Case #2 1715 is an example in which pieces of control information for PDSCHs of (N−1) additional TRPs are transmitted and each piece of the DCI is dependent on control information for the PDSCH transmitted from the serving TRP in a situation in which (N−1) different PDSCHs are transmitted from (N−1) additional TRPs (TRP #1 to TRP # (N−1)) other than the serving TRP (TRP #0) used for single PDSCH transmission.

For example, DCI #0 that is control information for a PDSCH transmitted from the serving TRP (TRP #0) may include all information elements of DCI format 1_0, DCI format 1_1, and DCI format 1_2, but shortened DCIs (hereinafter, referred to as sDCIs) (sDCI #0 to sDCI #(N−2)) that are control information for PDSCHs transmitted from the cooperative TRPs (TRP #1 to TRP #(N−1)) may include only some of the information elements of DCI format 1_0, DCI format 1_1, and DCI format 1_2. Accordingly, the sDCI for transmitting control information of PDSCHs transmitted from cooperative TPRs has smaller payload compared to the normal DCI (nDCI) for transmitting control information related to the PDSCH transmitted from the serving TRP, and thus can include reserved bits compared to the nDCI.

In case #2, a degree of freedom of each PDSCH control or allocation may be limited according to content of information elements included in the sDCI, but reception capability of the sDCI is better than the nDCI, and thus a probability of the generation of difference between DCI coverages may become lower.

Case #3 1720 is an example in which one piece of control information for PDSCHs of (N−1) additional TRPs is transmitted and the DCI is dependent on control information for the PDSCH transmitted from the serving TRP in a situation in which (N−1) different PDSCHs are transmitted from (N−1) additional TRPs (TRP #1 to TRP # (N−1)) other than the serving TRP (TRP #0) used for single PDSCH transmission.

For example, in the case of DCI #0 that is control information for the PDSCH transmitted from the serving TRP (TRP #0), all information elements of DCI format 1_0, DCI format 1_1, and DCI format 1_2 may be included, and in the case of control information for PDSCHs transmitted from cooperative TRPs (TRP #1 to TRP #(N−1)), only some of the information elements of DCI format 1_0, DCI format 1_1, and DCI format 1_2 may be gathered in one "secondary" DCI (sDCI) and transmitted. For example, the sDCI may include at least one piece of HARQ-related information such as frequency domain resource assignment and time domain resource assignment of the cooperative TRPs and the MCS. In addition, information that is not included in the sDCI such as a BWP indicator and a carrier indicator may follow DCI (DCI #0, normal DCI, or nDCI) of the serving TRP.

In case #3 1720, a degree of freedom of PDSCH control or allocation may be limited according to content of the information elements included in the sDCI but reception performance of the sDCI can be controlled, and case #3 1720 may have smaller complexity of DCI blind decoding of the UE compared to case #1 1710 or case #2 1715.

Case #4 1725 is an example in which control information for PDSCHs transmitted from (N−1) additional TRPs is transmitted in DCI (long DCI) that is the same as that of control information for the PDSCH transmitted from the serving TRP in a situation in which different (N−1) PDSCHs are transmitted from the (N−1) additional TRPs (TRP #1 to TRP # (N−1)) other than the serving TRP (TRP #0) used for single PDSCH transmission. That is, the UE may acquire control information for PDSCHs transmitted from different TRPs (TRP #0 to TRP # (N−1)) through single DCI. In case #4 1725, complexity of DCI blind decoding of the UE may not be increased, but a degree of freedom of PDSCH control or allocation may be low since the number of cooperative TRPs is limited according to a long DCI payload restriction.

In the following description and embodiments, the sDCI may refer to various pieces of supplementary DCI such as shortened DCI, secondary DCI, or normal DCI (DCI formats 1_0 and 1_1) including PDSCH control information transmitted in the cooperative TRP, and unless a specific restriction is mentioned, the corresponding description may be similarly applied to the various pieces of supplementary DCI.

In the following description and embodiments, case #1 1710, case #2 1715, and case #3 1720 in which one or more pieces of DCI (or PDCCHs) are used to support NC-JT may be classified as multiple PDCCH-based NC-JT and case #4 1725 in which single DCI (or PDCCH) is used to support NC-JT may be classified as single PDCCH-based NC-JT. In multiple PDCCH-based PDSCH transmission, a CORESET for scheduling DCI of the serving TRP (TRP #0) is separated from CORESETs for scheduling DCI of cooperative TRPs (TRP #1 to TRP #(N−1)). A method of distinguishing the CORESETs may include a distinguishing method through a higher-layer indicator for each CORESET and a distinguishing method through a beam configuration for each CORESET. Further, in single PDCCH-based NC-JT, single DCI schedules a single PDSCH having a plurality of layers instead of scheduling a plurality of PDSCHs, and the plurality of layers may be transmitted from a plurality of TRPs. At this time, association between a layer and a TRP transmitting the corresponding layer may be indicated through a transmission configuration indicator (TCI) indication for the layer.

In embodiments of the disclosure, the "cooperative TRP" may be replaced with various terms such as a "cooperative panel" or a "cooperative beam" when actually applied.

In embodiments of the disclosure, "the case in which NC-JT is applied" may be variously interpreted as "the case in which the UE simultaneously receives one or more PDSCHs in one BWP," "the case in which the UE simultaneously receives PDSCHs on the basis of two or more transmission configuration indicator (TCI) indications in one BWP," and "the case in which the PDSCHs received by the UE are associated with one or more DMRS port groups" according to circumstances, but is used by one expression for convenience of description.

In the disclosure, a wireless protocol structure for NC-JT may be variously used according to a TRP development scenario. For example, when there is no backhaul delay between cooperative TRPs or there is a small backhaul delay, a method (CA-like method) using a structure based on MAC layer multiplexing can be used similarly to reference numeral 1510 of FIG. 15. On the other hand, when the backhaul delay between cooperative TRPs is too large to be ignored (for example, when a time of 2 ms or longer is needed to exchange information such as CSI, scheduling, and HARQ-ACK between cooperative TRPs), a method (DC-like method) of securing a characteristic robust to a delay can be used through an independent structure for each TRP from an RLC layer similarly to reference numeral 1520 of FIG. 15.

The UE supporting C-JT/NC-JT may receive a C-JT/NC-JT-related parameter or a setting value from a higher-layer configuration and set an RRC parameter of the UE on the basis thereof. For the higher-layer configuration, the UE may use a UE capability parameter, for example, tci-StatePDSCH. The UE capability parameter, for example, tci-StatePDSCH may define TCI states for PDSCH transmission, the number of TCI states may be configured as 4, 8, 16, 32, 64, and 128 in FR1 and as 64 and 128 in FR2, and a maximum of 8 states which can be indicated by 3 bits of a TCI field of the DCI may be configured through a MAC CE message among the configured numbers. A maximum value 128 means a value indicated by maxNumberConfiguredTCIstatesPerCC within the parameter tci-StatePDSCH which is included in capability signaling of the UE. As described above, a series of configuration processes from the higher-layer configuration to the MAC CE configuration may be applied to a beamforming indication or a beamforming change command for at least one PDSCH in one TRP.

[Multi-DCI-Based Multi-TRP]

According to an embodiment of the disclosure, a downlink control channel for NC-JT may be configured on the basis of multiple PDCCHs.

In NC-JT based on multiple PDCCHs, there may be a CORESET or a search space separated for each TRP when DCI for scheduling the PDSCH of each TRP is transmitted. The CORESET or the search space for each TRP can be configured like in at least one of the following cases.

In one example of a configuration of a higher-layer index for each CORESET, CORESET configuration information configured by a higher layer may include an index value, and a TRP for transmitting a PDCCH in the corresponding CORESET may be identified by the configured index value for each CORESET. That is, in a set of CORESETs having the same higher-layer index value, it may be considered that the same TRP transmits the PDCCH or the PDCCH for scheduling the PDSCH of the same TRP is transmitted. The index for each CORESET may be named CORESETPoolIndex, and it may be considered that the PDCCH is transmitted from the same TRP in CORESETs in which the same CORESETPoolIndex value is configured. In the CORESET in which the same CORESETPoolIndex value is not configured, it may be considered that a default value of CORESETPoolIndex is configured, and the default value may be 0.

In one example of a configuration of multiple PDCCH-Config, a plurality of PDCCH-Config are configured in one BWP, and each PDCCH-Config may include a PDCCH configuration for each TRP. That is, a list of CORESETs for each TRP and/or a list of search spaces for each TRP may be included in one PDCCH-Config, and one or more CORESETs and one or more search spaces included in one PDCCH-Config may be considered to correspond to a specific TRP.

In one example of a configuration of a CORESET beam/beam group, a TRP corresponding to the corresponding CORESET may be identified through a beam or a beam group configured for each CORESET. For example, when the same TCI state is configured in a plurality of CORESETs, it may be considered that the corresponding CORESETs are transmitted through the same TRP or a PDCCH for scheduling a PDSCH of the same TRP is transmitted in the corresponding CORESET.

In one example of a configuration of a search space beam/beam group, a beam or a beam group is configured for each search space, and a TRP for each search space may be identified therethrough. For example, when the same beam/beam group or TCI state is configured in a plurality of search spaces, it may be considered that the same TRP transmits the PDCCH in the corresponding search space or a PDCCH for scheduling a PDSCH of the same TRP is transmitted in the corresponding search space.

As described above, by separating the CORESETs or search spaces for each TRP, it is possible to divide PDSCHs and HARQ-ACK for each TRP and accordingly to generate an independent HARQ-ACK codebook for each TRP and use an independent PUCCH resource.

The configuration may be independent for each cell or BWP. For example, while two different CORESETPoolIndex values may be configured in the PCell, no CORESETPoolIndex value may be configured in a specific SCell. In this case, it may be considered that NC-JT is configured in the PCell, but NC-JT is not configured in the SCell in which no CORESETPoolIndex value is configured.

[Single-DCI-Based Multi-TRP]

According to another embodiment of the disclosure, a downlink beam for NC-JT may be configured on the basis of a single PDCCH.

In single PDCCH-based NC-JT, PDSCH transmitted by a plurality of TRPs may be scheduled by one piece of DCI. At this time, as a method of indicating the number of TRPs transmitting the corresponding PDSCHs, the number of TCI states may be used. That is, single PDCCH-based NC-JT may be considered when the number of TCI states indicated by DCI for scheduling the PDSCHs is 2, and single-TRP transmission may be considered when the number of TCI states is 1. The TCI states indicated by the DCI may correspond to one or two TCI states among TCI states activated by the MAC CE. When the TCI states of DCI correspond to two TCI states activated by the MAC CE, a TCI codepoint indicated by the DCI is associated with the TCI states activated by the MAC CE, in which case the number of TCI states activated by the MAC CE, corresponding to the TCI codepoint, may be 2.

The configuration may be independent for each cell or BWP. For example, while a maximum number of activated TCI states corresponding to one TCI codepoint is 2 in the PCell, a maximum number of activated TCI states corresponding to one TCI codepoint may be 1 in a specific SCell. In this case, it may be considered that NC-JT is configured in the PCell but NC-JT is not configured in the SCell.

[PHR]

Figure 18:
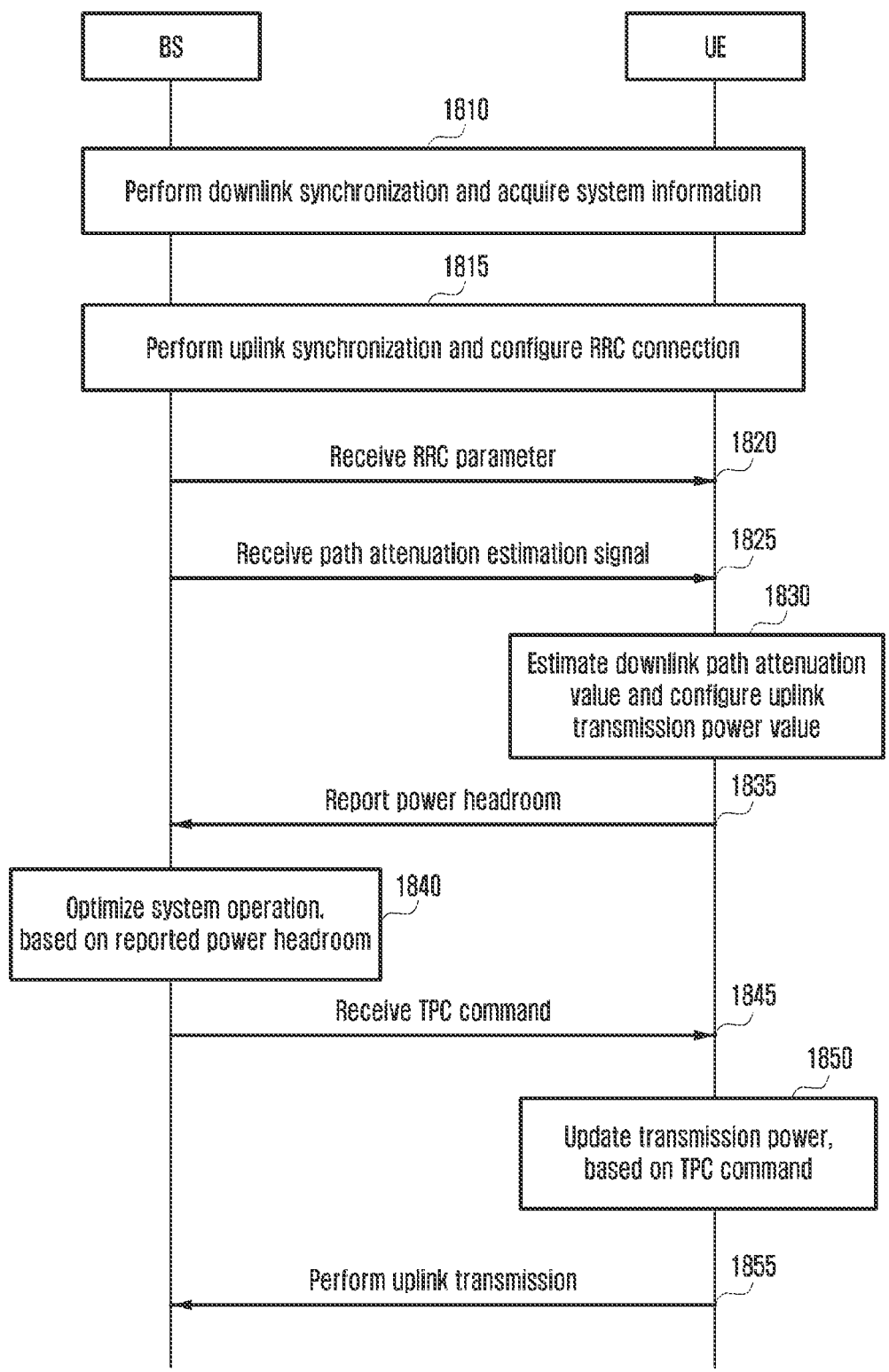
FIG. 18 illustrates a process in which the BS controls transmission power of the UE in a wireless communication system according to an embodiment of the present disclosure.

FIG. 18 illustrates a process in which the BS controls transmission power of the UE in a wireless communication system according to an embodiment of the present disclosure.

Referring to FIG. 18, in operation 1810, the UE in the coverage of the BS may perform downlink synchronization with the BS and acquire system information. According to some embodiments, downlink synchronization may be performed through a synchronization signal primary synchronization signal/secondary synchronization signal (PSS/PSS) received from the BS. UEs having performed downlink synchronization may receive a master information block (MIB) and a system information block (SIB) and acquire system information.

In operation 1815, the UE may perform uplink synchronization with the BS through a random access procedure and configure a radio resource control (RRC) connection. In the random access procedure, the UE may transmit a random access preamble and message 3 (msg3) to the BS through the uplink. At this time, in transmission of the random access preamble and message 3, uplink transmission power may be controlled. Specifically, the UE may receive parameters for controlling uplink transmission power from the BS through the acquired system information, for example, the SIB or may control uplink transmission power by using appointed parameters.

In another embodiment of the disclosure, the UE may measure reference signal received power (RSRP) from a path attenuation estimation signal transmitted by the BS and estimate a downlink path attenuation value as shown in

[Equation 7]. Further, an uplink transmission power value for transmitting the random access preamble and message 3 may be configured on the basis of the estimated path attenuation value:

Downlink pathloss=transmission power of signal of
BS−RSRP measured by UE. [Equation 7]

In [Equation 7], transmission power of the signal of the BS is transmission power of a downlink path attenuation estimation signal transmitted by the BS. The downlink path attenuation estimation signal transmitted by the BS may be a cell-specific reference signal (CRS) or a synchronization signal block (SSB). When the path attenuation estimation signal is a cell-specific reference signal (CRS), transmission power of the signal of the BS may be transmission power of the CRS and may be transmitted to the UE through a parameter referenceSignalPower of system information. When the path attenuation estimation signal is a synchronization signal block (SSB), transmission power of the signal of the BS may be transmission power of a demodulation reference signal (DMRS) transmitted through a secondary synchronization signal (SSS) and a PBCH and may be transmitted to the UE through a parameter ss-PBCH-BlockPower of system information.

In operation 1820, the UE may receive RRC parameters for controlling uplink transmission power from the BS through UE-specific RRC or common RRC. At this time, the received transmission power control parameters may be different according to the type of an uplink channel transmitted through the uplink and type of a signal. That is, transmission power control parameters applied to transmission of an uplink control channel (physical uplink control channel (PUCCH), an uplink data channel (physical uplink shared channel (PUSCH), and a sounding reference signal (SRS) may be different from each other. Further, as described above, transmission power control parameters which the UE receives from the BS through the SIB before the RRC connection configuration or transmission power control parameters used by the UE as pre-appointed values before the RRC connection configuration may be included in RRC parameters transmitted from the BS after the RRC connection configuration.

In addition, power headroom reporting (PHR) configuration information may be included in RRC parameters, in which case the PHR configuration information may include a timer (for example, phr-PeriodicTimer or phr-ProhibitTimer) value associated with the PHR. The UE may use the RRC parameter value received from the BS after the RRC connection configuration to control uplink transmission power. In operation 1825, the UE may receive a path attenuation estimation signal from the BS. More specifically, the BS may configure a channel state information-reference signal n(CSI-RS) as the path attenuation estimation signal of the UE after the RRC connection configuration of the UE.

In this case, the BS may transmit information on transmission power of the CSI-RS to the UE through a parameter powerControlOffsetSS of UE-dedicated RRC information.

At this time, powerControlOffsetSS may be a transmission power offset between the SSB and the CSI-RS. In operation 1830, the UE may estimate the downlink path attenuation value and configure the uplink transmission power value. More specifically, the UE may measure downlink RSRP by using the CSI-RS and estimate the downlink path attenuation value through [Equation 7] on the basis of information on transmission power of the CSI-RS received from the BS>Further, the UE may configure the uplink transmission power value for transmitting a PUCCH, a PUSCH, and an SRS on the basis of the estimated path attenuation value.

In operation 1835, the UE may transmit the PHR to the BS. Meanwhile, the UE according to an embodiment of the disclosure may trigger the PHR and perform operation 1835 when the timer associated with the received PHR has expired or when a change in the path attenuation value is larger than or equal to a specific threshold value in operation 1820. In the disclosure, the PH may be a difference between maximum output power (Pcmax) of the UE and current transmission power (Ppusch) of the UE. In operation 1840, the BS may optimize the operation of a system on the basis of the reported power headroom. For example, when a power headroom value which a specific UE reports to the BS is a positive value, the BS may allocate the larger number of resource blocks (RBs) to the corresponding UE to increase a system yield. In operation 1845, the UE may receive a transmission power control (TCP) command from the BS. For example, when the power headroom value which the specific UE reports to the BS is a negative value, the BS may allocate the smaller number of resources to the corresponding UE or reduce transmission power of the corresponding UE through the transmission power control command.

Accordingly, it is possible to increase a system yield or decrease unnecessary power consumption of the UE. In operation 1850, the UE may update transmission power on the basis of the TPC command. At this time, the TPC command may be transmitted to the UE through UE-specific DCI or group command DCI. Accordingly, the BS may dynamically control transmission power of the UE through the TPC command. In operation 1855, the UE may perform uplink transmission on the basis of the updated transmission power.

Meanwhile, operations 1810 to 1855 in FIG. 18 may be performed at the same time or some thereof may be omitted.

[PUSCH Power Control]

PUSCH transmission power may be determined through [Equation 8] below:

[Equation 8]
$$P_{PUSCH}(i, j, q_d, l) = \min \left\{ \begin{array}{l} P_{CMAX,f,c}(i), \\ P_{O_{PUSCH},b,f,c}(j) + 10\log_{10}\left(2^\mu \cdot M_{RB,b,f,c}^{PUSCH}(i)\right) + \alpha_{b,f,c}(j) \cdot PL_{b,f,c}(q_d) + \Delta_{TF,b,f,c}(i) + f_{b,f,c}(i, l) \end{array} \right\}$$
[dBm]

In [Equation 8], $P_{CMAX,f,c}(i)$ denotes maximum transmission power configured in the UE for a carrier f of a serving cell c at a PUSCH transmission time point i. $P_{O_{PUSCH},b,f,c}(j)$ denotes a reference configuration transmission power configuration value according to an activated uplink bandwidth part (BWP) b of the carrier f of the serving cell c and has different values according to various transmission types j. Further, the values may be various according to the case in which PUSCH transmission is a message 3 PUSCH for random access, the case in which a PUSCH is a configured grant PUSCH, or a scheduled PUSCH. $M_{RB,b,f,c}^{PUSCH}(i)$ denotes the size of a frequency to which the PUSCH is allocated. $\alpha_{b,f,c}(j)$ denotes a compensation rate degree value for path loss of UL BWP b of the carrier f of the serving c, and may be configured by a higher-layer signal and may have different values according to j. $PL_{b,f,c}(q_d)$ denotes a downlink path loss estimation value of the UL BWP b of the carrier f of the serving c and may use a value measured through a reference signal in an activated downlink BWP section.

The reference signal may be an SS/PBCH block or a CSI-RS. As shown in [Equation 7], the downlink path loss may be calculated. In another embodiment of the disclosure, $PL_{b,f,c}(q_d)$ denotes a downlink path attenuation value and corresponds to path attenuation calculated by the UE as shown in [Equation 7]. The UE calculates path attenuation on the basis of reference signal resources associated with the SS/PBCH block or the CSI-RS according to whether a higher-layer signal is configured. For the reference signal resources, one of a plurality of reference signal resource sets is selected by a higher-layer signal or an L1 signal, and the UE calculates path attenuation on the basis of the reference signal resources. $\Delta_{TF,b,f,c}(i)$ denotes a value determined by a modulation and coding scheme (MCS) value of the PUSCH at the PUSCH transmission time point i of the UL BWP b of the carrier f of the serving c. $f_{b,f,c}(i,l)$ denotes a power control adaption value and may dynamically control a power value by a TPC command.

The TPC command is divided into an accumulated mode and an absolute mode, and one of the two modes is determined by a higher-layer signal. In the accumulated mode, the currently determined power control adaption value is accumulated on a value indicated by the TPC command and may increase of decrease according to the TPC command, and the relation of $f_{b,f,c}(i,l)=f_{b,f,c}(i-i_0,l)+\Sigma\delta_{PUSCH,b,f,c}$ is established. $\delta_{PUSCH,b,f,c}$ is a value indicated by the TPC command. In the absolute mode, the value is determined by the TPC command regardless of the currently determined power control adaption value, and the relation of $f_{b,f,c}(i,l)=\delta_{PUSCH,b,f,c}$ is established. [Table 44] below shows values which can be indicated by the TPC commands.

TABLE 44

| TPC Command Field | Accumulated $\delta_{PUSCH, b, f, c}$ or $\delta_{SRS, b, f, c}$ [dB] | Absolute $\delta_{PUSCH, b, f, c}$ or $\delta_{SRS, b, f, c}$ [dB] |
|---|---|---|
| 0 | −1 | −4 |
| 1 | 0 | −1 |
| 2 | 1 | 1 |
| 3 | 3 | 4 |

[PUCCH Power Control]

[Equation 9] is an equation of determining PUCCH transmission power:

In [Equation 9], $P_{0_{PUCCH},b,f,c}(q_u)$ denotes a reference configuration transmission power configuration value, and may have different values according to various transmission types $q_u$ and be changed by a higher-layer signal such as RRC or an MAC CE. When the value is changed by the MAC CE and a slot for transmitting HARQ-ACK is k for a PDSCH receiving the MAC CE, the UE determines that the corresponding value is applied starting at a slot $k+k_{offset}$. $K_{offset}$ may have different values according to subcarrier spacing and have, for example, 3 ms. $M_{RB,b,f,c}^{PUCCH}(i)$ denotes the size of a frequency resource area to which the PUCCH is allocated. $PL_{b,f,c}(q_d)$ denotes a path attenuation estimation value of the UE and is calculated by the UE on the basis of a specific reference signal among various CSI-RSs or SS/PBCHs according to whether a higher-layer signal is configured and according to the type thereof as shown in [Equation 7]. The same $q_d$ is applied to repetitive transmission PUCCHs. The same $q_u$ is applied to repetitive transmission PUCCHs.

According to the description of the PUSCH and aperiodic/semi-persistent CSI reporting, the aperiodic CSI reporting can be multiplexed only in the first PUSCH or the first actual repetition according to the PUSCH repetitive transmission scheme A or B in current Rel-15/16 NR. That is, the aperiodic CSI reporting can be transmitted by a single TRP alone using a single transmission beam. Meanwhile, in Rel-17 FeMIMO, in order to acquire better reliability in PUSCH repetitive transmission, a method of supporting expansion to multi-TRP-based PUSCH repetition in which spatial diversity can be secured by applying a plurality of transmission beams to the PUSCH repetition is discussed.

In the corresponding discussion, supporting PUSCH repetitive transmission to multiple TRPs by applying different beams to respective PUSCH repetitions on the basis of the conventional PUSCH repetitive transmission scheme A or B is a main issue. At this time, in the case of the multi-TRP-based on PUSCH repetitive transmission A or B, when aperiodic CSI reporting is multiplexed and transmitted, if multiplexing is performed only in the first PUSCH repetition like in the conventional Rel-15/16 scheme, transmission to the corresponding TRP may fail due to channel degradation such as blockage, and thus a method of performing multiplexing one time for transmission to each TRP may be needed. At this time, as described above, combining after reception by the BS is possible only when time and frequency resource allocation values, that is, numbers of resource elements (REs) allocated to the UE are the same in respective PUSCH repetitive transmissions due to a characteristic of the polar code.

Accordingly, when aperiodic CSI reporting is multiplexed while the transport block is transmitted using the PUSCH repetitive transmission scheme A or B, a method of determining a PUSCH repetition to which aperiodic CSI reporting is multiplexed among all PUSCH repetitions may be

[Equation 9]

$$P_{PUCCH,b,f,c}(i, q_u, q_d, l) = \min\left\{\begin{array}{l} P_{CMAX,f,c}(i), \\ P_{0_{PUCCH},b,f,c}(q_u) + 10\log_{10}\left(2^\mu \cdot M_{RB,b,f,c}^{PUCCH}(i)\right) + PL_{b,f,c}(q_d) + \Delta_{F_{PUCCH}}(i) + \Delta_{TF,b,f,c}(i) + f_{b,f,c}(i, l) \end{array}\right\}$$

[dBm].

needed. Further, when no transport block is transmitted in the PUSCH repetitive transmission scheme B and aperiodic or semi-persistent CSI reporting is multiplexed, at least one transmission may be guaranteed for each TRP even though the number of PUSCH repetitions is configured to be larger than 1. When aperiodic/semi-persistent CSI reporting is multiplexed or transmitted, the disclosure may provide a method how to multiplex or transmit the same in PUSCH repetitive transmission considering multiple TRPs so as to improve CSI reception reliability of the BS. A detailed method is described in the following embodiments in detail.

In the following description of the disclosure, for convenience, a cell, a TRP, a panel, a beam, or/and a transmission direction distinguished by an indicator such as a higher layer/L1 parameter of a TCI state and spatial relation information, a cell ID, a TRP ID, or a panel ID, reference signal (RS) index (for example, a value indicated by the SRI field in DCI of the first embodiment to be described later) is commonly described as a transmission reception point (TRP). Accordingly, in the actual application, the TRP can be properly replaced with one of the above terms.

Hereinafter, in the disclosure, when determining whether to apply cooperative communication, the UE can use various methods by which PDCCH(s) allocating PDSCHs to which cooperative communication is applied have specific formats, PDCCH(s) allocating PDSCHs to which cooperative communication is applied include a specific indicator informing of whether cooperative communication is applied, PDCCH(s) allocating PDSCHs to which cooperative communication is applied are scrambled by a specific RNTI, or the application of cooperative communication to a specific section indicated by a higher layer is assumed. Thereafter, for convenience of description, reception of, by the UE, a PDSCH to which cooperative communication is applied on the basis of conditions similar to the above conditions is referred to as an NC-JT case.

Hereinafter, embodiments of the disclosure are described in detail along with the accompanying drawings. The BS is the entity that allocates resources to the UE, and may be at least one of a gNode B, a gNB, an eNode B, a Node B, a base station (BS), a radio access unit, an eNB controller, and a node on a network. The UE may include a user equipment (UE), a mobile station (MS), a cellular phone, a smart phone, a computer, or a multimedia system capable of performing a communication function. Hereinafter, although embodiments of the disclosure are described with an example of the 5G system, the embodiments of the disclosure may be applied to other communication systems having a similar technical background or channel form. For example, a mobile communication technology developed after LTE or LTE-A mobile communication and 5G may be included therein. Accordingly, embodiments of the disclosure may be applied to other communication systems through some modifications without departing from the scope of the disclosure on the basis of a determination of those skilled in the art. The content in the disclosure can be applied to FDD and TDD systems.

In description of the disclosure, detailed description of a relevant function or configuration is omitted if it is determined that the detailed description makes the subject of the disclosure unclear. The terms as described below are defined in consideration of the functions in the embodiments, and the meaning of the terms may vary according to the intention of a user or operator, convention, or the like. Therefore, the definitions of the terms may be made based on the contents throughout the specification.

In the following description of the disclosure, higher-layer signaling may be singling corresponding to at least one of or a combination of one or more of the following signaling:
  Master information block (MIB);
  System information block (SIB) or SIB X(X=1, 2, ... )
  Radio resource control (RRC)
  Medium access control (MAC) control cElement (CE)
  L1 signaling may be signaling corresponding to at least one of or a combination of one or more of signaling methods using the following physical layer channels or signaling:
  Physical downlink control channel (PDCCH)
  Downlink control information (DCI)
  UE-specific DCI
  Group common DCI
  Common DCI
  Scheduling DCI (for example, DCI used for scheduling downlink or uplink data)
  Non-scheduling DCI (for example, DCI other than DCI used for scheduling downlink or uplink data)
  Physical uplink control channel (PUCCH)
  Uplink control information (UCI)

Hereinafter, determining priorities of A and B in the disclosure may be variously expressed as selecting one having a higher priority according to a predetermined priority rule and performing an operation corresponding thereto or omitting (or dropping) an operation for one having a lower priority.

Hereinafter, the disclosure describes the examples through a plurality of embodiments but the examples are not independent, and one or more embodiments can be simultaneously or complexly applied.

Embodiment 1: PUSCH Repetitive Transmission Method Considering Multiple TRPs Embodiment 1 of the disclosure describes a method of configuring higher-layer signaling for PUSCH repetitive transmission considering multiple TRPs and indicating L1 signaling. PUSCH repetitive transmission considering multiple TRPs may operate through single or multiple DCI-based indication and is described in embodiments 1-1 and 1-2. Embodiment 1-3 of the disclosure describes a configured grant PUSCH repetitive transmission method considering multiple TRPs. Embodiment 1-4 of the disclosure describes an SRS resource set configuration method for PUSCH repetitive transmission considering multiple TRPs.

Embodiment 1-1: PUSCH Repetitive Transmission Method Considering Multiple TRPs Based on Single DCI As an embodiment of the disclosure, embodiment 1-1 describes a PUSCH repetitive transmission method considering multiple TRPs based on single DCI. The UE may report possibility of a PUSCH repetitive transmission method considering multiple TRPs based on single DCI through a UE capability report. The BS may configure which PUSCH repetitive transmission scheme is used through higher-layer signaling for the UE reporting the corresponding UE capability (for example, the UE capability supporting PUSCH repetitive transmission considering multiple TRPs based on single DCI). At this time, higher-layer signaling may select and configure one of the two types such as the PUSCH repetitive transmission type A or the PUSCH repetitive transmission type B.

In Rel-15/16, in the PUSCH repetitive transmission method considering a single TRP, all of the codebook or non-codebook-based transmission scheme are performed on the basis of single DCI. The UE may apply the same value to respective PUSCH repetitive transmissions by using the SRI or the TPMI indicated by one DCI in codebook-based PUSCH transmission. Further, the UE may apply the same value to respective PUSCH repetitive transmissions by using the SRI indicated by one DCI in non-codebook-based PUSCH transmission.

For example, when codebook-based PUSCH transmission and the PUSCH repetitive transmission scheme A are configured through higher-layer signaling and a time resource allocation index having the number of PUSCH repetitive transmissions configured as 4, SRI index 0, and TPMI index 0 are indicated through DCI, the UE applies both of SRI index 0 and TPMI index 0 to each of four PUSCH repetitive transmissions. The SRI may be associated with a transmission beam and the TPMI may be associated with a transmission precoder. Unlike the PUSCH repetitive transmission method considering a single TRP, the PUSCH repetitive transmission method considering multiple TRPs may apply different transmission beams and transmission precoders to transmissions to respective TRPs.

Accordingly, the UE may receive an indication of a plurality of SRIs or TPMIs through DCI and apply the same to respective PUSCH repetitive transmission to perform PUSCH repetitive transmission considering multiple TRPs.

When the PUSCH repetitive transmission method considering multiple TRPs based on single DCI is indicated to the UE, methods by which the PUSCH transmission method indicates a plurality of SRIs or TPMIs in the codebook or non-codebook case may be described below.

[Method 1] Single DCI Transmission Having a Plurality of SRI or TPMI Fields

In order to support the PUSCH repetitive transmission method considering multiple TRPs based on single DCI, the BS may transmit DCI having a plurality of SRI or TPMI fields to the UE. When additional higher-layer signaling (for example, signaling for determining whether a plurality of SRI or TPMI fields can be supported) is configured and there is the corresponding configuration in spite of a new format (for example, DCI format 0_3) or the conventional format (for example, DCI format 0_1 or 0_2), the DCI may be DCI having a plurality of SRI or TPMI fields, only one of the SRI or TPMI fields existing conventionally.

For example, when codebook-based PUSCH transmission is configured through higher-layer signaling and higher-layer signaling for determining whether a plurality of SRI or TPMI fields can be supported is configured, the UE may receive DCI in a new format or the existing format having two SRI fields and two TPMI fields and perform codebook-based PUSCH repetitive transmission considering multiple TRPs.

In another example, when non-codebook-based PUSCH transmission is configured through higher-layer signaling and higher-layer signaling for determining whether a plurality of SRI or TPMI fields can be supported is configured, the UE may receive DCI in a new format or the existing format having two SRI fields and perform non-codebook-based PUSCH repetitive transmission considering multiple TRPs. When a plurality of SRI fields are used for both the codebook and non-codebook-based PUSCH transmissions, the number of SRS resource sets having usage which is higher-layer signaling configured as codebook or non-codebook may be two or more, and each SRI field may indicate each SRS resource and respective SRS may be included in two different SRS resource sets. The plurality of SRS resource sets are described in detail with reference to embodiment 1-4.

[Method 2] DCI Transmission to which Improved SRI and TPMI Fields are Applied

In order to support the PUSCH repetitive transmission method considering multiple TRPs based on single DCI, the UE may receive a MAC-CE for supporting improved SRI or TPMI fields from the BS. The corresponding MAC-CE may contain information indicating a change in interpretation of the codepoint in the DCI field in order to indicate a plurality of transmission beams for a specific codepoint in the SRI field within DCI or indicate a plurality of transmission precoders for a specific codepoint in the TPMI field. A method of indicating a plurality of transmission beams may consider two matters below.

A MAC-CE activated to allow the specific codepoint in the SRI field to indicate one SRS resource connected to a plurality of pieces of SRS spatial relation info is received.

A MAC-CE activated to allow the specific codepoint in the SRI field to indicate a plurality of SRS resources connected to one piece of SRS spatial relation info is received.

When a plurality of SRS resources are indicated using the improved SRI field, a transmission power control parameter of the SRS resource is designed for each SRS resource set, and thus respective SRS resources may exist within different SRS resource sets in order to control different transmission power control parameters for respective TRPs. Accordingly, the number of SRS resource sets having usage which is higher-layer signaling configured as codebook or non-codebook may be two or more.

Embodiment 1-2: PUSCH Repetitive Transmission Method Considering Multiple TRPs Based on Multiple DCIs As an embodiment of the disclosure, embodiment 1-2 describes a PUSCH repetitive transmission method considering multiple TRPs based on multiple DCIs. As described above, since the PUSCH repetitive transmission methods in Rel-15/16 all are methods considering single TRP, the same value could be used for transmission beam, transmission precoder, resource allocation, and power control parameters. However, in PUSCH repetitive transmission considering multiple TRPs, it may be required to configure higher-layer signaling for respective PUSCH repetitive transmissions to multiple TRPs or apply different parameters to TRPs for PUSCH transmission-related parameters indicated by DCI.

For example, when multiple TRPs exist in different direction from the UE, transmission beams or transmission precoders may be different, and accordingly it is needed to separately configure or indicate the transmission beams or the transmission precoders for respective TRPs. In another example, when multiple TRPs exist at different distances from the UE, an independent power control method between the multiple TRPs and the UE may be needed and accordingly different time/frequency resource allocations may be performed.

For example, for a TRP existing at a relatively long distance compared to a specific TRP, the relatively smaller number of RBs and larger number of symbols may be allocated to increase power per RE. Accordingly, when different pieces of information are transmitted to the UE through single DCI, the length of bits of the corresponding DCI may become very large, and thus it may be more efficient to indicate PUSCH repetitive transmission to the UE through a plurality of DCIs.

The UE may report possibility of a PUSCH repetitive transmission method considering multiple TRPs based on multiple DCIs through a UE capability report. The BS may inform the UE reporting the corresponding UE capability (for example, the UE capability supporting PUSCH repetitive transmission considering multiple TRPs based on multiple DCIs) of the performance of PUSCH repetitive transmission considering multiple TRPs through multiple DCIs by using a configuration through higher-layer signaling, an indication through L1 signaling, or a configuration and an indication through a combination of higher-layer signaling and L1 signaling. The BS may use a method of configuring or indicating PUSCH repetitive transmission considering multiple TRPs based on multiple DCIs as described below.

In PUSCH repetitive transmission considering multiple TRPs based on multiple DCIs, the UE may expect different pieces of time/frequency resource allocation information indicated by respective DCIs in consideration of TRPs at different distances from the UE. The UE may report whether different time/frequency resources can be allocated to the UE through the BS capability. The BS may configure whether different time/frequency resources can be allocated to the UE through higher-layer signaling, and the UE receiving the corresponding configuration may expect different pieces of time/frequency resource allocation information indicated by respective DCIs.

At this time, the UE may receive a configuration or an indication of PUSCH repetitive transmission considering multiple TRPs based on multiple DCIs from the BS in consideration of a higher-layer signaling configuration and a condition between a plurality of DCI fields. When transmission beam and transmission precoder information is indicated through multiple DCIs, the SRI and the TPMI within the first received DCI may be applied first when the transmission beam mapping method of embodiment 2 is applied and the SRI and the TPMI within the second received DCI may be applied second when the transmission beam mapping method is applied.

The BS may configure CORESETPoolIndex which is higher-layer signaling in the UE for each CORESET, and the UE may know, when receiving any CORESET, a TRP from which the corresponding CORESET is transmitted. For example, when CORESETPoolIndex is configured as 0 in CORESET #1 and CORESETPoolIndex is configured as 1 in CORESET #2, the UE may know that CORESET #1 is transmitted from TRP #0 and CORESET #2 is transmitted from TRP #1. Further, an indication of the repetitive PUSCH by DCI transmitted within each CORESET having CORESETPoolIndex configured as 0 and 1 may be an implicit indication by a condition between specific fields within a plurality of transmitted DCIs.

For example, when HARQ process number field values within a plurality of DCIs which the BS transmits to the UE are the same and NDI field values are the same, the UE may implicitly consider that the plurality of corresponding DCIs schedule repetitive PUSCHs in consideration of multiple TRPs. Meanwhile, when HARQ process number field values are the same and NDI field values are the same, reception of a plurality of DCIs may be limited. For example, a maximum interval between the plurality of DCI receptions may be defined within the number of one or more specific slots or the number of one or more specific symbols. At this time, the UE may perform PUSCH transmission on the basis of a minimum transport block size calculated (or identified) on the basis of time/frequency resource allocation information differently indicated by a plurality of DCIs.

Embodiment 1-3: Configured Grant PUSCH Repetitive Transmission Method Considering Multiple TRPs Embodiment 1-3 describes a configured grant PUSCH repetitive transmission method considering multiple TRPs as an embodiment of the disclosure. The UE may report whether to transmit a configured grant PUSCH repetitive transmission considering multiple TPRs to the BS through the UE capability. The BS may configure or indicate the configured grant PUSCH repetitive transmission considering multiple TRPs through higher-layer signaling, L1 signaling, or a combination of higher-layer signaling or L1 signaling by using various methods below.

[Method 1] Activation of a Single DCI-Based Configured Grant Configuration

Method 1 is a method of indicating a plurality of SRIs or TPMIs to the UE on the basis of the single DCI and activating a single configured grant configuration in addition to the corresponding indication. The method indicating the plurality of SRIs or TPMIs through the single DCI may follow the method in Embodiment 1-1 and, when only one configured grant exists in the UE, all bits in the HARQ process number field and the redundancy version field within the corresponding DCI may be indicated as 0.

When a plurality of configured grant configurations exist in the UE and one thereof is activated by the corresponding DCI, the HARQ process number field within the corresponding DCI may indicate an index of the configured grant configuration and all bits in the redundancy version field may be indicated as 0. The UE may map transmission beams and transmission precoders to respective activated configured grant PUSCH repetitive transmissions according to the transmission beam mapping method in Embodiment 2 below by using a plurality of SRIs or TPMIs indicated by single DCI.

[Method 2] Activation of a Single Configuration Grant Configuration Based on Multiple DCIs Method 2 is a method of indicating SRIs or TPMIs to the UE through respective DCIs on the basis of multiple DCIs and activating a single configured grant configuration in addition to the corresponding indication. The method indicating the respective SRIs or TPMIs through multiple DCIs may follow the method in Embodiment 1-2 and, when only one configured grant configuration exists in the UE, all bits in all of the HARQ process number fields and the redundancy version fields within the multiple DCIs may be indicated as 0. When a plurality of configured grant configurations exist in the UE and one thereof is activated by the multiple DCIs, all of the HARQ process number fields within the corresponding multiple DCIs may indicate an index of the same configured grant configuration and all bits in all of the redundancy version fields within the corresponding multiple DCIs may be indicated as 0. There may be a characteristic that the NDI field also has the same value as well as the HARQ process number field according to the DCI field condition in the PUSCH repetitive transmission based on multiple DCIs.

The UE may map transmission beams and transmission precoders to respective activated configured grant PUSCH repetitive transmissions according to the following transmission beam mapping method by using a plurality of SRIs or TPMIs indicated by multiple DCIs For example, when transmission beam and transmission precoder-related information indicated by the first received DCI are SRI #1 and TPMI #1, transmission beam and transmission precoder-related information indicated by the second received DCI are SRI #2 and TPMI #2, and the transmission beam mapping method configured through higher-layer signaling is cyclical, the UE may perform the PUSCH transmission by applying SRI #1 and TPMI #1 to odd-numbered transmissions(1, 3, 5, . . . ) of the activated configured grant PUSCH repetitive transmissions and applying SRI #2 and TPMI #2 to even-numbered transmissions (2, 4, 6, . . . ) of the repetitive transmissions.

[Method 3] Activation of Multiple Configuration Grant Configurations Based on Multiple DCIs Method 3 is a method of indicating SRIs or TPMIs to the UE through respective DCIs on the basis of multiple DCIs and activating multiple configured grant configurations in addition to the corresponding indication. The method indicating the SRIs or the TPMIs through the respective DCIs on the basis of the multiple DCIs may follow the method in Embodiment 1-2, and the existence of a plurality of configured grant configurations and indexes of the configured grant configurations may be indicated through HARQ process number fields within the DCIs. Further, all bits in all of the redundancy version fields within the corresponding multiple DCIs may be indicated as 0. There may be a characteristic that the NDI field also has the same value as well as the HARQ process number field according to the DCI field condition in the PUSCH repetitive transmission based on multiple DCIs.

The UE may receive MAC-CE signaling indicating (instructing) the connection between a plurality of configured grant configurations activated by multiple DCIs. After 3 ms from HARQ-ACK transmission for MAC-CE signaling, the UE may receive multiple DCIs from the BS and, when the configured grant configuration index indicated by each DCI matches configured grant configuration indexes indicated (instructed) to be connected through MAC-CE signaling, the UE may perform PUSCH repetitive transmission considering multiple TRPs on the basis of the corresponding indicated configured grant configurations.

At this time, the plurality of connected configured grant configurations may share the same value for some configurations. For example, repK which is higher-layer signaling meaning the number of repetitive transmissions, repK-RV which is higher-layer signaling meaning the order of redundancy versions in repetitive transmissions, and periodicity which is higher-layer signaling meaning the period of repetitive transmission may be configured to the same value within the connected configured grant configurations.

Embodiment 1-4: SRS Resource Set Configuration Method for PUSCH Repetitive Transmission Considering Multiple TRPs As an embodiment of the disclosure, embodiment 1-4 describes an SRS resource set configuration method for PUSCH repetitive transmission considering multiple TRPs. SRS power control parameters (for example, alpha, p0, pathlossReferenceRS, srs-PowerControlAjdustmentStates, and the like which can be configured through higher-layer signaling) may vary depending on each SRS resource set, and thus the number of SRS resource sets may be increased to two or more for different SRS power controls for respective TRPs in PUSCH repetitive transmission considering multiple TRPs and different SRS resource sets may be used to support different TRPs. The SRS resource set configuration method considered in the present embodiment may be applied to embodiments 1-1 to 1-3.

In PUSCH repetitive transmission considering multiple TRPs based on single DCI, a plurality of SRIs indicated by single DCI may be selected from SRS resources existing within different SRS resource sets. For example, when two SRIs are indicated by single DCI, a first SRI may be selected from SRS resource set #1 and a second SRI may be selected from SRS resource set #2.

In PUSCH repetitive transmission considering multiple TRPs based on multiple DCIs, each SRI indicated by two DCIs may be selected from SRS resources existing different SRS resource sets, and each SRS resource set may be explicitly or implicitly connected (may correspond to) to higher-layer signaling meaning each TRP (for example, CORESETPoolIndex). In the explicit connection method, a value of CORESETPoolIndex may be configured within a configuration of the SRS resource set configured through the higher layer and a semi-static connection state between the CORESET and the SRS resource set may be notified to the UE therethrough. In another example, in a more dynamic explicit connection method, a MAC-CE for activating the connection between a specific CORESET (including all of the cases in which the value of CORESETPoolIndex is configured as 0 or 1 or nothing is configured) and the SRS resource set may be used.

It may be considered that the connection between the corresponding CORESET and the SRS resource set is activated after 3 ms from transmission of HARQ-ACK after reception of the MAC-CE for activating the connection between the specific CORESET (including all of the cases in which the value of CORESETPoolIndex is configured as 0 or 1 or nothing is configured) and the SRS resource set. In an implicit method, an implicit connection state is assumed using a specific reference between CORESETPoolIndex and an index of the SRS resource set. For example, when it is assumed that the UE receives a configuration of two SRS resource sets #0 and #1, the UE may assume that CORE-SETs in which no CORESETPoolIndex is configured or having CORESETPoolIndex configured as 0 are connected to SRS resource set #0 and CORESETs having CORESET-PoolIndex configured as 1 are connected to SRS resource set #1.

For the methods based on single or multiple DCIs, the UE explicitly or implicitly receiving a configuration or an indication of the connection between different SRS resource sets and respective TRPs may expect that an srs-PowerControlAdjustmentStates value configured through higher-layer signaling within each SRS resource set is configured as sameAsFci2 and may not expect a configuration as separateClosedLoop. Further, the UE may expect that usage configured through higher-layer signaling within each SRS resource set is equally configured as codebook or noncodebook.

Embodiment 1-5: Dynamic Switching Method for Determining PUSCH Transmission Considering Single TRP Based on Codebook or PUSCH Transmission Considering Multiple TRPs As an embodiment of the disclosure, embodiment 1-5 describes a dynamic switching method for determining PUSCH transmission considering a single TRP based on codebook or PUSCH transmission considering multiple TRPs.

According to embodiment 1-1 and embodiment 1-4, the BS may receive a UE capability report from the UE capable of performing codebook-based PUSCH repetitive transmission in consideration of multiple TRPs based on single DCI and configure higher-layer signaling for performing PUSCH repetitive transmission through multiple TRPs in the UE. At this time, like in embodiment 1-4, in PUSCH repetitive transmission considering multiple TRPs based on single DCI, the BS may transmit single DCI including a plurality of SRI fields to the UE in order to indicate SRS resources existing within different SRS resource sets. At this time, the plurality of SRI fields may be analyzed through a method which is the same as that in NR Release 15/16.

More specifically, a first SRI field may select an SRS resource from a first SRS resource set and the second SRI field may select an SRS resource from a second SRS resource set. Similar to the plurality of SRI fields, in order to repeatedly transmit the PUSCH in consideration of multiple TRPs, the BS may transmit single DCI including a plurality of TPMI fields to the UE to select a TPMI corresponding to the SRS resource indicated by each SRI field. At this time, the plurality of TPMI fields may be indicated through DCI which is the same as the DCI including the plurality of SRI fields. Meanwhile, the plurality of TPMIs to be used for PUSCH transmission to each TRP may be selected through the following methods using a plurality of TPMI fields.

[Method 1] each TPMI field may be analyzed through a method which is the same as that in NR Release 15/16. For example, a first TPMI field may indicate a TPMI index and layer information for the SRS resource indicated by the first SRI field, and a second TPMI field may indicate a TPMI index and layer information for the SRS resource indicated by the second SRI field. At this time, the first TPMI field and the second TPMI field may indicate the same layer information.

[Method 2] first TPMI field may indicate a TPMI index and layer information for the SRS resource indicated by the first SRI field through a method which is the same as that in NR Release 15/16. Unlike this, a second TPMI field selects a TPMI index for the same layer as the layer indicated by the first TPMI field and thus may not indicate layer information and may indicate TPMI index information for the SRS resource indicated by the second SRI field.

Meanwhile, when a plurality of TPMIs are selected through method 2, the length of bits of the second TPMI field may be smaller than the first TPMI field. The second TPMI field indicates one value (index) among TPMI index candidates which are the same as the layer indicated by the first TPMI field, and accordingly may not indicate layer information.

The UE may support a dynamic switching method of receiving single DCI including a plurality of SRI fields and a plurality of TPMI fields and determining PUSCH repetitive transmission considering multiple TRPs or PUSCH repetitive transmission considering a single TRP on the basis thereof. The UE may support dynamic switching by using a reserved value which has no meaning among values which a plurality of TPMI fields or SRI field included in the received DCI can have. For example, when the length of bits of the SRI field is 2, a total of number of cases may be 4, in which case each case which can be expressed may be defined as a codepoint. Further, when three codepoints among a total of four codepoints have the meaning which SRI is to be indicated and one remaining codepoint has no meaning, the codepoint may be a codepoint indicating the reserved value (in the following description, the codepoint indicating the reserved value may be expressed to be configured as reserved). This is described below in more detail.

Four PUSCH antenna ports are assumed to describe the dynamic switching method supported by a plurality of TPMI fields through the reserved value as a detailed example. It is assumed that the first TPMI field may include 6 bits, and a higher layer parameter codebookSubset is configured as fullyAndPartialAndNonCoherent and is indicated through a method which is the same as that in NR Release 15/16. At this time, in the first TPMI field, indexes 0 to 61 may be configured to indicate valid TPMI indexes and layer information and indexes 62 to 63 may be configured as reserved. When the second TPMI field includes only TPMI index information except for layer information like in method 2, the second TPMI field may indicate only the TPMI index in the case in which the layer for PUSCH transmission is limited to one value (for example, one of 1 to 4) according to the first TPMI field. At this time, the number of bits of the second TPMI field may be configured on the basis of the number of bits which can express the layer having the largest candidates among TPMI index candidates which can be configured for each layer.

For example, according to an example in which candidates 0 to 27 are in layer 1, candidates 0 to 21 are in layer 2, candidates 0 to 6 are in layer 3, and candidates 0 to 4 are in layer 4, layer 1 has the largest number of candidates. Accordingly, the number of bits of the second TPMI field may be configured as 5 according to the number of TPMI index candidates of layer 1. In a detailed description of the second TPMI field configuration, when the first TPMI field indicates layer 1 and a TPMI index according thereto, the UE may analyze the second TPMI field as a codepoint indicating one value among TPMI indexes 0 to 27 for layer 1 and a codepoint indicating a reserved value. For example, when the first TPMI field indicates layer 2 and a TPMI index according thereto, the UE may analyze the second TPMI field as a codepoint indicating one value among TPMI indexes 0 to 21 for layer 2 and a codepoint indicating a reserved value. Further, for example, similar to the above description, the UE may analyze the second TPMI field for the case in which the first TPMI field indicates layer 3 or layer 4 and a TPMI index according thereto.

At this time, when the second TPMI field includes two or more codepoints indicating the reserved value in addition to the codepoint indicating the TPMI, the two codepoints indicating the reserved value may be used to indicate dynamic switching. That is, among codepoints of the second TPMI fields including 5 bits, a last second codepoint (that is, $31^{st}$ codepoint in the example) corresponding to the codepoint indicating the reserved value may be used to indicate PUSCH repetitive transmission considering a single TRP as the first TRP and the last codepoint (that is, $32^{nd}$ codepoint in the example) may be used to indicate PUSCH repetitive transmission considering a single TRP as the second TRP. At this time, the UE may receive an indication of layer information and TPMI index information for PUSCH repetitive transmission considering a single TRP through the first TPMI field. Meanwhile, the above-described assumption is only for convenience of description and the disclosure is not limited thereto.

For convenience of description, in generalization of a detailed example of two TRPs, the UE may receive single DCI including two SRI fields and two TPMI fields and perform dynamic switching according to a codepoint indicated by the second TPMI field. When the codepoint of the second TPMI field indicates a TPMI index for a layer indicated by the first TPMI field, the UE may perform PUSCH repetitive transmission considering multiple TRPs. When the second TPMI field indicates the last second codepoint corresponding to the codepoint indicating the reserved value, the UE may perform PUSCH repetitive transmission considering a single TRP for TRP 1 and identify layer information and TPMI index information for codebook-based PUSCH transmission from the first TPMI field. When the second TPMI field indicates the last codepoint corresponding to the codepoint indicating the reserved value, the UE may perform PUSCH repetitive transmission considering a single TRP for TRP 2 and identify layer information and TPMI index information for codebook-based PUSCH transmission from the first TPMI field.

Meanwhile, although the two last reserved codepoints of the second TPMI field are used to indicate dynamic switching in the above-described example, the present embodiment is not limited thereto. That is, dynamic switching may be indicated using codepoints indicating two different reserved values of the second TPMI field and may be indicated by mapping PUSCH repetitive transmission considering a single TRP for TRP 1 or PUSCH repetitive transmission considering a single TRP for TRP 2 to the codepoints indicating respective reserved values.

Further, although the case in which the second TPMI field is determined through method 2 is described in the example, like in the above example, dynamic switching may be supported using the reserved codepoint of the TPMI when the second TPMI field is determined to be the same as NR Release 15/16 in method 1.

For example, when the number of codepoints indicating the reserved value of the second TPMI field is smaller than 2, the number of bits of the second TPMI field may be increased by 1, and the last second codepoint and the last codepoint based on the increased number of bits may be used to support dynamic switching.

When two TPMI fields are determined like in method 1, a method of supporting dynamic switching according to whether each TPMI field is indicated by the codepoint indicating the reserved value may be additionally considered. That is, the UE may perform PUSCH repetitive transmission considering a single TRP for TRP 2 when the first TPMI field is indicated by the codepoint indicating the reserved value and may perform PUSCH repetitive transmission considering a single TRP for TRP 1 when the second TPMI is indicated by the codepoint indicating the reserved value. When all of the two TPMI fields indicate the codepoint for the TPMI rather than the codepoint indicating the reserved value, the UE may perform PUSCH repetitive transmission considering multiple TRPs. When there is no codepoint having the reserved value, the number of bits of the TPMI fields may be increased by 1, and the last codepoint based on the increased number of bits may be used to support dynamic switching.

Meanwhile, in another method of supporting dynamic switching, dynamic switching may be indicated by two SRI fields and the UE may identify layer information and TPMI index information for PUSCH repetitive transmission considering multiple TRPs or a single TRP from the two TPMI fields. When the number of codepoints indicating the reserved value is one or more in each SRI field, dynamic switching may be supported according to whether the corresponding SRI field indicates the codepoint indicating the reserved value. When the first SRI field indicates the codepoint indicating the reserved value and the second SRI field indicates the SRS resource of the second SRS resource set, the UE may perform PUSCH repetitive transmission considering a single TRP for TRP 2. At this time, in order to perform PUSCH repetitive transmission considering a single TRP for TRP 2, the UE may identify layer information and TPMI index information from the first TPMI field.

When the second SRI field indicates the codepoint indicating the reserved value and the second SRI field indicates the SRS resource of the second SRS resource set, the UE may perform PUSCH repetitive transmission considering a single TRP for TRP 1. At this time, in order to perform PUSCH repetitive transmission considering a single TRP for TRP 1, the UE may identify layer information and TPMI index information from the first TPMI field. When all of the two SRI fields indicate the SRS resource of each SRS resource set rather than the codepoint indicating the reserved value, the UE may perform PUSCH repetitive transmission considering multiple TRPs. At this time, the UE may identify layer information and TPMI index information from the first TPMI field in order to perform PUSCH repetitive transmission for TRP 1, and identify TPMI index information from the second TPMI field in order to perform PUSCH repetitive transmission for TRP 2. At this time, in PUSCH transmission for TRP 1 and TRP 2, layers may be configured to be the same. When there is no codepoint indicating the reserved value in the two SRI field, the number of bits of each SRI field may be increased by 1, and the last codepoint of the codepoints indicating the reserved value based on the increased number of bits may be used to support dynamic switching.

Embodiment 1-6: Dynamic Switching Method for Determining PUSCH Transmission Considering Single TRP Based on Non-Codebook or PUSCH Transmission Considering Multiple TRPs As an embodiment of the disclosure, embodiment 1-6 describes a dynamic switching method for determining PUSCH transmission considering a single TRP based on non-codebook or PUSCH transmission considering multiple TRPs.

According to embodiment 1-1 and embodiment 1-4, the BS may receive a UE capability report from the UE capable of performing non-codebook-based PUSCH repetitive transmission in consideration of multiple TRPs based on single DCI and configure higher-layer signaling for performing PUSCH repetitive transmission through multiple TRPs in the UE. At this time, like in embodiment 1-4, in PUSCH repetitive transmission considering multiple TRPs based on single DCI, the BS may transmit single DCI including a plurality of SRI fields to the UE in order to indicate SRS resources existing within different SRS resource sets. Meanwhile, the plurality of SRI fields may be selected, for example, according to the following methods.

In one embodiment of Method 1, each SRI field may be selected through a method which is the same as that in NR Release 15/16. For example, the first SRI field may indicate the SRS resource for PUSCH transmission within the first SRS resource set and the second SRI field may indicate the SRS resource for PUSCH transmission within the second SRS resource set. At this time, the first SRI field and the second SRI field may indicate the same layer information.

In one embodiment of Method 2, first SRI field may indicate SRS resource(s) for PUSCH transmission within the first SRS resource set in a method which is the same as that in NR Release 15/16. The second SRI field may indicate SRS resource(s) for PUSCH transmission within the second SRS resource set for the layer which is the same as the layer indicated by the first SRI field.

When a plurality of SRIs are selected through method 2, the length of bits of the second SRI field may be smaller than the first SRI field. This is because the second SRI is determined from among SRI candidates for a layer which is the same as the layer determined by the first SRI field among the SRI candidates for all the supportable layers.

The UE may support a dynamic switching method of receiving single DCI including a plurality of SRIs and determining PUSCH repetitive transmission considering multiple TRPs or PUSCH repetitive transmission considering a single TRP on the basis thereof. The UE may support dynamic switching by using codepoints indicating reserved values of the plurality of SRI fields included in the received DCI.

In order to describe a detailed example of a dynamic switching method for supporting codepoints indicating reserved values of a plurality of SRI fields, the case in which a maximum of PUSCH antenna ports is 4 and the number of SRS resources within each SRS resource set is 4 is assumed. Further, it is assumed that the first SRI field includes 4 bits and is indicated by a method which is the same as that in NR Release 15/16. At this time, in a first SRI area, indexes 0 to 14 may be configured to indicate an SRS resource for PUSCH transmission and a layer according to the selected SRS resource and index 15 may be configured as a codepoint indicating a reserved value. When the second SRI field selects the number of SRS resources which is the same as the number of layers indicated by the first SRI like in method 2, the second SRI field may indicate an SRS resource selection candidate in the case in which the layer for PUSCH transmission is limited to one value (for example, one of 1 to 4) according to the first SRI field. At this time, the number of bits of the second SRI field may be configured on the basis of a layer having the largest number of candidates among SRS resource selection candidates for each layer.

For example, SRI fields values indicating SRS resource selection candidates for layer 1 may have a total of 4 candidates from 0 to 3, SRI field values indicating SRS resource selection candidates for layer 2 may have a total of 6 candidates from 4 to 9, SRI field values indicating SRS resource selection candidates for layer 3 may have a total of 4 candidates from 10 to 13, and SRI field values indicating SRS resource selection candidates for layer 4 may have a total of 1 candidate which is 14. At this time, since the number of candidates for layer 2 is the largest which is a total of 6, the number of bits of the second SRI field may be configured as 3. In a detailed description of the second SRI field configuration, when the SRI value in the case in which the layer for PUSCH transmission is 1 is indicated by the first SRI field, the UE may analyze a codepoint indicating one value of SRI candidates 0 to 3 for layer 1 or other values as a codepoint having a reserved value.

For example, when the SRI value in the case in which the layer for PUSCH transmission is 2 is indicated by the first SRI field, the UE may analyze a codepoint indicating one value of SRI candidates 0 to 5 for layer 2 or other values as a codepoint having a reserved value. Further, for example, the UE may analyze the second SRI field in a similar way when the SRI value in the case in which the layer for PUSCH transmission is 3 or 4 is indicated by the first SRI field. At this time, when there are two or more codepoints indicating the reserved value in the second SRI field except for the codepoint indicating the SRI value according to the layer, the two codepoints indicating the reserved value may be used to indicate dynamic switching.

That is, among codepoints of the second SRI fields including 3 bits, a last second codepoint (that is, $7^{th}$ codepoint in the example) corresponding to the codepoint indicating the reserved value may be used to indicate PUSCH repetitive transmission considering a single TRP as the first TRP and the last codepoint (that is, $8^{th}$ codepoint in the example) may be used to indicate PUSCH repetitive transmission considering a single TRP as the second TRP. At this time, the UE may receive an indication of the SRI for PUSCH repetitive transmission considering a single TRP through the first SRI field. Meanwhile, the above-described assumption is only for convenience of description and the disclosure is not limited thereto.

For convenience of description, in generalization of a detailed example of two TRPs, the UE may receive single DCI including two SRI fields and perform dynamic switching according to a codepoint indicated by the second SRI field. When the codepoint of the second SRI field indicates an SRI value for a layer indicated by the first SRI field, the UE may perform PUSCH repetitive transmission considering multiple TRPs. When the second SRI field indicates the last second codepoint corresponding to the codepoint indicating the reserved value, the UE may perform PUSCH repetitive transmission considering a single TRP for TRP 1 and identify an SRI for codebook-based PUSCH transmission from the first SRI field. When the second SRI field indicates the last codepoint corresponding to the codepoint indicating the reserved value, the UE may perform PUSCH repetitive transmission considering a single TRP for TRP 2 and identify an SRI for non-codebook-based PUSCH transmission from the first SRI field.

Meanwhile, although the codepoints indicating the two last reserved values of the second SRI field are used to indicate dynamic switching in the above-described example, the present embodiment is not limited thereto. That is, dynamic switching may be indicated using codepoints indicating two different reserved values of the second SRI field and may be indicated by mapping PUSCH repetitive transmission considering a single TRP for TRP 1 or PUSCH repetitive transmission considering a single TRP for TRP 2 to the codepoints indicating respective reserved values.

Further, although the case in which the second SRI field is determined through method 2 is described in the example, like in the above example, dynamic switching may be supported using the reserved value of the SRI field when the second SRI field is determined to be the same as NR Release 15/16 in method 1.

For example, when the number of codepoints indicating the reserved value of the second SRI field is smaller than 2, the number of bits of the second SRI field may be increased by 1, and the last second codepoint and the last codepoint based on the increased number of bits may be used to support dynamic switching.

When two SRI fields are determined like in method 1, a method of supporting dynamic switching according to whether each SRI field is indicated by the codepoint indicating the reserved value may be additionally considered. That is, the UE may perform PUSCH repetitive transmission considering a single TRP for TRP 2 when the first SRI field is indicated by the codepoint indicating the reserved value and may perform PUSCH repetitive transmission considering a single TRP for TRP 1 when the second SRI is indicated by the codepoint indicating the reserved value. When all of the two SRI fields indicate the codepoint for indicating the SRI rather than the codepoint indicating the reserved value, the UE may perform PUSCH repetitive transmission considering multiple TRPs. When there is no codepoint having the reserved value, the number of bits of the SRI fields may be increased by 1, and the last codepoint based on the increased number of bits may be used to support dynamic switching.

Figure 19A:
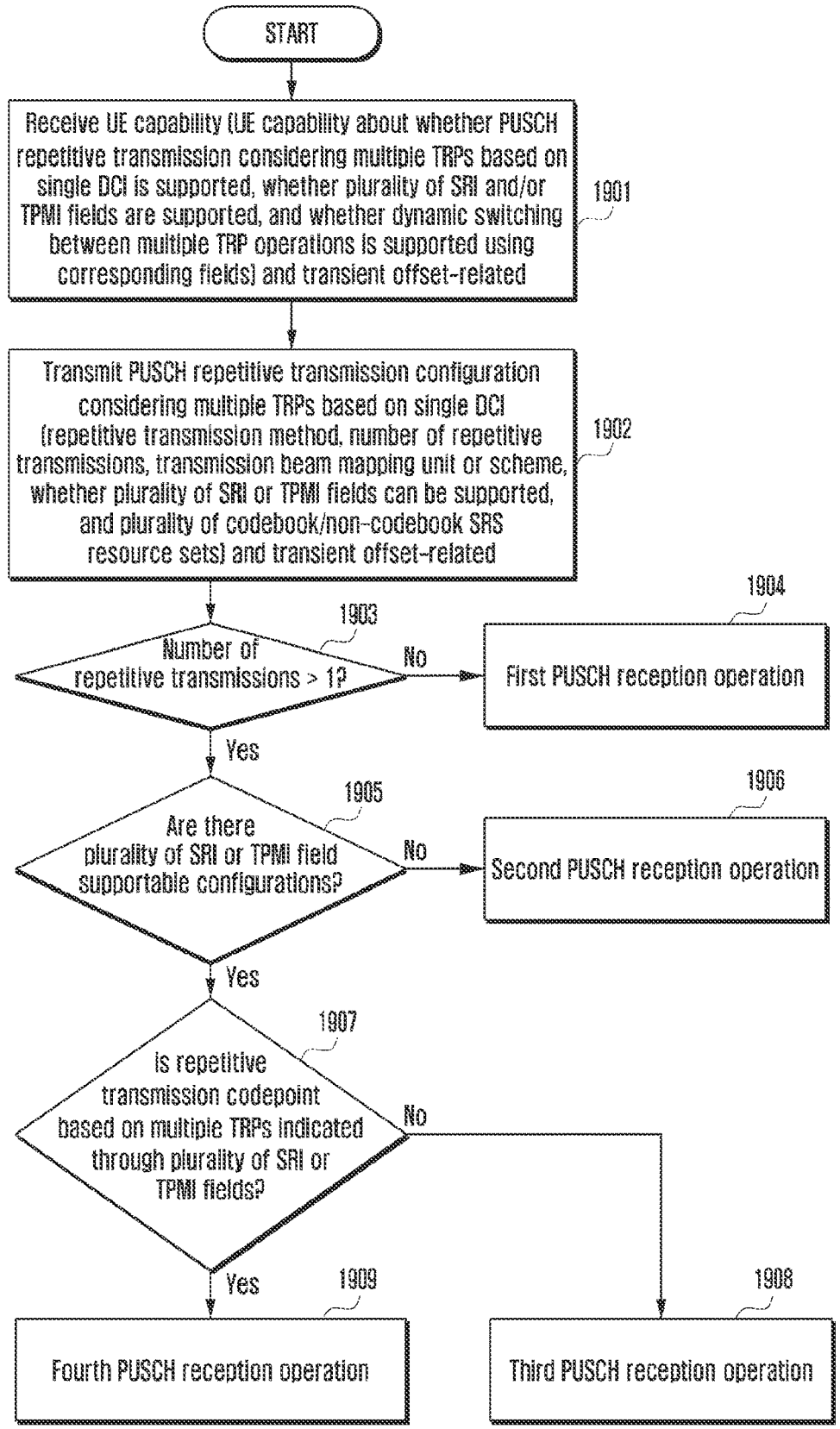
FIG. 19A illustrates an operation of the BS for PUSCH repetitive transmission considering multiple TRPs based on single DCI transmission having a plurality of SRI or TPMI fields according to an embodiment of the present disclosure.
Figure 19B:
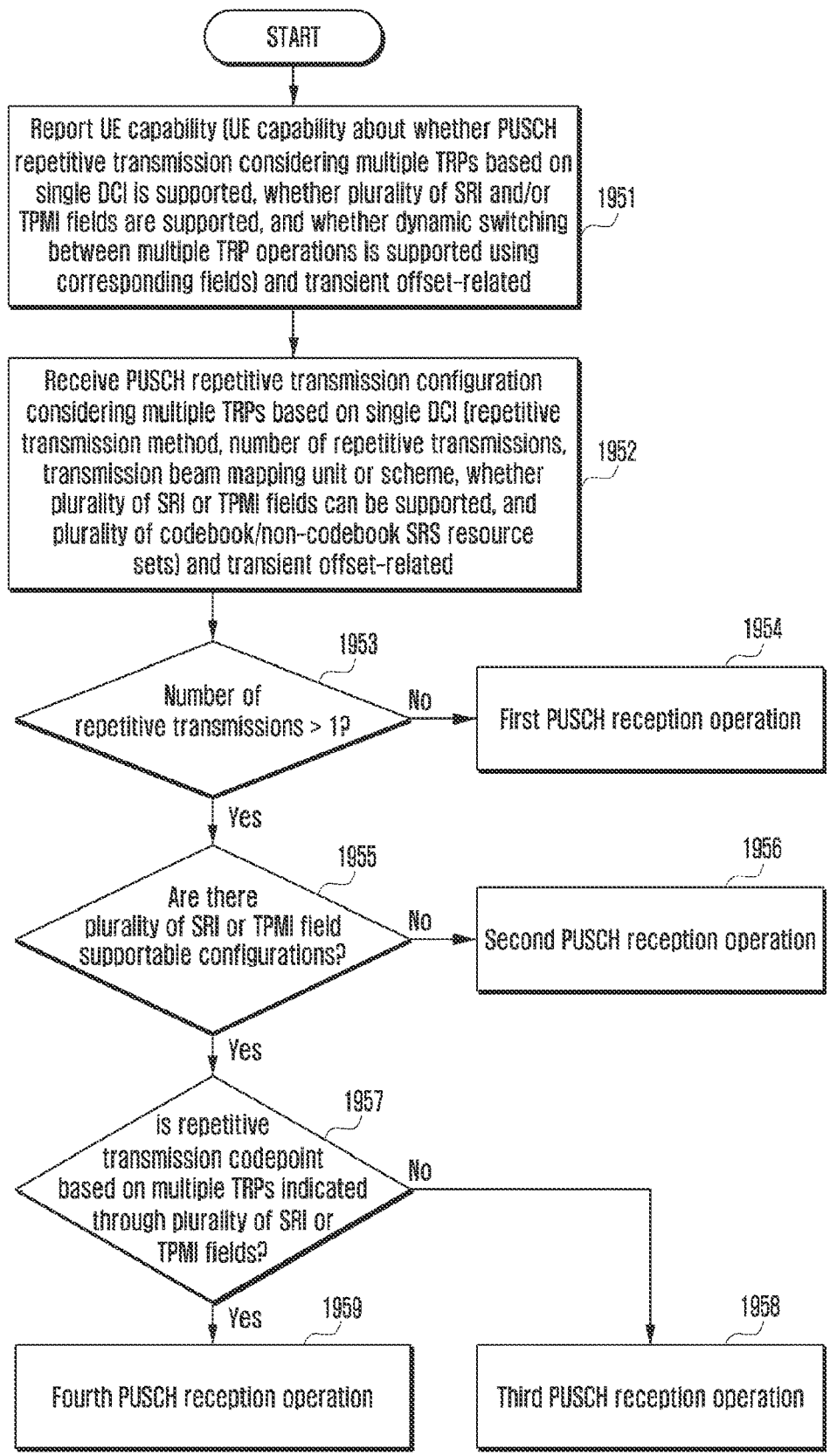
FIG. 19B illustrates an operation of the UE for PUSCH repetitive transmission considering multiple TRPs based on single DCI transmission having a plurality of SRI or TPMI fields according to an embodiment of the present disclosure.

FIGS. 19A and 19B illustrate operations of the BS and UE for PUSCH repetitive transmission considering multiple TRPs based on single DCI transmission having a plurality of SRI or TPMI fields according to an embodiment of the disclosure.

Referring to FIGS. 19A and 19B, the UE transmits a UE capability report about whether PUSCH repetitive transmission considering multiple TRPs based on single DCI is supported, whether a plurality of SRI or TPMI fields are supported, whether dynamic switching between single/multi-TRP operations using the corresponding fields, and transient offset-related information when a transmission beam described in embodiment 2 is changed in operation 1951, and the BS receiving the corresponding UE capability report in operation 1901 transmits a PUSCH repetitive transmission configuration considering multiple TRPs based on single DCI to the UE in operation 1902.

At this time, as transmitted configuration information, a repetitive transmission method, the number of repetitive transmissions, a transmission beam mapping unit or scheme, whether a plurality of SRI or TPMI fields can be supported, a plurality of SRS resource sets for codebook or non-codebook, and transient offset-related information when a transmission beam change described below in embodiment 2 is made. The UE receiving the corresponding configuration in operation 1952 may identify the number of repetitive transmissions of the PUSCH through a resource allocation field configured through higher-layer signaling or within DCI. At this time, when the number of repetitive transmissions is not larger than 1 in operation 1953, that is, when repetitive transmission is not performed, the UE may perform a first PUSCH transmission operation in operation 1954. The first PUSCH transmission operation may be an operation of transmitting the PUSCH once to a single TRP by using one SRI and TPMI field in the case of codebook-based PUSCH transmission and using one SRI field in the case of non-codebook-based PUSCH transmission, that is, one transmission beam.

When the number of repetitive transmissions is larger than 2 in operation 1953, the UE may perform a second PUSCH transmission operation in operation 1956 if a plurality of SRI or TPMI field supportable configurations are not received from the BS in operation 1955. The second PUSCH transmission operation may be an operation of repeatedly transmitting the PUSCH to a single TRP by using one SRI and TPMI field in the case of codebook-based PUSCH transmission and using one SRI field in the case of non-codebook-based PUSCH transmission, that is, one transmission beam. Meanwhile, when the UE receives a plurality of SRIs or TPMI field supportable configurations from the BS in operation 1955 and the UE indicates a codepoint meaning repetitive transmission based on a single TRP described in embodiments 1-5 and 1-6 without indicating a codepoint meaning repetitive transmission based on multiple TRPs through a plurality of SRI or TPMI fields within the received DCI in operation 1957, the UE may perform a third PUSCH transmission operation in operation 1958.

The third PUSCH transmission operation is an operation of repeatedly transmitting the PUSCH to a specific single TRP by using two SRI and TPMI fields in the case of codebook-based PUSCH transmission and two SRI fields in the case of non-codebook-based PUSCH transmission through a codepoint indicating single TRP transmission among codepoints within each field, that is, using one transmission beam.

Accordingly, repetitive transmissions to the first or second TRP may be indicated according to which codepoint is indicated through a plurality of SRI or TPMI fields. When the UE receives a plurality of SRI or TPMI field supportable configurations from the BS in operation 1955 and the UE indicates a codepoint meaning repetitive transmission based on multiple TRPs through a plurality of SRI or TPMI fields within the received DCI in operation 1957, the UE may perform a fourth PUSCH transmission operation in operation 1959. The fourth PUSCH transmission operation is an operation in which the UE repeatedly transmits the PUSCH to a plurality of TRPs by using two SRI and TPMI fields in the case of codebook-based PUSCH transmission and two SRI fields in the case of non-codebook-based PUSCH transmission through a codepoint indicating a plurality of TRP transmissions among codepoints within each field, that is, using two transmission beams.

Embodiment 2: Definition of Time Interval Considering UE Capability Report and Uplink Signal Transmission Method As an embodiment of the disclosure, the UE may define a time interval (for example, expressed as a transient period, a transient offset, or a transient gap) which can be needed between a plurality of uplink transmissions to transmit a UE capability report or receive a configuration from the BS, and may apply the corresponding time interval between respective uplink transmissions when an uplink signal is transmitted considering the same. In order to transmit the uplink signal, the UE may change at least one of an uplink beam, transmission power, and a frequency before signal transmission. Further, in order to transmit the uplink signal, the UE may change a panel before signal transmission.

Accordingly, in order to transmit the uplink signal, the UE may change at least one of the uplink beam, the transmission power, the frequency, and the panel before signal transmission. For the panel, a panel corresponding to each beam, such as panel #1 for beam group #1, panel #2 for beam group #2, . . . may be configured when a plurality of beams are divided into, for example, a plurality of beam groups. In another example, for the panel, a panel corresponding to each antenna module may be configured when a plurality of antenna modules for forming beams are included in the UE and the plurality of antenna modules are installed in different locations. In addition, a plurality of panels may be configured in various ways for dividing a plurality of beams having different beam widths, beam directions, or the like. A change for uplink signal transmission may be made in the following cases.

In one example of Case 1 in which, when an uplink signal (for example, a PUCCH, a PUSCH, an SRS, or the like) is repeatedly transmitted to a plurality of TRPs, an uplink beam, transmission power, or a frequency is changed in order to change and transmit TRPs between repetitive transmissions or a panel is changed in order to change and transmit TRPs between repetitive transmissions by the UE.

In one example of Case 2 in which, when the BS indicates uplink signal transmission through L1 signaling including DCI or MAC CE signaling, the UE changes an uplink beam, transmission power, or a frequency to transmit the uplink signal or the UE changes a panel to transmit the uplink signal.

In one example of Case 3 in which SRS transmission is indicated or configured, a plurality of SRS resources included in an SRS resource set are used or an uplink beam, transmission power, or a frequency is changed to use a plurality of SRS resource sets, or the UE changes a panel for SRS transmission.

The case in which transmission information is changed for a change in TRPs between repetitive transmissions in case 1 may be determined according to a mapping pattern between repetitive transmissions and TRPs. The repetitive transmission means, for example, transmission of the same uplink signal. In the 3GPP Release 16 standard, when repeatedly transmitting the PDSCH, the BS supports two mapping patterns (for example, "sequential" and "cyclical").

A mapping pattern for repeatedly transmitting the PDSCH to a plurality of TRPs may be applied by the UE to repeatedly transmit the uplink signal through a plurality of TRPs. "Sequential" mapping is a method of changing and transmitting TRPs in units of two repetitive transmissions, for example, {TRP1, TRP1, TRP2, TRP2} and "cyclical" mapping is a method of changing and transmitting TRPs in every transmission, for example, {TRP1, TRP2, TRP1, TRP2}. When at least one of the uplink beam for transmitting an uplink signal to a plurality of TRPs, the transmission power, and the frequency (or frequency hop) to be transmitted is determined, the UE may transmit the uplink signal by applying uplink transmission change information determined according to a mapping method.

Alternatively, when a panel for transmitting the uplink signal to a plurality of TRPs is determined, the UE may transmit the uplink signal by applying uplink transmission change information determined according to the mapping method. The uplink transmission change information may be at least one of the uplink beam for transmitting the uplink signal, the transmission power, and the frequency to be transmitted. Alternatively, the uplink transmission change information may be a panel for transmitting the uplink signal. When the PUSCH is repeatedly transmitted to a plurality of TRPs, for example, both a PUSCH repetitive transmission type A and a PUSCH repetitive transmission type B may be included. The PUSCH repetitive transmission type B may consider all of nominal repetition and actual repetition as the repetitive transmission unit.

In case 2, the BS may configure a higher-layer parameter for transmitting the uplink signal to the UE and indicate transmission of the uplink signal (for example, a PUCCH, a PUSCH, an SRS, or the like) of the UE through L1 signaling (for example, DCI). At this time, a time interval between signaling through which the BS indicates uplink signal transmission to the UE and the uplink signal which the UE transmits may be defined as a "time offset," which may be replaced with a "scheduling interval," a "scheduling offset," a "time interval," a "transient period," a "transient offset," "transient time," or the like. When the BS indicates uplink signal transmission to the UE through L1 signaling including DCI, the time offset may be calculated as "before the first symbol for uplink transmission (for example, PUCCH including HARQ-ACK for an aperiodic/semi-persistent SRS, a PUSCH, or a PDSCH) from the last symbol for transmitting a PDCCH including DCI." When a DCI decoding time of the UE is additionally considered, the time offset may be calculated as "before the first symbol for transmitting the uplink signal from the last symbol for transmitting a PDCCH including DCI." When the BS indicates uplink signal transmission through MAC CE signaling, the time offset may be calculated by the following methods.

In one example of Method 1, before the first symbol for transmitting the uplink signal (for example, an aperiodic/semi-persistent SRS) starts from the end of the last symbol for transmitting the PDSCH including MAC CE signaling.

In one embodiment of Method 2, before the first symbol for transmitting the uplink signal starts from the end of the last symbol for transmitting the PUCCH/PUSCH including HARQ-ACK for the PDSCH including MAC CE signaling.

In one embodiment of Method 3, before the first symbol for transmitting the uplink signal starts since a MAC CE application delay time (for example, until the first starting slot after 3 ms passes) passes from the end of the last symbol for transmitting the PUCCH/PUSCH including HARQ-ACK for the PDSCH including MAC CE signaling.

The time offset may be converted in units of absolute time (for example, ms) or in units of symbols. When receiving an indication of uplink signal transmission from the BS, the UE may change at least one of an uplink beam, transmission power, and a frequency for uplink transmission during the time offset. Alternatively, the UE may change a panel for uplink transmission during the time offset.

When transmitting the SRS scheduled by the BS in case 3, the UE may change and transmit the uplink beam, the transmission power, and the frequency according to a higher-layer configuration of the SRS resource included in the SRS resource set to be transmitted. Alternatively, the UE may change the panel according to the higher-layer configuration of the SRS resource and transmit the SRS.

The UE may need a transient time to change at least one of the uplink beam, the transmission power, and the frequency according to the UE capability. Alternatively, the UE may need the transient time to change the panel for uplink transmission according to the UE capability. The transient time may be considered when repetitive transmission is performed, for example, in units of long subslots or in units of short subslots. Some or all of the uplink beam, the transmission power, or the frequency determined to transmit the uplink signal may be applied according to whether the transient time according to the UE capability is satisfied between repetitive transmissions of the uplink signal or during the time offset.

As described above, a predetermined time may be needed to change the uplink beam, the transmission power, or the frequency, and, in order to satisfy the same, an offset interval may be added between repetitive transmissions or the BS may indicate signal transmission to the UE in order to make the time offset longer than the predetermined time for the change. Alternatively, in addition, a predetermined time may be needed when the panel for uplink transmission is changed, and, in order to satisfy the same, an offset interval may be added between repetitive transmissions or the BS may indicate signal transmission to the UE in order to make the time offset longer than the predetermined time for the change.

In the disclosure, the offset may be understood as a meaning including the time offset or a time interval between repetitive transmissions of the uplink signal in a time domain for uplink transmission of the UE.

Detailed embodiments of a method by which the BS determines the offset in the time domain for guaranteeing a time required for changing the uplink beam, the transmission power, or the frequency according to the UE capability and a method by which the UE transmits the uplink signal indicated by the BS are described in detail through embodiment 2-1 and embodiment 2-2. Division of embodiment 2-1 and embodiment 2-2 is only for convenience of description, and embodiments of the disclosure may be individually implemented or a combination of at least one thereof may be implemented.

Embodiment 2-1: Method of Determining Offset of BS According to UE Capability Report and Configuring Offset in UE As an example of a method of determining the offset in the time domain for uplink signal transmission, the UE may report UE capability information including at least one of a UE capability for performing an uplink beam change, a UE capability for performing a transmission power change, and a UE capability for performing a frequency change considering frequency hopping and the like to the BS. Alternatively, the three UE capabilities may be individually reported to the BS. Further, the UE may select and report some of the three UE capabilities. The UE may report a representative value of the UE capabilities for changing a transmission configuration of the uplink signal.

When the uplink signal can be transmitted through a plurality of panels, the UE may also consider the UE capability for changing the panel in a step of determining the UE capability to be reported. That is, UE capability information including at least one of a UE capability for performing an uplink beam change, a UE capability for performing a transmission power change, a UE capability for performing a frequency change considering frequency hopping and the like, and a UE capability for performing a panel change may be reported to the BS. Alternatively, the four UE capabilities may be individually reported to the BS. Further, the UE may select and report some of the four UE capabilities. The UE may report a representative value of the UE capabilities for changing a transmission configuration of the uplink signal.

Hereinafter, the UE capability and the UE capability information which are interchangeable with each may be understood as the same meaning.

This is to provide information required for determining the offset by the BS in the case in which some or all of the uplink beam, the transmission power, or the frequency are changed when the uplink signal is transmitted. In addition, when the UE supports a plurality of panels, information required for determining the offset by the BS may be provided when the panel is changed. The UE may report the UE capability for each uplink beam change, transmission power, or frequency change through one of the following methods. Further, the UE capability for the panel change may also be reported using one of the following methods.

The UE capability for the change in the uplink transmission configuration in NR Release 15/16 may be reported. For example, the UE may configure "beamSwitchTiming" to be one of {14, 28, 48} and report the same to the BS like in NR Release 15/16 in order to report the UE capability for the beam change. The UE may configure "beamSwitchTiming" to be one of {224, 336} and report the same to the BS in order to report the UE capability for the panel change. The number indicating "beamSwitchTiming" is the symbol unit, and when "beamSwitchTiming" is configured as "224" in the UE capability report for the panel change, it means that a processing time for beam switching in the UE capability for the panel change is 224 symbols. Further, "beamSwitchTiming" may be configured for each subcarrier spacing.

The time required for the change may be reported in units of symbols or absolute time (for example, ins).

The BS and the UE may predefine a processing time indicating a processing capability. A processing time for N processing capabilities may be predefined, and the processing time may vary depending on an indication of subcarrier spacing. [Table 45] and [Table 46] below show examples of a processing time predefined by the BS and the UE for processing capabilities n and n_1 for changing the uplink beam, the transmission power, or the frequency. Here, a value of an area of a required time may be configured to establish, for example, the relation of {a1<a2<a3<a4} and {b1<a1, b2<a2, b3<a3} The unit of the required time may be configured as symbols or ms.

TABLE 45

| Processing capability n | |
|---|---|
| μ | Required time |
| 0 | a1 |
| 1 | a2 |
| 2 | a3 |
| 3 | a4 |

TABLE 46

| Processing capability n + 1 | |
|---|---|
| μ | Required time |
| 0 | b1 |
| 1 | b2 |
| 2 | b3 |

When reporting the processing time for changing at least one of the uplink beam, the transmission power, and the frequency through the UE capability, the UE may determine a value reported in consideration of each uplink signal. For example, when reporting the processing time for the uplink beam change through the UE capability, the UE may divide the UE capability into a UE capability for a beam change for a PUCCH, a UE capability for a beam change for a PUSCH, and a UE capability for a beam change for an SRS to report the same. The UE capability for the transmission power change and the UE capability for the frequency change may be equally divided and reported according to the PUCCH, the PUSCH, or the SRS.

When reporting the UE capability for changing at least one of the uplink beam, the transmission power, and the frequency for the PUCCH, the UE may make a determination in consideration of the number of PUCCH resources, the number of pieces of configured spatial relation info, the number of pieces of activated spatial relation info, a frequency hopping configuration, and the like. When reporting the UE capability for changing the uplink beam, the transmission power, and the frequency for the PUSCH, the UE may make a determination on the basis of a precoding method of the PUSCH (for example, "codebook" or "noncodebook"), the number of SRS resource sets associated with PUSCH transmission, the number of SRS resources configured within the associated SRS resource set, the relation between the PUSCH and an SRS antenna port, a frequency hopping configuration, and the like.

When reporting the UE capability for changing the uplink beam, the transmission power, and the frequency for the SRS, the UE may make a determination on the basis of an SRS transmission indication method (for example, based on DCI or based on the MAC CE), SRS time-axis information (for example, a periodic SRS, a semi-persistent SRS, or an aperiodic SRS), a used place of the SRS (for example, "beamManagement," "codebook," "noncodebook," or "antennaSwitching"), the number of SRS resource sets, the number of SRS resources, and the like. In addition, when reporting the processing time for the panel change through the UE capability, the UE supporting multiple panels may determine a value reported in consideration of an uplink signal.

Alternatively, the UE may determine and report the UE capability for changing at least one of the uplink beam, the transmission power, and the frequency without dividing the UE capability for each uplink signal. The UE may determine and report the UE capability for the panel change without dividing the UE capability for each uplink signal.

The UE may additionally report the UE capability indicating whether the uplink beam, the transmission power, and the frequency can be changed simultaneously or sequentially. The UE supporting multiple panels may report whether the panel can be also changed at the same time through the corresponding UE capability. That is, the UE may report whether the uplink beam, the transmission power, the frequency, and the panel can be simultaneously changed through the corresponding UE capability. In an example of the corresponding UE capability, the UE may select one of "simultaneous" or "sequential" and report the selected one to the BS. When the UE report "simultaneous" through the UE capability, it means that the UE can simultaneously change the uplink beam, the transmission power, and the frequency. It means that the UE supporting multiple panels can change the panels at the same time. When the UE report "sequential" through the UE capability, it means that the UE can sequentially change the uplink beam, the transmission power, and the frequency. It additionally means that the UE supporting multiple channels can sequentially change the panels.

The UE may report UE capability "beamCorrespondenceWithoutUL-BeamSweeping" indicating whether a beam correspondence requirement is satisfied to the BS as well as the UE capabilities for supporting the change in the uplink beam, the transmission power, frequency, and the panel. The beam correspondence refers to a capability of the UE for selecting a beam for uplink transmission on the basis of downlink measurement without depending on uplink beam sweeping. When the UE reports "beamCorrespondenceWithoutUL-BeamSweeping" which is the UE capability for the beam correspondence as "supported," the UE may select an uplink beam for uplink transmission without uplink beam sweeping and transmit an uplink signal therethrough.

The BS may determine an offset for securing a required time to apply uplink transmission change information through the UE capability reported by the UE. The BS may determine the offset in consideration of one or a combination of the following options.

In one example of Option 1, the offset may be determined on the basis of the largest value for at least one of the UE capability for the uplink beam change reported from the UE, the UE capability for the transmission power change, and the UE capability for the frequency change.

In one example of Option 2, the offset is determined on the basis of the largest value of UE capabilities for changes required to perform actual uplink transmission among UE capabilities reported from the UE. For example, when the BS indicates an uplink signal to the UE in order to make a change only in the uplink beam and the transmission power, the offset may be determined on the basis of the largest value of the UE capability for the uplink beam change and the UP capability for the transmission power change. The offset may be determined through the same method as the example for a combination of uplink transmission change information other than the example.

In one example of Option 3, the offset may be determined on the basis of a sum of the UE capability for the uplink beam change reported from the UE, the UE capability for the transmission power change, and the UE capability for the frequency change.

In one example of Option 4, the offset may be determined on the basis of a sum of UE capabilities for changes required to perform actual uplink transmission among UE capabilities reported from the UE. For example, when the BS indicates an uplink signal to the UE in order to make a change only in the uplink beam and the transmission power, the offset may be determined on the basis of the sum of the UE capability for the uplink beam change and the UP capability for the transmission power change. The offset may be determined through the same method as the example for a combination of uplink transmission change information other than the example.

In one example of Option 5, the offset may be determined in consideration of a configuration of each uplink transmission signal when the offset is determined through one of options 1 to 4. For example, when the BS determines the offset for repeatedly transmitting the PUCCH to a plurality of TRPs to be option 1, the UE may determine the offset on the basis of the UE capability reported in consideration of the configuration of the PUCCH. Alternatively, when the UE does not report the UE capability separately for each uplink signal, the BS may expect an additional required time due to the PUCCH configuration in the UE capability reported by the UE to determine the offset. This may be applied when the BS determines the offset for transmitting another uplink signal (for example, a PUSCH or an SRS).

In one example of Option 6, the offset may be determined without division between configurations of respective uplink transmission signals when the offset is determined through one of options 1 to 4.

In one example of Option 7, the BS may determine a random value as the offset. At this time, a higher-layer parameter configuration of the uplink signal, an uplink resource configuration, and the like may be considered.

In one example of Option 8, the offset may be determined additionally considering the UE capability for the panel change when the offset is determined through options 1 to 6 if the UE supports multiple panels.

Each option is an example in the case in which the UE reports all the UE capabilities for the three uplink transmission change information and, when the UE reports only some of the UE capabilities, the UE may apply only the reported UE capabilities to each option and the BS determines the offset.

When the UE reports that the uplink beam, the transmission power, and the frequency can be simultaneously changed, the BS may select option 1 or option 2 and determine the offset. When the UE reports that the uplink beam, the transmission power, and the frequency can be sequentially changed, the BS may select option 3 or option 4 and determine the offset. When the UE supports multiple panels and the UE reports that the uplink beam, the transmission power, the frequency, and the panel (or at least two thereof) can be simultaneously changed, the BS may determine the offset by additionally applying the UE capability for the panel change to option 1 according to option 8 or determine the offset by additionally applying the UE capability for the panel change to option 2 according to option 8. This is an example of the embodiment, and the BS may determine the offset in consideration of one of options 1 to 8 or a combination thereof according to the UE capability reported by the UE.

The BS may control the offset determined by the option according to whether the beam correspondence reported by the UE through the UE capability is supported. For example, when the UE supports the beam correspondence, the BS may determine the offset determined through the option as the final offset or control the offset to be a smaller value. Meanwhile, when the UE does not support the beam correspondence, the BS may add an additional required time to the offset determined through the option.

The BS may control the offset determined through the option according to whether the uplink beam to be transmitted by the UE in the uplink for multiple TRPs is reported. This means that, when the uplink beam is reported to the BS, the corresponding uplink beam is a beam "known" to the UE. This means that, when the uplink beam is not reported to the BS, the corresponding uplink beam is a beam "unknown" to the UE. When the UE reports the uplink beam to be transmitted in the uplink to the BS, the BS may determine the offset determined through the option as the final offset or control the offset to be a smaller value. Meanwhile, when the UE does not report the uplink beam to be transmitted in the uplink to the BS, the BS may add an additional required time to the offset determined through the option.

The BS may inform the UE of the determined offset. At this time, the BS may explicitly or implicitly inform the UE of the offset.

When the BS explicitly configures the determined offset in the UE: the BS may configure the offset as a new higher-layer parameter and explicitly inform the UE of the same. For example, a new higher-layer parameter "timeDurationForULSwitch" may be added to configuration information for PUCCH transmission such as PUCCH-FormatConfig or PUCCH-Config. Similarly, for the PUSCH or the SRS, a new parameter for the offset may be added to a higher-layer parameter for PUSCH transmission and a higher-layer parameter for SRS transmission. The example is one of the methods of configuring a new higher-layer parameter by which the BS indicates the determined offset to the UE, and the offset may be defined as a higher-layer parameter having another name.

When the BS implicitly indicates the determined offset: the BS may implicitly indicate the offset through configuration(s) for transmitting another uplink signal rather than directly configuring the offset as the higher-layer parameter like in the above-described operation. For example, the offset may be indicated through "startingSymbolIndex" configured in a PUCCH format[a] (a being 0, 1, 2, 3, or 4) within a higher-layer parameter PUCCH-Resource. In a more detailed description, as one example of the reinforced methods indicating PUCCH repetitive transmission within the slot, startingSymbol Index within the PUCCH-format[a] of the PUCCH-Resource may be configured by the number of times the PUCCH within the slot is repeated. In a detailed example, when the number of repetitions within the slot is, for example, 2, startingSymbolIndex may indicate a transmission start symbol of a first PUCCH repetitive transmission occasion within the slot, and "startingSymbolIndex2" which can be newly added may indicate a transmission start symbol of a second PUCCH repetitive transmission occasion within the slot.

At this time, the symbol location indicated by startingSymbolIndex may be ahead of the symbol location indicated by startingSymbolIndex2, and an interval between the two symbols may be configured by the BS to be larger than transmission symbols of one PUCCH nrofSymbols and the offset determined by the BS. The above example is only one example, and the BS may implicitly inform the UE of the offset through a PUCCH resource configuration for PUCCH transmission. Alternatively, when scheduling the PUCCH including HARK information of the PDSCH in the UE, the BS may indicate a PDSCH-to-HARQ_feedback timing indicator to the UE to make the time offset larger than the determined offset. For another uplink signal (for example, a PUSCH or an SRS) other than the PUCCH, the BS may implicitly inform the UE of the offset through the higher-layer parameter configuration of the uplink signal or transmission timing indicated by DCI.

Embodiment 2-2: Method of Transmitting Uplink Signal Indicated by BS According to UE Capability When receiving an indication of repetitive transmission of the uplink signal from the BS, the UE may determine an operation for uplink repetitive transmission according to whether the UE explicitly receives a configuration or implicitly receives an indication of the determined offset. When the UE explicitly receives the configuration of the offset from the BS, the UE may configure an interval between repetitive transmissions in the time domain according to the offset and transmit an uplink signal. When the UE implicitly receives the indication of the offset, the UE transmits the uplink signal according to the higher-layer parameter configuration for the uplink signal configured by the BS.

When the UE explicitly receives the configuration of the offset or implicitly receives the indication thereof and applies the offset to repetitive transmission of the uplink signal, the UE may change at least one of the uplink beam, the transmission power, and the frequency during the offset according to the UE capability and perform transmission. When the offset determined by the BS is configured to be larger than the UE capability for changing the uplink beam, the transmission power, or the frequency, the UE may change the uplink beam or the transmission power or change the frequency for frequency hopping in order to change and transmit TRPs between repetitive transmissions. When the offset determined by the BS is configured to be smaller than the UE capability for changing the uplink beam, the transmission power, or the frequency, the BS and the UE may predefine a default uplink transmission method in consideration of one of the following operations or a combination thereof in order to repeatedly transmit the uplink signal.

Transmit an uplink signal through an uplink beam, transmission power, and a frequency which are the same as those in previous transmission: since the offset determined by the BS is smaller than the UE capability, the UE cannot satisfy a time for changing the beam, transmission power, or the frequency between repetitive transmissions.

Accordingly, the UE may perform the next repetitive transmission through the beam, transmission power, and frequency which have been applied to the previous repetitive transmission. The previous repetitive transmission is a repetitive transmission occasion right before a repetitive transmission occasion to be transmitted. Further, at least one of the uplink beam, the transmission power, and the frequency may be used to be the same and the rest thereof can be changed. For example, the uplink beam and the frequency may be used to be the same as those in the previous (repetitive) transmission and the transmission power can be changed in the next repetitive transmission.

Transmit an uplink signal through an uplink beam, transmission power, and a frequency configured by default: since the offset determined by the BS is smaller than the UE capability, the UE cannot satisfy a time for changing the beam, transmission power, or the frequency between repetitive transmissions. Accordingly, the UE may perform the next repetitive transmission through predefined default uplink beam, default transmission power, and default frequency. Here, the BS and the UE may define default transmission information for each uplink signal (PUCCH, PUSCH, or SRS). Alternatively, the BS and the UE may define default transmission information in common for the uplink signal. Further, at least one of the uplink beam, the transmission power, and the frequency may be configured by default and the rest thereof can be changed. For example, the uplink beam and the frequency may be configured by default and the transmission power can be changed in the next repetitive transmission.

Transmit an uplink signal by optionally changing an uplink beam, transmission power, or a frequency: when mapping between uplink repetitive transmission and TRPs are configured as "sequential," the uplink beam, the transmission power, or the frequency may be changed and transmitted in a repetitive transmission occasion satisfying the UE capability. In a repetitive transmission occasion which does not satisfy the UE capability, the UE may transmit the uplink signal through a configuration which is the same as the previous repetitive transmission occasion. For example, when mapping is configured as (TRP1, TRP1, TRP2, TRP2), transmission is performed through an uplink beam, transmission power, and a frequency for TRP1 in first two repetitive transmission occasions.

Transmission may be performed after a change to an uplink beam, transmission power, and a frequency for TRP2 in a third repetitive transmission occasion, but the offset is smaller than the UE capability, and thus the UE transmits the uplink signal through a configuration for TRP1 without any change in uplink transmission information. The UE may change the uplink beam, the transmission power, and the frequency for TRP2 and transmit a fourth repetitive transmission occasion.

Transmit an uplink repetitive signal by applying a changeable configuration among an uplink beam, transmission power, and a frequency: when comparing sizes of the offset configured by the BS and the UE capability, the UE may apply some changeable configurations of the UE capabilities smaller than the offset to the next repetitive transmission occasion. For example, when the offset is larger than a UE capability for the uplink beam change and smaller than a UE capability for the transmission power change or the frequency change, the UE may change only the uplink beam and apply the same transmission power and frequency as those in the previous repetitive transmission occasion, and then transmit the next repetitive transmission occasion.

When the UE sequentially changes the uplink beam, the transmission power, and the frequency, the UE compares the offset with a sum of combinations of UE capabilities for the uplink beam, transmission power, or frequency change. At this time, when a value of a plurality of combinations is smaller than the offset, the UE makes a decision according to priorities of the uplink beam, the transmission power, or the frequency change determined in advance between the BS and the UE. For example, when the offset determined by the BS is smaller than a sum of all UE capabilities, a sum of the UE capabilities for the uplink beam and transmission power change, a sum of the UE capabilities for the uplink beam and frequency change, and a sum of the UE capabilities for the transmission power and frequency change are smaller than the offset value, and the BS and the UE predefines the priorities, for example, in an order of (uplink beam>transmission power>frequency), the UE may change the uplink beam and the transmission power and transmit the uplink signal.

Transmit an uplink signal by dropping some symbols or a repetitive transmission occasion: the UE may drop some front symbols and perform transmission through the remaining resources in the repetitive transmission occasion for changing at least one of the beam, the transmission power, and the frequency in order to repetitive transmit the uplink signal by applying uplink transmission change information. For example, when mapping between PUCCH repetitive transmission and TRPs is configured as {TRP1, TRP1, TRP2, TRP2}, no PUCCH is transmitted during front symbols until a required time for changing the uplink beam, the transmission power, and the frequency for TRP2 in the third repetitive transmission. For the remaining symbols after the required time for changing the uplink beam, the transmission power, and the frequency is satisfied, the UE may repeatedly transmit the third PUCCH.

In another example, when the required time for changing the uplink beam, the transmission power, or the frequency is not satisfied for repetitive transmission in which the TRP is changed, the UE may drop the corresponding uplink repetitive transmission occasion. For example, mapping between PUCCH repetitive transmission and TRPs is configured as {TRP1, TRP1, TRP2, TRP2}, the third PUCCH repetitive transmission occasion may be dropped. Thereafter, in a fourth PUCCH repetitive transmission occasion, a change to the uplink beam, the transmission power, and the frequency for TRP2 may be made for transmission. In another example, when mapping between PUCCH repetitive transmission and TRPs is configured as {TRP1, TRP2, TRP1, TRP2}, the second and fourth PUCCH repetitive transmission occasions may be dropped and thus PUCCH repetitive transmission based on a single TRP may be supported.

When PUCCH repetitive transmission is performed in consideration of a channel state for each TRP through the method provided by the embodiments of the disclosure, an increase in coverage of the uplink control signal can be expected. Further, since the transmission power is controlled for each TRP, effective battery management of the UE can be expected.

This may be equally applied to the relation between sizes of the time offset for uplink signal transmission and the UE capability. When the time offset is larger than the UE capability for changing the uplink beam, the transmission power, or the frequency, the UE may transmit the uplink signal. When the time offset is smaller than the UE capability for changing the uplink beam, the transmission power, or the frequency, the UE may transmit the uplink signal in consideration of one of the following operations or a combination thereof similarly to the case in which the offset between the repetitive transmissions does not satisfy the UE capability.

In one example, the UE may transmit an uplink signal through an uplink beam, transmission power, and a frequency which are the same as those in previous uplink signal transmission.

In one example, the UE may transmit an uplink signal through an uplink beam, transmission power, and a frequency configured by default.

In one example, the UE may transmit an uplink repetitive signal by applying a changeable configuration among the uplink beam, the transmission power, or the frequency.

In one example, the UE may transmit an uplink signal by dropping some symbols of the first repetitive transmission occasion or the first repetitive transmission occasion.

The operations according to the conditions have been described for the method by which the UE supporting a single panel changes the uplink beam, the transmission power, or the frequency. When the UE can support multiple panels, the UE identifies whether the offset determined by the BS is configured to be smaller than the UE capability for changing the uplink beam, the transmission power, the frequency, or the panel. When the time offset is larger than the UE capability for changing the uplink beam, the transmission power, the frequency, or the panel, the UE may transmit the uplink signal. When time offset is configured to be smaller than the UE capability for changing the uplink beam, the transmission power, the frequency, or the panel, the UE may transmit the uplink signal according to one of the following operations or a combination thereof by additionally considering the UE capability for the panel change similarly to the case in which the offset between the repetitive transmissions does not satisfy the UE capability.

In one example, the UE may transmit an uplink signal through an uplink beam, transmission power, a frequency, and a panel which are the same as those in previous uplink signal transmission.

In one example, the UE may transmit an uplink signal through an uplink beam, transmission power, a frequency, and a panel configured by default.

In one example, the UE may transmit an uplink repetitive signal by applying a changeable configuration among the uplink beam, the transmission power, the frequency, or the panel.

In one example, the UE may transmit an uplink signal by dropping some symbols of the first repetitive transmission occasion or the first repetitive transmission occasion.

The previous uplink signal is the most recently transmitted physical channel which is the same as an uplink signal (a PUCCH, a PUSCH, or an SRS) to be transmitted. The BS and the UE may define default transmission information for each uplink signal (PUCCH, PUSCH, or SRS). Alternatively, the BS and the UE may define default transmission information in common for the uplink signal.

Embodiment 3: Method of Generating PH Information in Multiple TRPs

As an embodiment of the disclosure, a method of generating PH information (referred to a PH, a PHR, a PH value, or PHR information, and also referred to as a term having a meaning equivalent thereto without being limited thereto) when PUSCH repetitive transmission is performed for multiple TRPs is described according to embodiment 1 or embodiment 2. The UE may select one of two types of PH information and report the selected one when PH information for a specific cell is reported. The first type is PH information calculated on the basis of PUSCH transmission power actually transmitted as the actual PHR. The second type is PH information calculated on the basis of a transmission power parameter configured through a higher-layer signal without a PUSCH actually transmitted as the virtual PHR (or reference format).

When a first PUSCH for transmitting corresponding PHR information is a PUSCH resource after the PHR is triggered, the UE may determine whether the PHR calculated for a specific cell is an actual PHR or a virtual PHR on the basis of higher-layer signal information and L1 signal received until a monitoring occasion of a PDCCH scheduling the corresponding PUSCH. Alternatively, when the PHR is triggered and a first PUSCH for transmitting corresponding PHR information is a configured PUSCH resource, the UE may determine whether the PHR calculated for a specific cell is an actual PHR or a virtual PHR on the basis of higher-layer signal information and L1 signal received before a first symbol reference $T_{proc,2}$ of the corresponding PUSCH. For $T_{proc,2}$ a value calculated on the basis of $d_{2,1}=1$ and $d_{2,2}=0$ in [Equation 3] can be applied, but it is only an example and other values can be applied. For example, when the UE calculates the PHR on the basis of the actual PUSCH (or transmission power for transmitting the actual PUSCH or actual transmission), the PHR information in serving cell c, carrier f, BWP b, and PUSCH transmission time point i may be expressed as the following equation:

$$PH_{type1,b,f,c}(i,j,q_d,l) = P_{CMAX,f,c}(i) - \{P_{O_{PUSCH},b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i,l)\}[dBm]$$  [Equation 10]

In another example, when the UE calculates PH information on the basis of the virtual PUSCH (or power calculated on the basis of higher-layer signal information without actual PUSCH transmission or reference format), the PH information in serving cell c, carrier f, BWP b, and PUSCH transmission time point i may be expressed as the following equation:

$$PH_{type1,b,f,c}(i,j,q_d,l) = \tilde{P}_{CMAX,f,c}(i) - \{P_{O_{PUSCH},b,f,c}(j) + \alpha_{b,f,c}(j) \cdot PL_{b,f,c}(q_d) + f_{b,f,c}(i,l)\}[dBm]$$  [Equation 11]

In the above equation, it is assumed that MPR=MPR=0 dB, A-MPR=0 dB, and P-MPR=0 dB for $\tilde{P}_{CMAX,f,c}(i)$. The definition of MPR, A-MPR, and P-MPR may follow the description in 3GPP TS 38.101-1, TS38.101-2, TS 38.101-3. [Equation 10] to [Equation 11] show first type PH information. In a communication system to which the disclosure can be applied, first type PH information may be PH information for PUSCH transmission power, second type PH information may be PH information for PUCCH transmission power, and third type PH information may be PH information for SRS transmission power. Meanwhile, the disclosure is not limited thereto.

Figure 20:
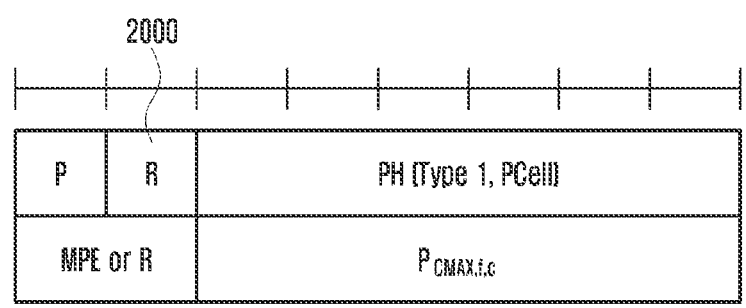
FIG. 20 illustrates a MAC CE structure including PHR information according to an embodiment of the present disclosure.

FIG. 20 illustrates a MAC CE structure including PHR information according to an embodiment of the present disclose. Specifically, FIG. 20 shows a PHR MAC CE format generated when the UE reports PHR information for one serving cell. The format may include two octets having the fixed size. The definition of each filed in FIG. 20 may be described below. Meanwhile, the dentition is only an example, and the disclosure is not limited thereto.

P: includes 1 bit and is set as 0 when P-MPR applied according to TS38.133 is smaller than P-MPR_00 and, otherwise, is set as 1 if mpe-Reporting-FR2 is configured and a serving cell operates in FR2. When mpe-Reporting-FR2 is not configured or the serving cell operates in FR1, P informs whether power backoff is applied to control transmission power. When a $P_{cmax,c}$ field has a different value according to the application of power backoff having a different value, P is set as 1;

$P_{cmax,c}$: this field indicates a maximum transmission power value calculated when PH information is reported. It has information of 6 bits and may select one of information in a total of 64 steps;

MPE: indicates a power backoff value applied to satisfy an MPE requirement when mpe-Reporting-FR2 is configured, the serving operates in FR2, and a P field is set as 1. It is a field including 2 bits and indicates one value in a total of four steps. It may exist as a reserved bit such as R when mpe-Reporting-FR2 is not configured, the serving operates in FR1, or the P field is set as 0;

R: indicates a reserved bit and is set as 0; and

PH: this field indicates a PHR level. This field includes 6 bits and may select one value among a total of 64-step PHR levels.

Figure 21:
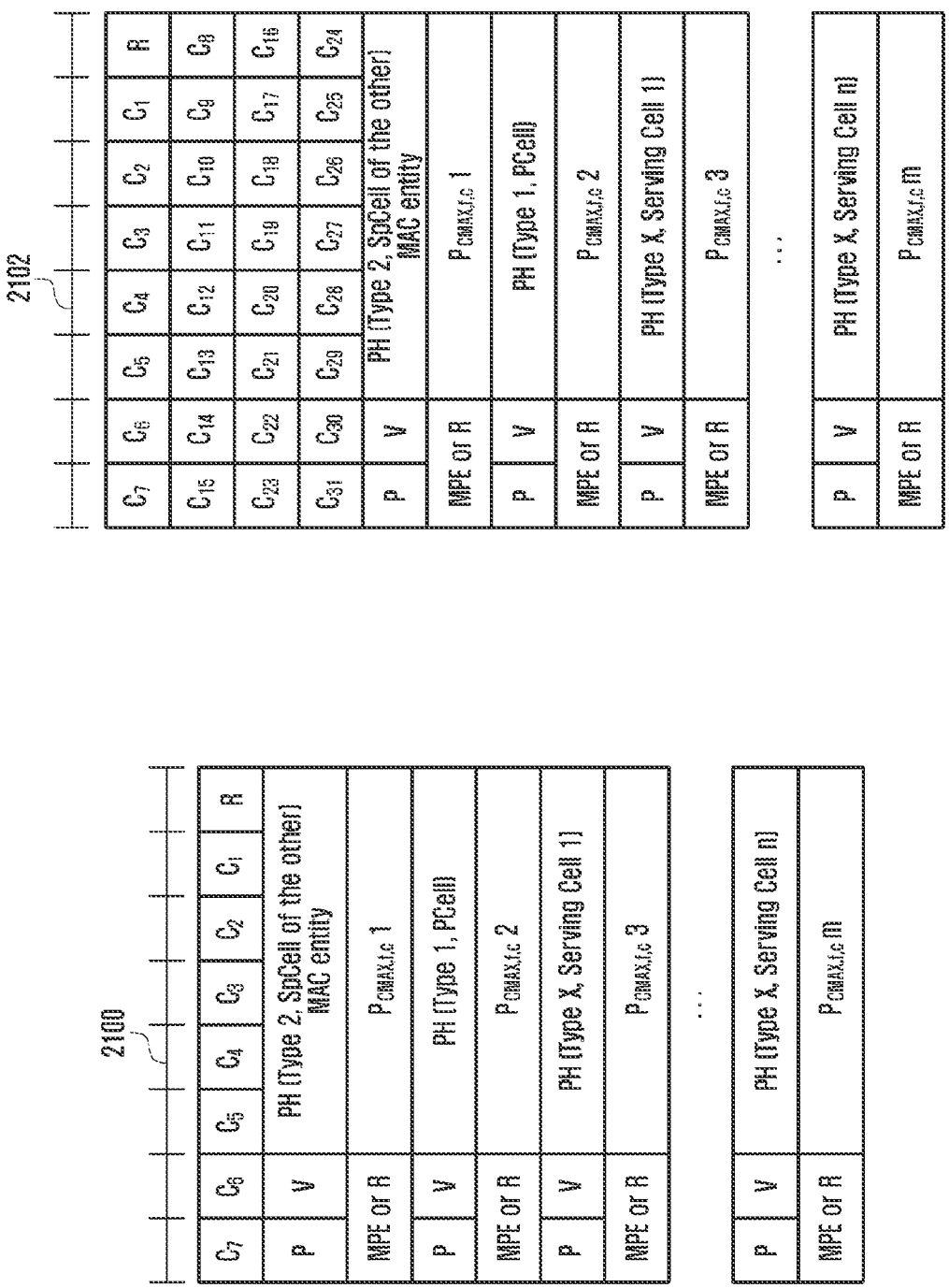
FIG. 21 illustrates a MAC CE structure including PHR information according to an embodiment of the present disclosure.

FIG. 21 illustrates a MAC CE structure including PH information according to an embodiment. Specifically, FIG. 21 shows a PHR MAC CE format generated when the UE reports PH information for a plurality of serving cells. Reference numeral 2100 of FIG. 21 indicates a PHR MAC CE format which can be used when a plurality of serving cells are configured and a value having the largest index among the corresponding serving cells is smaller than 8. Reference numeral 2102 of FIG. 21 indicates a PHR MAC CE format which can be used when a plurality of serving cells are configured and a value having the largest index among the corresponding serving cells is larger than or equal to 8.

Unlike the PHR MAC CE format illustrated in FIG. 20, the PHR MAC CE format in FIG. 21 may have a variable size according to a set in which serving cells are configured or the number of serving cells. The corresponding information may include second type PH information for a special cell (SpCell) of another MAC entity and first type PH information for a Pcell. When a value having the largest index among the corresponding serving cells is smaller than 8, a field informing of serving cell information may include one octet. When a value having the largest index among the corresponding serving cells is larger than or equal to 8, a field informing of serving cell information may include four octets. PH information may be included according to the order of serving cell indexes.

When a PHR is triggered, a MAC entity may transmit a PHR MAC CE including PH information through a PUSCH which can be transmitted. At this time, whether the PH information is calculated on the basis of the actual PUSCH (that is, actual PHR) or the virtual PUSCH (that is, virtual PHR) may be determined on the basis of a higher-layer signal and DCI information received until a specific time point as described above. Meanwhile, fields of the PHR MAC CE format illustrated in FIG. 21 may have the same meaning (definition) as most fields in the PHR MAC CE format illustrated in FIG. 20, and V may have the following meaning.

V: this field is information informing that the PH information is calculated on the basis of actual transmission (actual PUSCH) or a reference format (virtual PUSCH). For the first type PH information, V is set as 0 when the PUSCH is actually transmitted, and is set as 1 when the reference format for the PUSCH is used. For the second type PH information, V is set as 0 when the PUSCH is actually transmitted, and is set as 1 when the reference format for the PUSCH is used. For third type PH information, V is set as 0 when the SRS is actually transmitted, and is set as 1 when a reference format for the SRS is used. Further, for the first type, second type, and third type PH information, there may be $P_{cmax,f,c}$ and MPE fields when V is 0, and the $P_{cmax,f,c}$ and MPE fields may be omitted when V is 1.

Meanwhile, when one UE communicates with multiple TRPs as illustrated in FIG. 16, the respective TRPs may have different path attenuations and different physical channel environments, and thus it may be required to differently control transmission power configurations and controls for each TRP. For example, in a PUSCH transmission power equation of [Equation 8], the remaining parameters except for $PL_{b,f,c}(q_d)$ are information indicated in advance by a higher-layer signal or an L1 signal, but the UE finally determines a PUSCH transmission power value on the basis of measurement of a reference signal for $PL_{b,f,c}(q_d)$ and accordingly, the UE may calculate different transmission powers for respective TRPs and actually apply the same to PUSCH repetitive transmission based on multiple TRPs.

Further, when the UE is closer to the first TRP than the second TRP while the UE communicates with the first TRP and the second TRP, the UE can have a smaller transmission power value compared to the second TRP when transmitting a PUSCH, a PUCCH, or an SRS for the first TRP. Further, since panel and antenna structure characteristics may vary depending on the TRP, codebook or beam configuration information considering the same may also vary, and thus transmission power determined by the UE on the basis thereof may vary depending on the TRP.

As shown in [Equation 8], when determining PUSCH transmission power, the UE may receive a configuration of configuration information for different parameters through a higher-layer signal or an L1 signal, and the UE can determine the transmission power on the basis of different signal information for respective TRPs or determine the transmission power on the basis of different index or indication information within the corresponding signal information even through common signal information is configured in the case of multiple TRPs.

When the UE transmits and receives control and data information to and from multiple TRPs in one serving, the UE can transmit PH information to each of the first TRP and the second TRP. Specifically, the UE may transmit the PUSCH including PH information to the first TRP or the second TRP, and the PUSCH may be scheduled in the same TRP or different TRPs transmitting the PUSCH or may be configured in advance through a higher-layer signal. When the BS receives the PH information in FIG. 20, the UE may be required to predefine whether the PH information is PH information for PUSCH transmission power based on the first TRP or PH information for PUSCH transmission power based on the second TRP according to [Equation 10] or [Equation 11]. Subsequently, a method of configuring MAC CE information considering multiple TRPs is described according to each embodiment.

Meanwhile, transmission of the PUSCH including PH information to the TRP by the UE in the disclosure may mean that the UE transmits the corresponding PH information (transmit a MACE CE including the corresponding PH information) through PUSCH resources connected to (associated with) CORESETPoolIndex corresponding to the corresponding TRP. For example, transmission of the PUSCH including PH information to the first TRP among the first TRP and the second TRP by the UE may mean that the UE transmits a MAC CE including the PH information through PUSCH resources connected to CORESETPoolIndex 1 corresponding to the first TRP.

Further, in the disclosure, calculation of PH information on the basis of one of a plurality of TRPs by the UE may mean that PH information (actual PHR) is calculated on the basis of actual transmission power (actual PUSCH) of the PUSCH connected to CORESETPoolIndex corresponding to the corresponding TRP or may mean that the actual PUSCH is not transmitted to the corresponding TRP but PH information (virtual PHR) is calculated on the basis of a transmission power parameter (virtual PUSCH) configured through a higher-layer signal for the PUSCH connected to CORESETPoolIndex corresponding to the corresponding TRP. Meanwhile, as described in Embodiment 1-4, an SRS resource set is configured for each TRP, and two SRI fields in (single) DCI may indicate SRS resources in different SRS resource sets, respectively. For example, the first SRI field may indicate an SRS resource in SRS resource set #1, and the second SRI field may indicate SRS resource #2.

In this case, the UE may determine a precoder and a transmission rant to be applied for PUSCH transmission based on the RS resource index, which is a value indicated by the SRI field in the DCI, and accordingly transmit the PUSCH associated with the RS resource index. The UE may transmit the PUSCH for the first TRP by transmitting the PUSCH associated with the RS resource index indicating the SRS resource in the SRS resource set configured for the first TRP. The UE may transmit the PUSCH for the second TRP by transmitting the PUSCH associated with the RS resource index indicating the SRS resource in the SRS resource set configured for the second TRP. In this way, the RS resource index indicating the SRS resource in the SRS resource set configured for each TRP may be used to distinguish the TRP.

As described above, CORESETPoolIndex or RS resource index may be used as information for distinguishing TRP (TRP information). Meanwhile, it is noted that the disclosure is not limited thereto, and TRP may be distinguished according to various information.

Embodiment 3-1—Single Entry PHR MAC CE Type 1

Embodiment 3-1 provides a method of using the conventional MAC CE format in FIG. 20 and using a reserved bit (R) 2000 in the case of multi-TRP-based transmission and reception. That, it is indicated whether corresponding PH information is an actual PUSCH-based PH or a virtual PUSCH-based PH according to whether a value of the reserved bit R is 0 or 1. On the basis thereof, the BS may determine TRP information (for example, a TRP index, CORESETPoolIndex corresponding to the TRP index, or RS resource index) based on which the UE calculates PH information. For convenience of the description, R is described, but the disclosure is not limited thereto and may use another name, for example, V. For example, when the UE transmits a PUSCH including a MAC CE for a first TRP and the value of the reserved bit R is set as 0 (actual PUSCH) in the corresponding MAC CE in the state in which the first TRP and a second TRP are connected to the UE, the BS may determine that the UE calculates PH information on the basis of the first TRP.

That is, the BS may determine that the UE calculates PH information on the basis of transmission power of the PUSCH actually transmitted (actual PUSCH transmission) to the first TRP. In another example, when the UE transmits a PUSCH including a MAC CE for a first TRP and the value of the reserved bit R is set as 1 (virtual PUSCH) in the corresponding MAC CE in the state in which the first TRP and a second TRP are connected to the UE, the BS may determine that the UE calculates PH information on the basis of the second TRP. That is, the BS may determine that the UE calculates PH information on the basis of higher-layer signal information for PUSCH transmission power (reference format) although the UE does not actually transmit the PUSCH to the second TRP.

In another example, when the UE transmits a PUSCH including a MAC CE for a second TRP and the value of the reserved bit R is set as 0 (actual PUSCH) in the corresponding MAC CE in the state in which a first TRP and the second TRP are connected to the UE, the BS may determine that the UE calculates PH information on the basis of the second TRP. That is, the BS may determine that the UE calculates PH information on the basis of transmission power of the PUSCH actually transmitted (actual PUSCH transmission) to the second TRP. In another example, when the UE transmits a PUSCH including a MAC CE for a second TRP and the value of the reserved bit R is set as 1 (virtual PUSCH) in the corresponding MAC CE in the state in which a first TRP and the second TRP are connected to the UE, the BS may determine that the UE calculates PH information on the basis of the first TRP.

That is, the BS may determine that the UE calculates PH information on the basis of higher-layer signal information for PUSCH transmission power (reference format) although the UE does not actually transmit the PUSCH to the first TRP. To sum up the examples, the UE determines whether the corresponding PH information is calculated on the basis of the actual PUSCH or the virtual PUSCH according to a determination of a TRP based on which the PH information is calculated and a TRP to which a PUSCH including the corresponding PH Information is transmitted. When the TRP which is the reference for calculating PH information is the same as the TRP for transmitting the PUSCH including the corresponding PH information, the UE may generate the PH information on the basis of the actual PUSCH. When the TRP which is the reference for calculating PH information is not the same as the TRP for transmitting the PUSCH including the corresponding PH information, the UE may generate the PH information on the basis of the virtual PUSCH.

Embodiment 3-2—Single Entry PHR MAC CE Type 2

Figure 22:
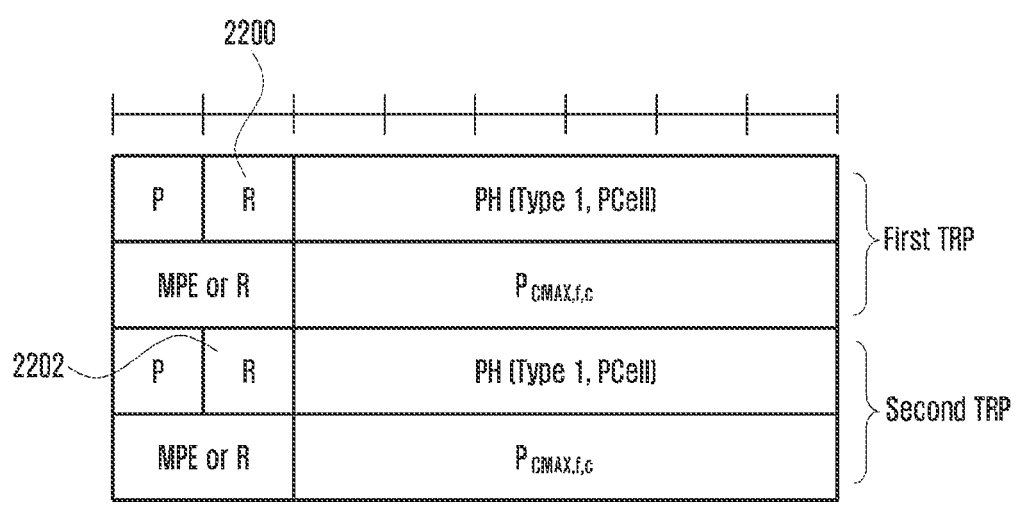
FIG. 22 illustrates a MAC CE structure including PHR information according to an embodiment of the present disclosure.

In embodiment 3-1, the UE cannot provide a MAC CE format including PH information for at least two TRPs among multiple TRPs within one serving cell. Accordingly, in embodiment 3-2, a bitmap for generating PH information for each TRP is configured in a situation in which the UE receives a configuration of one serving cell as illustrated in FIG. 22. FIG. 22 assumes the case in which the number of TRPs is 2, but the disclosure is not limited thereto and N TRP can be configured. Further, FIG. 22 shows information indicating whether PH information calculated by the UE for each TRP is based on the actual PUSCH or the virtual PUSCH by using reserved bits 2200 and 2202 as the V fields of FIG. 12. In addition, when the virtual PUSCH is indicated by the V field, the UE may omit the MPE field and the $P_{cmax,f,c}$ field for the corresponding TRP.

FIG. 22 is similar to FIG. 21, but there is no field indicating a serving cell and each PH information bitmap may be determined according to the number of TRPs in which the UE is configured and may be determined in an ascending order or a descending order according to a TRP index. Alternatively, in embodiment 3-2, which reference is used for PH information for each TRP may be determined according to the TRP for receiving the PUSCH including the corresponding PH information leaving the reserved bits 2200 and 2202 of FIG. 22. For example, when PH information of FIG. 22 is received by the first TRP, the BS may determine PH information calculated on the basis of the actual PUSCH for the first TRP and determine PH information calculated on the basis of the virtual PUSCH for the other TRPs except for the first TRP.

Embodiment 3-3—Single Entry PHR MAC CE Type 3

Figure 23:
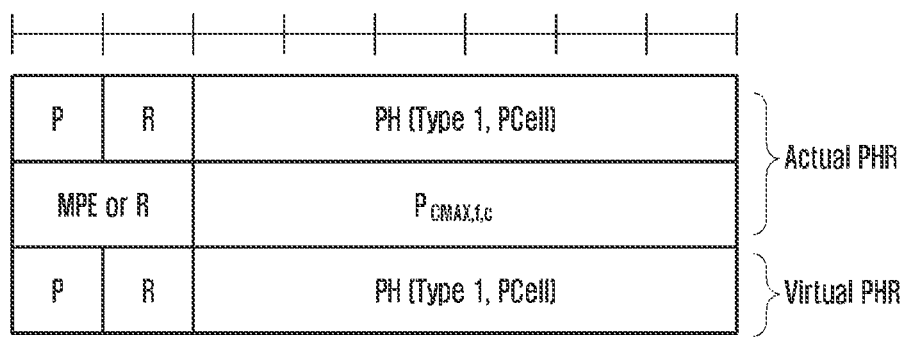
FIG. 23 illustrates a MAC CE structure including PHR information according to an embodiment of the present disclosure.

In embodiment 3-3, a bitmap for calculating an actual PHR and a bitmap for calculating a virtual PHR are fixed without a need to use the reserved bit of FIG. 20 for another purpose by the UE. As illustrated in FIG. 23, the actual PHR may be first configured by two octets and the virtual PHR may be configured by one octet. Meanwhile, the disclosure is not limited thereto, and various configurations may be possible like the virtual PHR is first configured by one octet and the actual PHR is configured by two octets. Although FIG. 23 illustrates on the basis of the assumption of two TRPs, the disclosure is not limited thereto and can be generally applied to multiple TRPs. In this case, the bitmap for the virtual PHR may be configured for each TRP, and the remaining TRPs except for the TRP for the actual PHR may be mapped in an ascending order or a descending order. In FIG. 23, a TRP calculated by the UE for the bitmap of the actual PHR may be a TRP for receiving the PUSCH transmitted by the corresponding PH information. For the other TRPs, PH information may be calculated on the basis of the virtual PUSCH. Accordingly, in FIG. 23, MPE and $P_{cmax,f,c}$ information may exist only in the bitmap corresponding to the actual PHR and may be omitted in the bitmap corresponding to the virtual PHR.

Embodiment 3-4—Single Entry PHR MAC CE Type 4

In embodiment 3-4, an octet including index information of each TRP may be first included and then PH information including one or two octets may be mapped on the corresponding TRP index information in an ascending or descending order of the TRP index as illustrated in FIG. 24. FIG. 24 assumes the case in which two TRPs are configured in one UE, but the larger number of TRPs can be generally applied. Similar to FIG. 22, reserved bits R 2400 and 2402 may be used to inform of the actual PHR or the virtual PHR. Alternatively, the actual PHR or the virtual PHR may be determined according to a TRP by which the PUSCH including PHR MAC CE information is received. This is similar to embodiment 3-2 but has a difference in that octets including information on TRPs containing PH information are added and TRPs and PH information are mapped according to the information on the TRPs.

Meanwhile, embodiments 3-1 to 3-4 describe a PH information generation method in the case in which the UE receives a configuration of one serving cell in a multi-TRP situation. Embodiments thereafter describe a PH information generation method in the case in which the UE receives a configuration of a plurality of serving cells in a multi-TRP situation.

Embodiment 3-5—Multiple Entry PHR MAC CE Type 1

FIG. 25 illustrates a method of generating PH information in a situation in which the UE receives a configuration of multiple TRPs and multiple cells according to embodiment 3-5. Similar to FIG. 21, there are octets including information on respective serving cells and the octet including TRP information of each serving cell. For example, Cm,n denotes an $m^{th}$ serving cell and an $n^{th}$ TRP, and when the corresponding value is 1, PH information thereof may include a maximum of two different octets. Although FIG. 25 illustrates mapping of PH information preferentially based on a serving cell index and for each TRP index within the corresponding serving index, it is only an example and the mapping may be performed for each serving index within the corresponding TRP index based on the TRP index.

In summary, PH information may be mapped on the basis of the serving cell index and the TRP index. For example, when m is 7 and n is 2, the UE may configure a total of 14 pieces of PH information and indicate whether the PH information is calculated on the basis of the actual PUSCH or the virtual PUSCH through a V value. When the PH information is calculated on the basis of the virtual PUSCH, a $P_{cmax,f,c}$ field and an MPE field may be omitted.

Embodiment 3-6—Multiple Entry PHR MAC CE Type 2

FIG. 26 illustrates a method by which the UE generates PH information in a multi-TRP situation according to embodiment 3-6. Similar to FIG. 21, the UE includes octets indicating respective serving indexes and lists PH information thereof according to the serving cell index. Information on TRPs may be indicated through a reserved bit R 2600 of FIG. 26. For example, PH information for each serving cell may be determined on the basis of the first TRP when the R value indicates 0, and PH information for each serving cell may be determined on the basis of the second TRP when the R value indicates 1. The UE may report a MAC CE having the MAC CE format illustrated in FIG. 26 to the BS, and the BS may determine a TRP based on which the UE generates the PH information according to information indicated by the R value.

Embodiment 3-7—Multiple Entry PHR MAC CE Type 3

The UE may report a PHR MAC CE having the MAC CE format illustrated in FIG. 21 to the BS. However, which TRP is used to calculate PH information by the UE may be determined according to a TRP to which the PUSCH including the corresponding PH information is transmitted. For example, when the PUSCH including PH information is transmitted to the first TRP, the UE may calculate PH information for a plurality of serving cells on the basis of the first TRP, and when the PHR is triggered, transmit a MAC CE including the PH information to the BS, and the BS may consider that the PH information is calculated in advance for the plurality of serving cells on the basis of the first TRP. According to the present embodiment, there is an advantage of reusing the conventional MAC CE format without a need to newly define a separate MAC CE format.

In the operation for determining which TRP is used to determine specific PH information in embodiments 3-1 to 3-7, the method based on the TRP to and from which the PUSCH including the corresponding PH information is transmitted and received has no problem if the corresponding PUSCH transmission and reception are performed for only TRP. However, when the corresponding PUSCH is repeatedly transmitted in consideration of multiple TRPs (for example, PUSCH repetitive transmission is transmitted and received for each of the first TRP and the second TRP), the methods cannot be applied. In this case, both the UE and the BS may be based on a TRP at which an initial PUSCH is transmitted and received or a TRP at which a last PUSCH is transmitted and received.

Further, in the embodiments, a MAC entity may determine which TRP is used to determine corresponding PH information on the basis of a TRP at which the PUSCH including PH information is transmitted and received. Specifically, in an operation of determining the TRP used to generate (or calculate) of the PH information, the MAC entity may consider the TRP at which the PUSCH including the corresponding PH information is transmitted and received. For example, the MAC entity may determine that the PH information included in the PUSCH transmitted and received through the first TRP is calculated on the basis of the first TRP. Alternatively, the MAC entity may determine that the PH information included in the PUSCH transmitted and received through the second TRP is calculated on the basis of the second TRP. Meanwhile, the MAC entity may be a MAC entity of the BS or a MAC entity of the UE.

Figure 27:
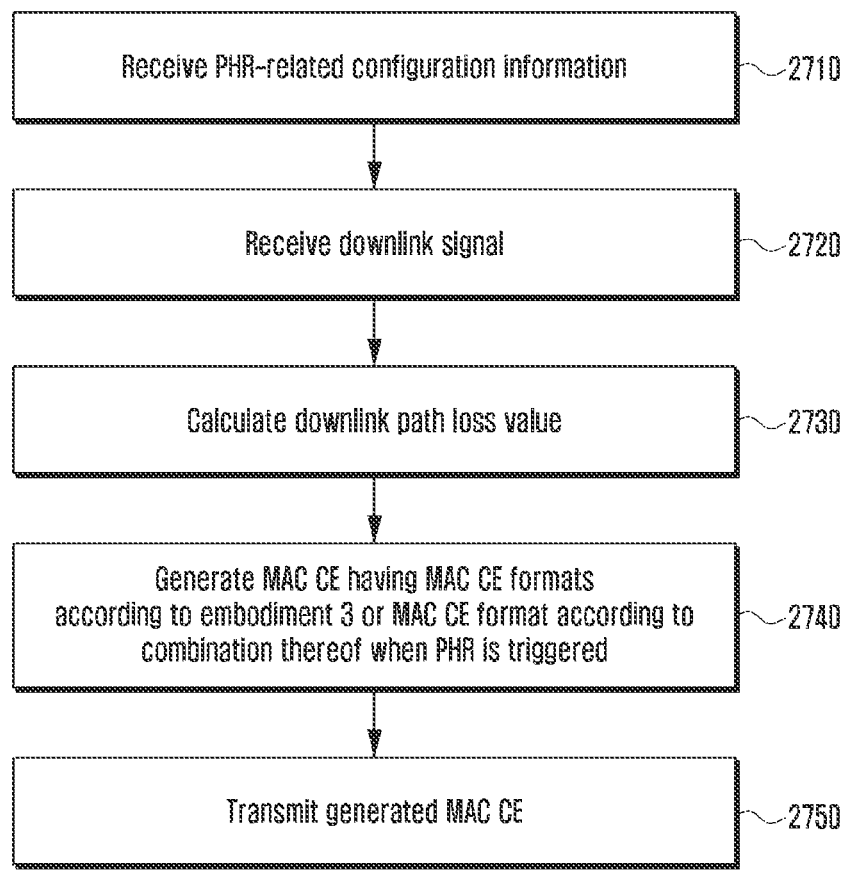
FIG. 27 illustrates an operation of the UE according to an embodiment of the present disclosure.

FIG. 27 illustrates the operation of the UE according to an embodiment of the present disclosure.

Referring to FIG. 27, the UE may receive PHR-related configuration information from the BS in operation 2710. The PHR-related configuration information may include a PHR-related timer value, an indicator indicating a MAC CE format to be used for the PHR, a PHR configuration parameter for PUSCH transmission in FR2, a value indicating a change in downlink path attenuation (or transmission power) for satisfying a PHR trigger condition, and the like. Meanwhile, the PHR-related configuration information may be received through a higher-layer signal.

In operation 2720, the UE may receive a downlink signal (for example, a CSI-RS, an SSB, or the like) from a first TRP or a second TRP.

In operation 2730, the UE may calculate a downlink path attenuation value on the basis of the measurement result of the downlink signal received in operation 2720.

When the PHR is triggered, the UE (MAC entity) may generate an MAC CE having MAC CE formats according to embodiment 3 or a MAC format according to a combination thereof in operation 2740. Meanwhile, in the disclosure, when a timer configured according to the timer value included in the PHR-related configuration information expires or a change in the downlink path attenuation value is larger than or equal to a specific threshold value, the PHR may be triggered.

In operation 2750, the UE may transmit a PUSCH including the MAC CE generated in operation 2740 to one TRP among at least one TRP.

Meanwhile, operations 2710 to 2750 in FIG. 27 may be performed at the same time or some thereof may be omitted.

Figure 28:
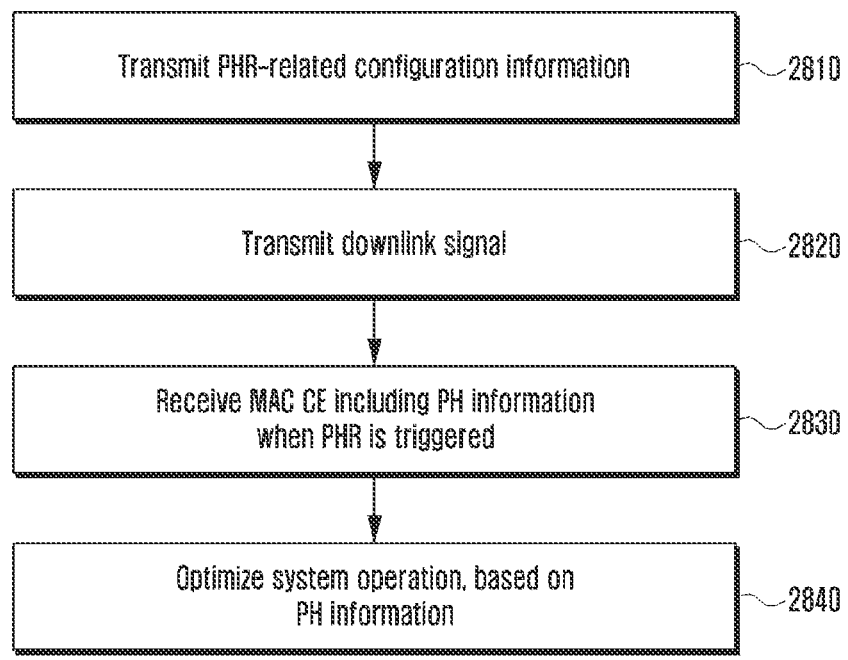
FIG. 28 illustrates an operation of the BS according to an embodiment of the disclosure.

FIG. 28 illustrates the operation of the BS according to an embodiment of the present disclosure.

Referring to FIG. 28, the BS may transmit PHR-related configuration information from the UE in operation 2810. The PHR-related configuration information may include a PHR-related timer value, an indicator indicating a MAC CE format to be used for the PHR, and the like. Meanwhile, the PHR-related configuration information may be transmitted through a higher-layer signal.

In operation 2820, the BS may transmit a downlink signal (for example, a CSI-RS, an SSB, or the like) to the UE through at least one TRP.

When the PHR is triggered, a MAC CE including PH information may be received through one TRP among at least one TRP in operation 2830. In the disclosure, when a timer configured according to the timer value included in the PHR-related configuration information expires or a change in the downlink path attenuation value is larger than or equal to a specific threshold value, the PHR may be triggered. Meanwhile, the MAC C which the BS receives from the UE in operation 2830 may be a MAC CE having MAC formats according to embodiment 3 or a MAC CE format according to a combination thereof.

In operation 2840, the BS may optimize the operation of a system on the basis of the PH information received in operation 2830. For example, when PH information reported by a specific UE is the remaining power having a positive value, the BS may increase a system yield by allocating the larger number of resources to the corresponding UE, and when the PH information is the remaining power having a negative value, may indicate again scheduling suitable for maximum transmission power and allocate the remaining resources to another UE so as to optimize the system yield since transmission power of the corresponding UE already exceeds the maximum value.

Meanwhile, operations 2810 to 2840 in FIG. 28 may be performed at the same time or some thereof may be omitted.

Figure 29:
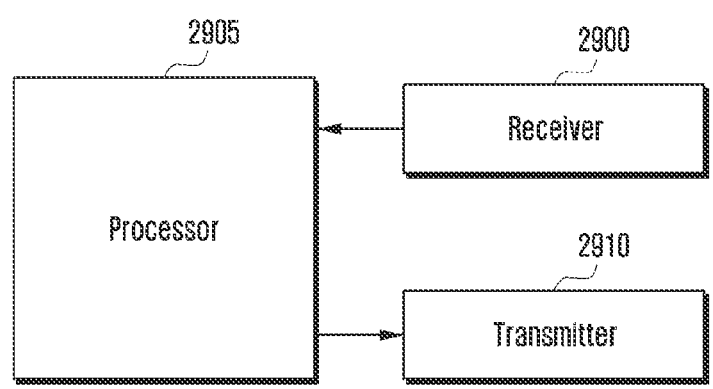
FIG. 29 illustrates a structure of the UE in a communication system according to an embodiment of the present disclosure.

FIG. 29 illustrates a structure of the UE in a communication system according to an embodiment of the present disclosure.

Referring to FIG. 29, the UE may include a transceiver including a receiver 2900 and a transmitter 2910, a memory (not shown), and a processor 2905 (or a controller or a processor). According to the communication method of the UE, the transceiver 2900 and 2910 of the UE, the memory, and the processor 2905 may operate. However, the elements of the UE are not limited to the above example. For example, the UE may include more or fewer elements than the above elements. Further, the transceiver 2900 and 2910, the memory, and the processor 2905 may be implemented in the form of a single chip.

The transceiver 2900 and 2910 may transmit and receive signals to and from the BS. The signals may include control information and data. To this end, the transceiver may include an RF transmitter for up-converting and amplifying a frequency of the transmitted signal and an RF receiver for low-noise amplifying the received signal and down-converting the frequency. However, this is only an embodiment of the transceiver 2900 and 2910, and the elements of the transceiver 2900 and 2910 are not limited to the RF transmitter and the RF receiver.

Further, the transceiver 2900 and 2910 may receive a signal through a radio channel, output the signal to the processor 2905, and transmit the signal output from the processor 2905 through the radio channel.

The memory may store a program and data required for the operation of the UE. Further, the memory may store control information or data included in the signal transmitted and received by the UE. The memory may be configured by storage media such as ROM, RAM, hard disc, CD-ROM, and DVD, or a combination of the storage media. The number of memories may be plural.

The processor 2905 may control a series of processes to allow the UE to operate according to the above-described embodiments. For example, the processor 2905 may control elements of the UE to receive DCI including two layers and simultaneously receive a plurality of PDSCHs. The number of processors 2905 may be plural, and the processor 2905 may perform the operation of controlling elements of the UE by executing a program stored in the memory.

Figure 30:
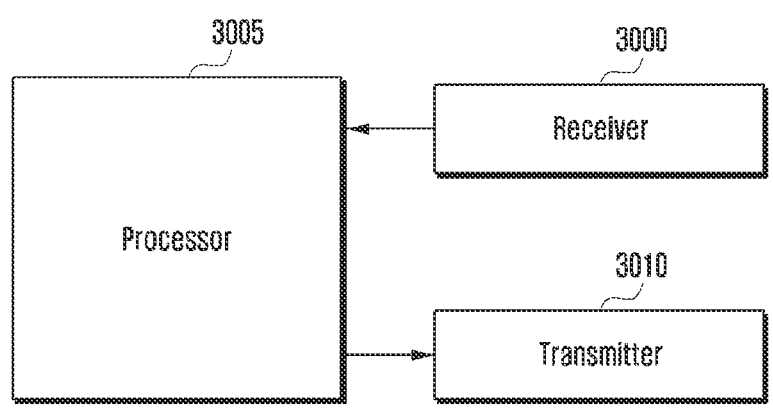
FIG. 30 illustrates a structure of the BS in a communication system according to an embodiment of the present disclosure.

FIG. 30 illustrates a structure of the BS in a communication system according to an embodiment of the disclosure.

Referring to FIG. 30, the BS may include a transceiver including a receiver 3000 and a transmitter 3010, a memory (not shown), and a processor 3005 (or a controller or processor). According to the communication method of the BS, the transceiver 3000 and 3010 of the BS, the memory, and the processor 3005 may operate. However, the elements of the BS are not limited to the above example. For example, the BS may include more or fewer elements than the above-described elements. Further, the transceiver 3000 and 3010, the memory, and the processor 3005 may be implemented in the form of a single chip.

The transceiver 3000 and 3010 may transmit and receive signals to and from the UE. The signals may include control information and data. To this end, transceiver 3000 and 3010 may include an RF transmitter for up-converting and amplifying a frequency of a transmitted signal and an RF receiver for low noise-amplifying a received signal and down-converting a frequency. However, this is only an embodiment of the transceiver 3000 and 3010, and the elements of the transceiver 3000 and 3010 are not limited to the RF transmitter and the RF receiver.

Further, transceiver 3000 and 3010 may receive a signal through a radio channel, output the signal to the processor 3005, and transmit the signal output from the processor 3005 through the radio channel.

The memory may store a program and data required for the operation of the BS. The memory may store control information or data included in a signal transmitted and received by the BS. The memory may be configured by storage media such as ROM, RAM, hard disc, CD-ROM, and DVD, or a combination of the storage media. The number of memories may be plural.

The processor 3005 may control a series of processors to allow the BS to operate according to the embodiments of the disclosure. For example, the processor 3005 may configure DCI of two layers including allocation information of a plurality of PDSCHs and control the elements of the BS in order to transmit the DCI. The number of processors 3005 may be plural, and the processor 3005 may perform the operation of controlling elements of the BS by executing a program stored in the memory.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary.

For example, a part of one embodiment of the disclosure may be combined with a part of another embodiment to operate a base station and a terminal. As an example, a part of embodiment 1 and a part of embodiment 2 of the disclosure may be combined with each other to operate a base station and a terminal. Further, although the above embodiments have been described by way of the FDD LTE system, other variants based on the technical idea of the embodiments may be implemented in other systems such as TDD LTE, 5G, or NR systems. As another example, a part of embodiment 1 and a part of embodiment 3 of the disclosure may be combined with each other to operate a base station and a terminal. For example, a part that the SRI field in the DCI is used to indicate the SRS resource in the SRS resource set configured for each TRP as described in embodiment 1 may be applied to distinguish the TRPs in embodiment 3. As another example, a part of embodiment 2 and a part of embodiment 3 of the disclosure may be combined with each other to operate a base station and a terminal.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a communication system, the method comprising:
 receiving, from a base station, configuration information associated with power headroom reporting (PHR);
 identifying whether a PHR is triggered based on the configuration information;
 in case that the PHR is triggered, identifying a first power headroom (PH) value for a first physical uplink shared channel (PUSCH) corresponding to a first control resource set (CORESET) pool index and a second PH value for a second PUSCH corresponding to a second CORESET pool index;
 identifying a PHR medium access control control element (MAC CE) related to the first PH value and the second PH value;

transmitting, to the base station, the PHR MAC CE via a first transmission and reception point (TRP) corresponding to the first CORESET pool index, in case that the first PH value is associated with an actual PHR and the second PH value is associated with a virtual PHR; and transmitting, to the base station, the PHR MAC CE a second TRP corresponding to the second CORESET pool index, in case that the first PH value is associated with the virtual PHR and the second PH value is associated with the actual PHR.

2. The method of claim 1,
wherein the PHR MAC CE includes the first PH value, a field indicating whether the first PH value is based on a real PUSCH transmission or a reference format, the second PH value, and a field indicating whether the second PH value is based on a real PUSCH transmission or a reference format.

3. A method performed by a base station in a communication system, the method comprising:
transmitting, to a terminal, configuration information associated with power headroom reporting (PHR);
receiving, from the terminal, a PHR medium access control control element (MAC CE) via a first transmission and reception point (TRP) corresponding to a first control resource set (CORESET) pool index, in case that a first power headroom (PH) value is associated with an actual PHR and a second PH value is associated with a virtual PHR; and
receiving, from the terminal, a PHR MAC CE via a second TRP corresponding to a second CORESET pool index, in case that the first PH value is associated with the virtual PHR and the second PH value is associated with the actual PHR,
wherein the PHR MAC CE is related to the first PH value for a first physical uplink shared channel (PUSCH) corresponding to the first CORESET pool index, and the second PH value for a second PUSCH corresponding to the second CORESET pool index.

4. The method of claim 3,
wherein the PHR MAC CE includes the first PH value, a field indicating whether the first PH value is based on a real PUSCH transmission or a reference format, the second PH value, and a field indicating whether the second PH value is based on a real PUSCH transmission or a reference format.

5. A terminal in a communication system, the terminal comprising:
a transceiver; and
a controller operably coupled with the transceiver and configured to:
receive, from a base station, configuration information associated with power headroom reporting (PHR),
identify whether a PHR is triggered based on the configuration information,
in case that the PHR is triggered, identify a first power headroom (PH) value for a first physical uplink shared channel (PUSCH) corresponding to a first CORESET pool index and a second PH value for a second PUSCH corresponding to a second CORESET pool index,
identify a PHR medium access control control element (MAC CE) related to the first PH value and the second PH value,
transmit, to the base station, the PHR MAC CE via a first transmission and reception point (TRP) corresponding to the first CORESET pool index, in case that the first PH value is associated with an actual PHR and the second PH value is associated with a virtual PHR, and
transmit, to the base station, the PHR MAC CE a second TRP corresponding to the second CORESET pool index, in case that the first PH value is associated with the virtual PHR and the second PH value is associated with the actual PHR.

6. The terminal of claim 5,
wherein the PHR MAC CE includes the first PH value, a field indicating whether the first PH value is based on a real PUSCH transmission or a reference format, the second PH value, and a field indicating whether the second PH value is based on a real PUSCH transmission or a reference format.

7. A base station in a communication system, the base station comprising:
a transceiver; and
a controller operably coupled with the transceiver and configured to:
transmit, to a terminal, configuration information associated with power headroom reporting (PHR)
receive, from the terminal, a PHR medium access control control element (MAC CE) via a first transmission and reception point (TRP) corresponding to a first control resource set (CORESET) pool index, in case that a first power headroom (PH) value is associated with an actual PHR and a second PH value is associated with a virtual PHR; and
receive, from the terminal, a PHR MAC CE via a second TRP corresponding to a second CORESET pool index, in case that the first PH value is associated with the virtual PHR and the second PH value is associated with the actual PHR,
wherein the PHR MAC CE is related to the first PH value for a first physical uplink shared channel (PUSCH) corresponding to the first CORESET pool index, and the second PH value for a second PUSCH corresponding to the second CORESET pool index.

8. The base station of claim 7,
wherein the PHR MAC CE includes the first PH value, a field indicating whether the first PH value is based on a real PUSCH transmission or a reference format, the second PH value, and a field indicating whether the second PH value is based on a real PUSCH transmission or a reference format.

* * * * *